United States Patent [19]

Gopalraman

[11] Patent Number: 5,410,701
[45] Date of Patent: Apr. 25, 1995

[54] SYSTEM AND METHOD FOR ANALYZING PROGRAMMED EQUATIONS

[75] Inventor: Subbiah Gopalraman, Natick, Mass.

[73] Assignee: Devonrue Ltd., Boston, Mass.

[21] Appl. No.: 827,439

[22] Filed: Jan. 29, 1992

[51] Int. Cl.⁶ .............................................. G06F 15/32
[52] U.S. Cl. ..................................... 395/700; 364/191; 364/735; 364/DIG. 1; 364/280; 364/280.4; 364/280.7
[58] Field of Search ........................ 364/735, 191, 192; 395/700, 375, 800

[56] References Cited

U.S. PATENT DOCUMENTS

| | | | |
|---|---|---|---|
| 4,922,413 | 5/1990 | Stoughton et al. | 364/DIG. 1 X |
| 5,029,080 | 7/1991 | Otsuki | 364/DIG. 1 X |
| 5,107,418 | 4/1992 | Cramer et al. | 395/700 |
| 5,146,594 | 9/1992 | Iitsuka | 395/700 |
| 5,161,216 | 11/1992 | Reps et al. | 395/375 |
| 5,175,856 | 12/1992 | Van Dyke et al. | 395/700 |
| 5,193,190 | 3/1993 | Janczyn et al. | 395/700 |
| 5,197,137 | 3/1993 | Kumar et al. | 395/375 |
| 5,201,057 | 4/1993 | Uht | 395/800 |
| 5,230,053 | 7/1993 | Zaiki | 395/700 |

OTHER PUBLICATIONS

Dehbonei, B., et al., "PMACS=An Environment for Parallel Programming", *Proceedings of the Fifth International Parallel Processing Symposium*, IEEE Comput. Soc. Press, 1991, pp. 638-641.

Vehlies, Uwe, et al., "The Application of Compiler Techniques in Systolic Array Design," *1991 IEEE International Symposium on Circuits and Systems*, IEEE, 1991, pp. 240-243.

Lesk, M. E., "Lex-A Lexical Analyzer Generator," *Computing Science Technical Report*, #39, Bell Laboratories, NJ, 1975.

Johnson, S. C., "Yacc: Yet Another Compiler-Compiler," *Computing Science Technical Report*, #32, Bell Laboratories, NJ, 1975.

Chen (1989) *Social Science Computer Review* 7:228-230.

*Primary Examiner*—Paul V. Kulik
*Attorney, Agent, or Firm*—Lahive & Cockfield

[57] ABSTRACT

A system for the automated analysis of programmed statements, that define parameters and that define equations involving the parameters, includes a method for determining the precedence according to which the statements are to be evaluated. The method includes the steps of determining the number of dependencies associated with each parameter according to the program statements, the step of identifying each dependency associated with each parameter as defined by the program statements, the step of decrementing the dependency quantity of each variable associated with a variable having a zero dependency quantity, and the step of evaluating each parameter that has a non-zero dependency quantity prior to the decrementing step and for which the dependency quantity has been decremented to zero.

8 Claims, 3 Drawing Sheets

FIGURE 2

| Symbol Table Entry | Variable Dependencies | Unresolved Dependencies | Arc | Arc Destination | Arc Origin |
|---|---|---|---|---|---|
| E | 0 | 0 | | -- | B |
| C | 2 | 2 | | F, G | A |
| A | 2 | 2 | | C, B | -- |
| B | 2 | 2 | | E, D | A |
| D | 0 | 0 | | -- | B |
| F | 0 | 0 | | -- | C |
| G | 0 | 0 | | -- | C |

FIGURE 4

Unresolved Dependencies

| Entry | Initial | Iteration 1 | Iteration 2 |
|:-----:|:-------:|:-----------:|:-----------:|
| E | 0 | 0 | 0 |
| C | 2 | 0 | 0 |
| A | 2 | 2 | 0 |
| B | 2 | 0 | 0 |
| D | 0 | 0 | 0 |
| F | 0 | 0 | 0 |
| G | 0 | 0 | 0 |
| ↑ | ↑ | ↑ | ↑ |
| 20 | 24 | 24' | 24" |

SYSTEM AND METHOD FOR ANALYZING PROGRAMMED EQUATIONS

BACKGROUND

This invention relates to an electronic digital data processing system and method for analyzing, particularly for ordering, the sequence of programmed statements that constitute equations.

The invention is useful by computer programmers.

Conventional computer programming languages restrict the programmer to entering equations in the order in which they are evaluated. If an equation is listed out of this sequential order, which is conventionally deemed an error, the execution of the program will produce an erroneous result or will halt operation, due to what appears to be missing information.

Further, it is difficult and time-consuming for one not familiar with a computer program to determine how it works, and to be able to maintain, enhance or otherwise re-engineer the program.

It is known in the art to provide computer programs that map the function call hierarchies. One such program is termed the Source Code Browser and was available from Xerox Corporation.

Computer programs are also known that check a program to determine whether it contains a mistake in the form of an omitted equation, which includes an equation listed in the improper sequence. One such program termed Lint was available from AT&T.

In addition, the programming language termed Dynamo, available from Pugh-Roberts Associates, allows equations to be listed in any order. The system determines the order in which the equations are to be calculated.

It is an object of this invention to provide an electronic digital data processing system and method for determining the order in which programmed equations are to be evaluated.

It is also an object to develop a graphical presentation of that sequential ordering.

Another object of the invention is to provide a computer programming system and method for determining the precedence of equations in an existing program.

A further object of the invention is to provide a system and method that enable one to understand and to re-engineer computer software, particularly to the level of variable parameters.

Other objects of the invention will in part be obvious and will in part appear hereinafter.

SUMMARY OF THE INVENTION

An electronic digital data processing system and method according to the invention develop a structured representation of a given, i.e., target, computer program. The representation maps relationships between the various parameters, e.g. variables and constants, in the target program. The structured representation can be in the form of a table, a tree, or a flow chart, among others.

The method determines the structured representation in a manner that establishes the precedence of programmed statements that constitute equations. To this end, the structured representation determines the dependencies of variables in the programmed statements. The method and system thus enable the target program to be written with equations listed in random order, which may facilitate program development.

The method and system of the invention also enable programmers to maintain and modify a given program, whether or not it has equations listed in precedential order.

Further, the use of the invention enables a programmer or program user to overcome the difficult task of tracing relationships among various model parameters, e.g. constants and variables, even in a target program having equations written in random or other non-precedential order.

One practice of the invention attains a structured representation of the equations in a target program, and hence of the relationship between the various parameters in the program, with a transformation that includes three phases termed lexical analysis, semantic analysis, and precedence analysis. The results from the third phase, i.e. from the precedence analysis, can be displayed graphically as a flow diagram. Moreover, the results from the third phase enable the given program to be executed, even when it has statements listed in non-precedential order.

The lexical analysis phase of the transformation, according to the invention, reads the stream of characters making up the target program and groups them into lexemes. A lexeme is a sequence of characters with a collective meaning in the language of the target program.

The semantic analysis phase according to the invention is a form of parsing that at least partially determines whether the programmed. statements of identified lexemes constitutes correct or legal statements according to the language of the target program. The information collected about each lexeme by the parsing phase is typically stored in a data structure termed a symbol table. The parsing phase thus at least partially organizes the lexemes identified in the lexical analysis phase into statements that are consistent with the grammar rules of the given programming language. The parsing phase determines a symbol table entry for each unique lexeme identified by the lexical analysis phase and which the parsing phase recognizes as part of a legal or correct program statement of the language of the target program.

The semantic analysis phase represents the programmed equations, including initial value calculations and active value calculations, in the data structure known as syntax tree.

Further in accord with the invention, the precedence analysis phase orders the equations developed by the semantic analysis phase in the proper computational order, according to the target computer program.

The invention establishes precedence by ordering the equations, which the semantic analysis phase identified, to include the relationships between all the variables in the target program, e.g. all the variables in the model that the target program creates.

The precedence analysis phase can also develop a graphical representation for the ordered equations. It can thus construct a single graphical representation that, in effect, maps the relationship between all the variables in the model of the target program.

A further feature of one embodiment of the precedence establishing phase is to identify for a user any selected segment of the ordered program statements, i.e. equations. This is typically done by displaying the user-selected segment of the constructed graphical representation of variables. For example, a user can identify a variable of interest and identify one or a sequence of specific relationships of that variable, and the precedence analysis phase of the invention can display the segment of the ordered graphical representation of the equations as thus selected by the user. This selected display is useful because a program typically has a great many variables, and it is cumbersome, and perhaps not feasible, to display the entire graph of all the ordered equations.

The practice of the invention preferably provides the further feature of identifying errors in a program, such as when a required equation is missing. Another error condition which the precedence analysis phase can identify is an illegal simultaneous equation condition.

The invention thus provides a new method and system for analyzing programmed equations in a target program. The analysis can establish the sequential order for evaluating the equations according to the target program. Further, the method and system of the invention can develop a graphical representation of the ordered equations. The invention thus facilitates the use and the modification of existing programs that are unknown to the user or programmer. It also facilitates the creation of computer programs with equations placed in random order.

The invention accordingly comprises the several steps and the relation of one or more of such steps with respect to each of the others, and the data processing system embodying features of construction, combinations of elements and arrangements of parts adapted to effect such steps, all as further exemplified in the following detailed disclosure, and the scope of the invention is indicated in the claims.

BRIEF DESCRIPTION OF DRAWINGS

For a fuller understanding of the nature and objects of the invention, refer to the following detailed description and the accompanying drawings, in which:

FIG. 2 is a table representing information in a symbol table according to an illustrative practice of the invention;

FIG. 4 shows a further table containing entries from the table of FIG. 2 at successive stages of processing.

DESCRIPTION OF ILLUSTRATED EMBODIMENT

Figure 1:
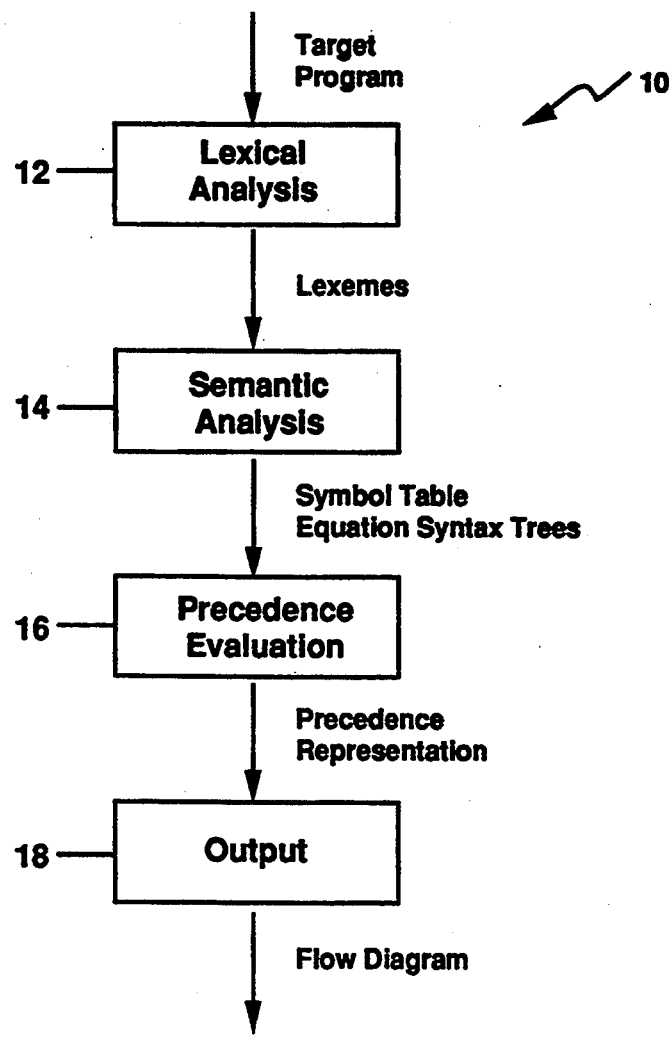
FIG. 1 is a high level flow diagram embodying features of the invention.

A flow diagramming tool 10 according to the invention has, as the flow chart of FIG. 1 shows, a lexical analysis phase 12, a semantic analysis or parsing phase 14, and a precedence evaluation phase 16. A subsequent output phase 18 presents results of the evaluation, typically in response to user commands. In one illustrative practice, the output phase for the flow diagramming tool displays a flow diagram of one or more programmed equation statements that are involved in a task which the user designated.

The flow diagramming tool is typically employed on a programmable digital computer, such as a conventional work station. The computer stores and executes a target program, typically an application program, with which a user is working. The same computer stores and executes the program that contains the flow diagramming tool. During the first, lexical analysis phase of the operation of the flow diagramming tool, it analyzes the target program to identify each lexeme of that program. A lexeme is a sequence of characters with a collected meaning within the context or language of the target program. The result of the lexical analysis phase is the creation of essentially a list of the lexemes defined by the statements of the target program.

The lexical analysis of a computer program as executed in phase 12 of the FIG. 1 flow chart employs conventional techniques known in the art of compilers for digital computer programs. A preferred lexical analyzer for use in the phase 12 is implemented as a deterministic finite state automation and can be generated using the lexical analyzer generator designated lex. That computer program is described in Lesk, M. E., (1975) "Lex- A Lexical Analyzer Generator" Computing Science Technical Report 39, AT&T Bell Laboratories, Murray Hill, N.J.

The succeeding parsing phase 14 organizes the lexemes identified by the lexical analysis phase 12 into statements consistent with the grammar rules of the computer language of the target program being executed. Statements of that program contain equations to be used in the calculation of the values of parameters.

The illustrated parsing phase organizes information according to a symbol table that has an entry for each lexeme. The symbol table thus contains information that pertains to each lexeme according to the program statements. To this end, the parsing phase identifies information from individual program statements, and adds it to the symbol table by storing it at designated locations in the computer memory. The flow diagramming tool preferably implements the symbol table as a hash table, which is a known technique for storing data in a manner which reduces data access times. The parsing phase thus constructs an internal representation of each statement in the target program and stores that representation as part of the symbol table. Construction of an internal representation is in general known, and is sometimes designated as a form of intermediate code generation.

Among the information that the parsing phase determines and stores in the symbol table is the identification of the number of dependencies associated with each lexeme that is a variable.

For example, for a program statement that specifies that a first lexeme (a) is a function of two lexemes (b) and (c) operated on by an operator (op), i.e. for a statement of the type $$a=f(b) \ (op) \ f(c)$$

the parser stores, among other information regarding the statement, that the variable lexeme (a) has associated with it two dependencies, i.e. the lexemes (b) and (c). The equation term (op) identifies the operator.

Further, the parsing phase 14 determines and stores in the symbol table the identification of the specific dependencies associated with each lexeme that is a variable. Again referring to the program statement set forth above, the parser identifies and stores that the dependencies associated with the lexeme (a) are the lexemes (b) and (c).

Upon completion of the illustrated parsing phase 14 and in accordance with the invention, the symbol table entry contains information about each lexeme including:

the string representing the lexeme;

the type, i.e. variable, constant, operator, function, etc.; and the associated data type, i.e. integer double, etc.

The parsing phase 14 in addition determines the following further information, and stores it in the symbol table, for lexemes that are model parameters, i.e. variables or constants:

the equation or equations, if any, through which the initial value of the parameter is calculated; and the equation or equations, if any, through which the active value of the parameter is calculated.

Parameters that are vectors or matrices can have different elements of the vector/array calculated through different equations. The initial value of a parameter as stated above is the value of the parameter at the start of a simulation, e.g. program evaluation. Similarly, the active value of a parameter as stated above is the value of the parameter at any but the first time step of the simulation being executed.

Further in accord with this embodiment of the invention, the parsing phase 14 determines and stores in the symbol table, for each lexeme that is a subscripted variable, i.e. a vector or an array, the following additional information:

number of dimensions; and size of each dimension.

For lexemes which are functions, the parsing phase 14 also determines and stores:

the number of arguments; and data type of each argument.

A preferred illustrative implementation of the parsing phase 14 is a left-recursive parser implemented using the compiler designated YACC. That compiler is described in Johnson, SC (1975) "YACC-Yet Another Compiler Compiler", *Computing Science Technical Report* 32, AT&T Bell Laboratories, Murray Hills, N.J.

A further feature of the preferred parsing phase 14 is to internally represent the equations of the target program not only with information in the symbol table as described but also as syntax trees. In general, an equation can be considered to be of the form:

LHS operand=RHS operand where the LHS operand is a lexeme or string of lexemes representing a model parameter, and the RHS operand is a string lexemes representing an expression. Two simple forms of expressions are:

<unary operator> <operands>; and

<operand> <binary operator> <operand>.

However, the definition of expression is recursive. Therefore, the operand(s) in an expression may themselves be expressions. In fact, generally the entire equation is itself an expression, since it is of the form:

<operand> <assignment operator> <operand>.

Syntax trees are commonly used to represent expressions. Syntax trees reflect the recursive nature of expressions. The construction of a syntax tree is similar to the translation of an expression into its postfix notation. Each subtree, i.e. node, in the syntax tree consists of a pointer to the operator and a pointer to each of the operands, and each operand may itself be a subtree. The record containing the pointer to the operator is termed the label, and the pointers to the operands are termed sons of the node. The operands in a subtree representing a binary operation, i.e. one involving an operator and two operands, are referred to as the left son and the right son of the subtree.

FIG. 2 provides a simplified representation of a symbol table that the flow diagramming tool according to the invention creates upon executing the lexical analysis and semantic analysis (parsing) phases 12 and 14 of FIG. 1, for the program expression listed below in Table I.

TABLE I

| | |
|---|---|
| E = 20 | (i) |
| C = F + G | (ii) |
| A = B + C | (iii) |
| B = D + E | (iv) |
| D = 10 | (v) |
| F = 30 | (vi) |
| G = 50 | (vii) |

The program expressions in Table I are elementary in context and of simplified syntax, and are provided only for illustration. The invention typically is practiced with programs containing far more complex statements and with hundreds if not many thousands or more expressions, rather than the illustrative seven in Table 1.

The symbol table representation of FIG. 2 includes a first, leftmost column 20 that contains each lexeme identified in the expressions of Table I and listed in the order in which they occur in the stated expressions.

The second column 22 of the symbol table, from the left, identifies the number of dependencies of each lexeme that is a variable. For example, the expression (i) in Table I specifies that the lexeme (E) is not variable, and the next expression (ii) identifies the lexeme (C) as being a variable dependent on two other lexemes. This information is summarized in the second column of the illustrated symbol table of FIG. 2.

The third column 24 from the left of the FIG. 2 table, designated Unresolved Dependencies, initially has the same information as the preceding column, headed "Variable Dependencies". The Unresolved Dependencies information in this third column changes during execution of the flow diagramming tool, as discussed below.

The fourth column 26 from the left in the illustrated table of FIG. 2 represents the graph nodes and arcs of the designated lexemes. The nodes represent model parameters, such as variables or constants, and each arc represents a relationship between two model parameters as specified by the target program. The arcs are considered to originate from the dependent parameter and to terminate at the independent parameter. Typically, the memory location for each graph node is allocated dynamically and the pointers to the node associated with a symbol, for all symbols whose type is "variable" or "constant" are stored within the symbol table entry. Also, the memory for each arc is dynamically allocated and pointers to the arc are stored within the node structure.

The graph node data structure preferably used in the practice of the invention principally contains the following fields:

a pointer to the parameter's symbol table entry;

a pointer to a linked list of arcs emanating from the node; and the number of dependencies associated with the node, and therefore the number of arcs emanating from the node.

Similarly, the arc structure principally contains the following fields:

a pointer to the next arc emanating from the same node, if any, and a pointer to the node associated with the destination symbol, i.e. the symbol representing the independent parameter.

The remaining two columns 28 and 30 of the FIG. 2 table, i.e. the rightmost two columns, designate respectively the destinations and origins of this arc structure.

Figure 3:
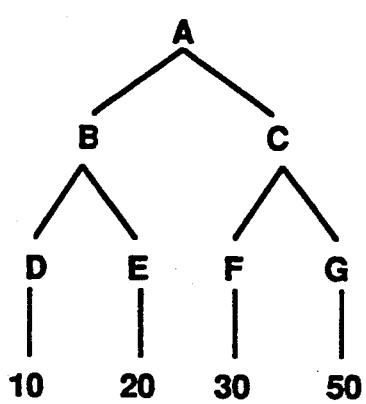
FIG. 3 shows a syntax tree corresponding to the information contained in the table of FIG. 2.

FIG. 3 illustrates a syntax tree that the flow diagram tool represented in FIG. 1 creates upon executing the lexical analysis and parsing phases 12 and 14, for the illustrative listing of program expressions in Table 1.

The program statements in Table 1 are listed not in the sequential order conventionally needed for evaluation. This is because the flow diagramming tool of FIG. 1 is able to establish precedence among programmed expressions independent and irrespective of the sequence in which they appear in the listing. The conventional evaluation of the Table 1 group of expressions proceeds through the list in sequential order, starting with expression (i) and proceeding to expression (vii). Upon encountering the second expression, i.e. expression (ii), the conventional evaluation would determine that the variable parameter (C) has a value of (0), because no other none zero values have previously been specified in the listing for the parameters (F) and (G) on which the parameter (B) depends. Similarly, upon encountering expression (iii), conventional evaluation would determine that (A) is equal to (0), because no prior non-zero values have been defined for the variable parameters (B) or (C) on which it depends. The same conventional evaluation would result for equation (iv).

The precedence establishing feature of the flow diagram tool of FIG. 1, on the other hand, evaluates the list of expressions in Table I only after establishing the precedence, i.e. the logically sequential order, according to which the expressions are to be evaluated.

The flow diagramming tool 10 of FIG. 1 executes these operations in the precedence evaluation phase 16.

The precedence evaluation phase 16, FIG. 1, of the illustrated flow diagramming tool determines the precedence of the programmed statements independent of the sequence in which they are written or listed. The precedence evaluation phase performs this operation in response to the context of the programmed statements. Further, this phase 16 of the illustrated flow diagramming tool can evaluate the programmed statements according to the precedential order which it determines.

More particularly, the precedence evaluation phase 16 in accordance with the invention determines, for each programmed statement such as each statement in Table I, the number of dependencies associated with each variable lexeme. A second step is to identify the specific dependencies for each variable lexeme. Both items of information are entered in the symbol table, as represented for example by the leftmost second and fifth columns 22 and 28, in FIG. 2.

A third step of the precedence evaluation phase is to evaluate each dependency and to report the resultant resolution to all variables that depend on it. The precedence evaluation phase continues this operation, in a repetitive manner, until all dependencies are resolved and all resultant information is reported to other variables. The precedence evaluation phase can then compute or otherwise evaluate any variable.

With specific reference to the illustrative list of program expressions in Table I, columns 22 and 28 of the table of FIG. 2 report the results of the foregoing first and second steps. That is, column 22 reports the results of the dependency determining first step, and column 28 reports the identification of the specific dependencies according to the second step.

In performing the third step, the illustrated precedence evaluation phase 16 examines the Unresolved Dependencies of the program variables as entered in the symbol table column 24 of FIG. 2.

A comparison with the Variable Dependencies entries in column 22 shows that the Unresolved Dependencies, column 24, are identical at the start of this third step. For each parameter associated with an entry having zero Unresolved Dependencies, the system identifies all other parameters that depend on the former parameter and decrements their respective number of Unresolved Dependencies. Thus, in a first iteration of the third step, the precedence evaluation routine examines the entries in the symbol table, in sequence, and determines that the parameter (E) has zero Unresolved Dependencies. The routine then determines that the parameter (E) is a factor in determining the parameter (B), pursuant to the statement (iv) in Table I and as listed in the Table 2 column 30 of arc origins. In response to this information, the routine decrements by one the number of unresolved dependencies, in column 24, assigned in the symbol table to the parameter (B).

Continuing the first iteration through the symbol table, the parameter (D) is the next one having zero variable dependencies and hence zero unresolved dependencies in column 24. The parameter (B) depends on that parameter, per listing statement (iv) in Table I and column 30 of FIG. 2. Accordingly, the number of unresolved dependencies assigned to the parameter (B) is again decremented, and accordingly now has the value zero. The further examination of the symbol table shows that the parameter (F) has zero variable dependencies, and that the variable (C) depends on that parameter, per program statement (ii). The number of unresolved dependencies assigned to the parameter (C) is accordingly decremented by one, from the initial value two to one.

Further examination of the symbol table, FIG. 2, recognizes that the parameter (G) has zero variable dependencies and that the parameter (C) depends on that parameter, per equation (ii). The number of unresolved dependencies assigned to the parameter (C) is accordingly decremented by one, to a zero value.

FIG. 4 repeats columns 20 and 24 of FIG. 2, and further shows, in column 24', the number of unresolved dependencies remaining for the symbol table of FIG. 2 after this first iteration of the third step of the precedence evaluation phase. As shown in that column 24', only the parameter (A) has a non-zero number of unresolved dependencies.

The routine for precedence evaluation again traverses the unresolved dependency entries in the symbol table and determines which parameters now designated as having zero unresolved dependencies previously had a non-zero number of unresolved dependencies. A comparison of the FIG. 4 columns 24 and 24' shows that these are parameters (C) and (D). In response, the routine determines that the parameter (C) is involved is in the evaluation of parameter(A) and accordingly decrements by one the number of unresolved dependencies assigned to parameter (A). In response to the parameter (B) now having zero unresolved dependencies whereas in the prior iteration it had a non-zero value, and in response to the dependency of the parameter (A) on that parameter (B), the routine decrements by one the number of unresolved dependencies assigned to the parameter (A).

At this juncture in the illustrated example, all parameters entered in the symbol table have zero unresolved dependencies, as reported in column 24" of FIG. 4. Moreover, the parameter (A) is the last one to be evaluated in this manner, and it can now be evaluated, in accordance with statement (iii) of the Table I listing. The precedence evaluation phase 16 can execute the evaluation, and uses the previously determined evaluations of the parameters (C) and (B), of which (A) is a function in accordance with statement (iii).

The following Table II sets forth a pseudo-code statement of the algorithms for establishing precedence in accordance with the steps discussed above. As apparent from the foregoing discussion and set forth in the Table II pseudo-code representation, it is seen that the precedence establishing sequence employs three nested loops of operations.

TABLE II

EstablishPrecedences
SymbolTableSize:= 1111;
FROM Bucket:= 1 TO Bucket:= SymbolTableSize DO
  BEGIN
    CurSymTabEntry:= SymbolTable[Bucket];
    WHILE (CurSymTabEntry <>NULL)
    BEGIN
        CurEquation = CurSymTabEntry→Equation;
        WHILE (CurEquation <>NULL)
          BEGIN
            GraphEquation (CurEquation);
            CurEquation = CurEquation→Next;
          END;
        CurSymTabEntry = CurSymTabEntry→Next;
    END;
  END;
GraphEquation
IF (Symbol on LHS of Equation has a Node (Entry→Node))
  THEN BEGIN
    DestinationHeader = Entry→Node;
  END
  ELSE BEGIN
    Allocate memory for and initialize the Node structure
    'Destination Header';
  END;
Call AuxGraphInitVals
  AuxGraphEquation (DestinationGraphNode,
    EquationSyntaxTree)
  DependentParameter =
    DestinationGraphNode→Symbol→Name,
  IndependentParameter =
    EquationSyntaxTree→Symbol→Name;
  IF (DependentParameter = IndependentParameter)
    RETURN;
  AuxGraphEquation (DestinationGraphNode,
    EquationSyntaxTree→LSon);
  AuxGraphEquation (DestinationGraphNode,
    EquationSyntaxTree→RSon);
  IF (EquationSyntaxTree→Symbol→
    Type == FUNCTION)
    THEN.BEGIN
      FOR I FROM 1 TO NumberOfArgumentsTo
        Function) DO
          AuxGraphEquation (DestinationGraphNode,
            EquationSyntaxTree→Node[I]);
    END
  ELSE IF (EquationSyntaxTree→Symbol→Type I=
    VARIABLE)
    RETURN;
  IF (Graph Node already exists for the
  independent parameter)
    THEN Assign it to SourceGraphNode
    ELSE Create a SourceGraphNode;
  Call FindArc to check if the relationship between the
  dependent parameter and the independent parameter has
  already been established. If so RETURN. If not create a TABLE II-continued new arc and establish the precedences.

With further reference to the flow chart of FIG. 1, upon completion of the precedence establishing phase 16, the illustrated flow diagramming tool proceeds to the output phase 18. In an illustrated embodiment of this output phase, and in view of the fact that all precedences have been established for the statements of the target program, the flow diagramming tool traverses the symbol table of FIG. 2 to identify the entry in column 20 associated with the parameter that is of interest to the user, in response to a user designation. The output phase uses the precedence information stored in the symbol table and creates a flow diagram using, for example, the algorithm set forth below in Table III, in the same pseudo-code of Table II.

TABLE III

Display Graph (ParameterName, TraversalDepth)

Look up the symbol table for the entry associated with the specified parameter
Identify the number of parameters on which ParameterName is dependent
IF (ParameterName is not dependent on any parameters) OR
(Traversal depth has been exceeded)
  THEN BEGIN
    Draw ParameterOnScreen (ParameterName);
    RETURN;
  END;
Call DisplayGraph recursively for each parameter on which
ParameterName is dependent.

A portion of the disclosure of this patent document contains material which is subject to copyright protection. The copyright owner has no objection to the facsimile reproduction of copyrighted portions of the patent disclosure, as it appears in the Patent and Trademark Office patent files or records, and otherwise reserves all copyright rights whatsoever.

It will thus be seen that the objects set forth above, among those made apparent from the preceding description, are efficiently attained. Since certain changes may be made in the above method without departing from the scope of the invention, it is intended that all matter contained in the above description or shown in the accompanying drawings be interpreted as illustrative and not in a limiting sense.

It is also to be understood that the following claims are intended to cover all generic and specific features of the invention herein described, and all statements of the scope of the invention which, as a matter of language, might be said to fall therebetween.

Appendix

The following Appendix presents program listings for the following computer program files. These files implement a flow diagramming tool as described above in accordance with the ACCESS programming language as available under license from Devonrue Ltd. of Boston, Mass. That programming language is similar to the well-known PASCAL and C computer languages and to the DYNAMO language of Pugh-Roberts Associates.

A brief description of the programming files in this Appendix follows.

| File Name | Purpose |
|---|---|
| doc.h | Header file containing type definitions, data structure definitions and constant definitions used for graphically displaying the tree structures using OSF/Motif. |
| local_fns.c | Contains functions necessary for graphically displaying the tree structures using OSF/Motif. |
| functions.c | Contains support functions used by the flow diagramming tool. |
| common_graph.c | Contains functions used for reordering the equations. |
| local_graph.c | Contains functions used in handling Macro calls in the model equations file. |
| access.h | Header file containing type definitions data structure definitions and constant definitions used by the lexical analyzer and the parser. |
| access.1 | "lex" specification for the lexical analyzer. This file is used as input by "lex" whose output is the "C" source code for the lexical analyzer. |
| support_fns.c | Contains support functions used by the lexical analyzer and the parser. |
| access.y | "yacc" specification for the parser. This file is used as input by "yacc" whose output is the "C" source code for the parser. |
| compatability.h | contains code that permits porting of code between UNIX locations supplied by different vendors |

APPENDIX

The Appendix follows and this page.

```
COPYRIGHT    1991 DEVONRUE, LTD.        ACCESS Flow Diagramming Utility              local_graph.c
PROPRIETARY & CONFIDENTIAL                                                           3 December 1991

/******************************************/
/*      FILE: local_graph.c              */
/*      COPYRIGHT  1991, DEVONRUE, LTD.  */
/*      ALL RIGHTS RESERVED.             */
/******************************************/ include <stdio.h>
include <string.h>
include "../latest_parser/prophet.h"
#include "proto.h"

/* External variables */
extern int      InMACRO,
                ErrorFound;
extern FILE     *DocErrorFile;
extern SymTabEntryPtr MainSymTab[],
                MacroSymTab[];

void
SortNEquations ()
{
    int             I,
                    Done = 1;
    SymTabEntryPtr  Cur;
    ArcNodePtr      NextArc,
                    CurArc;
    static int      Same = 0;

for (I = 0; I < MAX_SYM_TABLE_SIZE; I++)
    {
        if (InMACRO == FALSE)
            Cur = MainSymTab[I];
        else
            Cur = MacroSymTab[I];

while (Cur != NULL)
        {
            if (((Cur->Type == VARIABLE) || (Cur->Type == CONSTANT)) && (Cur->GraphNode != NULL))
            {
                if ((Cur->Type == VARIABLE) && (Cur->DataType == INTEGER))
                {
                    Cur->Visited = 1;
                }
                if ((Cur->GraphNode->NumPred == 0) && (Cur->Visited != 1))
```

```c
                    Same = 0;
                    Cur->Visited = 1;

CurArc = Cur->GraphNode->FirstArc;
                    while (CurArc != NULL)
                    {
                        NextArc = CurArc->NextArc;
                        CurArc->DestHeader->NumPred--;
                        CurArc = NextArc;
                    }
                }
                else if ((Cur->Visited != 1) && (Cur->GraphNode->NumPred > 0) && ((Cur->Type == VARIABLE) || (Cur->Type == CONSTANT)))
                {
                    Done = 0;
                }
                Cur = Cur->Next;
            }
            if (Same == 1)
            {
                fprintf (DocErrorFile, "Simultaneous Initial value equations detected among:\n");
                for (i = 0; i < MAX_SYM_TABLE_SIZE; i++)
                {
                    if (inMACRO == FALSE)
                        Cur = MainSymTab[i];
                    else
                        Cur = MacroSymTab[i];
                    while (Cur != NULL)
                    {
                        if ((Cur->Type == VARIABLE) || (Cur->Type == CONSTANT))
                            if (Cur->GraphNode != NULL)
                            {
                                if ((Cur->Visited != 1) && (Cur->GraphNode->NumPred > 0))
                                    fprintf (DocErrorFile, "%s %d\n", Cur->Name, Cur->GraphNode->NumPred);
                            }
                        Cur = Cur->Next;
                    }
                }
                fclose (DocErrorFile);
                exit (-1);
            }
            else if (Done != 1)
            {
                Same = 1;
                SortNEquations ();
            }
        }
```

```c
void NewGenerateCode ()
{
    int         I,
                J;
    SymTabEntryPtr  Cur;

/* Make sure all variables and constants are defined */
    for (I = 0; I < MAX_SYM_TABLE_SIZE; I++)
    {
        Cur = MainSymTab[I];
        while (Cur != NULL)
        {
            if ((((Cur->Type == VARIABLE) || (Cur->Type == UNINITIALIZED)) && (Cur->DataType != INTEGER) && ((Cur->ActiveValEquation
== NULL) && (Cur->InitValEquation == NULL)) ||
                ((Cur->Type == CONSTANT) && (Cur->InitValEquation == NULL)))
            {
                if ((strcmp (Cur->Name, "ABS_ERR") != 0) &&
                    (strcmp (Cur->Name, "CMP_N_1") != 0) &&
                    (strcmp (Cur->Name, "PLTPER") != 0) &&
                    (strcmp (Cur->Name, "LENGTH") != 0) &&
                    (strcmp (Cur->Name, "DT") != 0) &&
                    (strcmp (Cur->Name, "PRTPER") != 0) &&
                    (strcmp (Cur->Name, "REL_ERR") != 0) &&
                    (strcmp (Cur->Name, "SAVPER") != 0) &&
                    (strcmp (Cur->Name, "NS_SEED") != 0) &&
                    (strcmp (Cur->Name, "TIME") != 0) &&
                    (Cur->WhereFrom != DEF) &&
                    (Cur->WhereFrom != EXOGENOUS))
                {
                    if (Cur->Comment != NULL)
                        fprintf (DocErrorFile, "ERROR: %s \"%s\" not defined.\n", Cur->Name, Cur->Comment);
                    else
                        fprintf (DocErrorFile, "ERROR: %s not defined.\n", Cur->Name);
                    ErrorFound = TRUE;
                }
            }
            Cur = Cur->Next;
        }
    }

/* PRINT OUT THE CONSTANTS (**** is this even needed?) */
    for (I = 0; I < MAX_SYM_TABLE_SIZE; I++)
    {
        Cur = MainSymTab[I];
        while (Cur != NULL)
        {
            if (Cur->Type == CONSTANT)
            {
                if (Cur->DataType == DOUBLE)
```

```c
            }
            else if (Cur->DataType == DOUBLE_ARRAY)
            {
                if (Cur->Macro != NULL)
                {
                    if (Cur->AddInfo != NULL)
                    {
                        for (J = 0; J < Cur->AddInfo->ArrayInfo.NumDimensions; J++)
                        {
                            Cur->AddInfo->ArrayInfo.DimensionSize[J] = (Cur->AddInfo->ArrayInfo.DimensionSize[J] >
0) ? Cur->AddInfo->ArrayInfo.DimensionSize[J] : MAX_ARRAY_SIZE;
                        }
                    }
                }
                if (Cur->AddInfo != NULL)
                {
                    for (J = 0; J < Cur->AddInfo->ArrayInfo.NumDimensions; J++)
                    {
                        Cur->AddInfo->ArrayInfo.DimensionSize[J] = (Cur->AddInfo->ArrayInfo.DimensionSize[J] > 0) ?
Cur->AddInfo->ArrayInfo.DimensionSize[J] : MAX_ARRAY_SIZE;
                    }
                }
            }
            Cur->GraphNode = NULL;
            Cur->Visited = 0;
            Cur = Cur->Next;
        }
    }

/* PRINT OUT THE VARIABLES (**** is this even needed?) */ for (I = 0; I < MAX_SYM_TABLE_SIZE; I++)
    {
        Cur = MainSymTab[I];
        while (Cur != NULL)
        {
            if (Cur->Type == VARIABLE)
            {
                if (Cur->DataType == DOUBLE)
                {
                }
                else if (Cur->DataType == DOUBLE_ARRAY)
                {
                    if (Cur->Macro != NULL)
                    {
                        if (Cur->AddInfo != NULL)
                        {
                            for (J = 0; J < Cur->AddInfo->ArrayInfo.NumDimensions; J++)
```

```c
                0) ? Cur->AddInfo->ArrayInfo.DimensionSize[J] : MAX_ARRAY_SIZE;
Cur->AddInfo->ArrayInfo.DimensionSize[J] = Cur->AddInfo->ArrayInfo.DimensionSize[J];
            }
            if (Cur->AddInfo != NULL)
            {
                for (J = 0; J < Cur->AddInfo->ArrayInfo.NumDimensions; J++)
                    Cur->AddInfo->ArrayInfo.DimensionSize[J] = (Cur->AddInfo->ArrayInfo.DimensionSize[J] > 0) ?
                        Cur->AddInfo->ArrayInfo.DimensionSize[J] : MAX_ARRAY_SIZE;
            }
        }
        Cur->GraphNode = NULL;
        Cur->Visited = 0;
        Cur = Cur->Next;
    }
}

/* CHECK THAT ALL LEVEL AND RATE VARIABLES HAVE N EQUATIONS. SET UP DEPENDENCY GRAPH FOR N EQUATIONS. */ for (I = 0; I < MAX_SYM_TABLE_SIZE; I++)
{
    Cur = MainSymTab[I];
    while (Cur != NULL)
    {
        if ((Cur->Type != OPERATOR) && (Cur->Type != NUMBER) && (Cur->Type != FUNCTION) && (Cur->Type != MACROTYPE))
        {
            if (Cur->InitValEquation == NULL)
                Cur->InitValEquation = Cur->ActiveValEquation;
            if (Cur->Type == CONSTANT)
                Cur->ActiveValEquation = Cur->InitValEquation;
            if (Cur->InitValEquation != NULL)
                GraphInitVals (Cur->InitValEquation);
        }
        Cur = Cur->Next;
    }
}

SortNEquations ();

/* CONSTRUCT DEPENDENCY GRAPH FOR LEVEL EQUATIONS */ for (I = 0; I < MAX_SYM_TABLE_SIZE; I++)
{
    Cur = MainSymTab[I];
```

```c
        while (Cur != NULL)
        {
            if ((Cur->Type != OPERATOR) && (Cur->Type != NUMBER) && (Cur->Type != FUNCTION) && (Cur->Type != MACROTYPE))
            {
                if (Cur->ActiveValEquation != NULL)
                    GraphLevels (Cur->ActiveValEquation);
            }
            Cur = Cur->Next;
        }

/* CONSTRUCT DEPENDENCY GRAPH FOR OTHER EQUATIONS */
for (I = 0; I < MAX_SYM_TABLE_SIZE; I++)
{
    Cur = MainSymTab[I];
    while (Cur != NULL)
    {
        if ((Cur->Type != OPERATOR) && (Cur->Type != NUMBER) && (Cur->Type != FUNCTION) && (Cur->Type != MACROTYPE))
        {
            if (Cur->ActiveValEquation != NULL)
                GraphRest (Cur->ActiveValEquation);
        }
        Cur = Cur->Next;
    }
}

/*********************************************/
/*    FILE: access.h                         */
/*    COPYRIGHT    , 1991, DEVONRUE, LTD.    */
/*    ALL RIGHTS RESERVED.                   */
/*********************************************/ include "../latest_parser/compatibility.h"

define DEFAULT_TEMP_FILE_NAME ".equations_temp"    /* filename of temporary file.  All the input files are
                                                     * concatenated into this temporary file, and after the
                                                     * program is finished, this file is deleted. */ define MAX_LENGTH_OF_SOURCE_LINE   512    /* Number of characters allowed in a line in a .phm file */ define DOC_ERROR_FILE      ".errors.doc"      /* For documentor - filename of English description of errors */
define ERROR_LOG_FILE      ".ErrorFile.dat"   /* Coded info about what errors happened during parsing */
#define WIDTH               132
#define OUTPUT_FILE         "variables.doc"    /* Output from doc2 - not normally needed; it is an ASCII duplicate of
                                                * an expanded variable */ define MAX_SYM_TABLE_SIZE  2111    /* Maximum number of "buckets" in a symbol table */
define MAX_ARGUMENTS       10      /* Maximum number of arguments permitted in a function call */
#define MAX_ERRORS          10      /* Number of errors after which parser aborts compilation */
#define MAX_ELEMENTS        110     /* Maximum number of elements in array or function
                                     * (whichever is larger) */
#define MAX_STACK           200     /* Maximum number of elements in stack */
#define MAX_TABLE_CELLS     110     /* Maximum number of values allowed in a table. */
#define MAX_DIMENSIONS      7       /* Maximum number of dimensions in an array */
```

```
#define TEMP_STNODE_LIMIT        220      /* CW 9-10-90 added-Max size of Temp array (i.e. max size of
                                           * table,E equation,SAVE,etc. */
#define MAX_NESTING              110      /* CW 9-13-90 added - Max nesting depth of functions/arrays */
#define MAX_ARRAY_SIZE           110      /* Maximum size of each index in an array */
#define THIRD_ARRAY_SIZE         15       /* Maximum size of each index in an array */
#define MAX_LOCAL_VARS           20       /* Maximum number of local variables in a macro */
define MAX_BUF_LENGTH           256      /* maximum size of a fixed length string */ define MAX_NESTED_FOR           3        /* CW 1-22-91 added */
define MAX_GRAPH_STACK          1000     /* CW 1-22-91 added */
#ifndef TRUE
#define TRUE                     1        /* Boolean values */
#endif
#ifndef FALSE
#define FALSE                    0
#endif
/* NOTE: TEMP_STNODE_LIMIT *must* be greater than MAX_ARGUMENTS,MAX_DIMENSIONS,and MAX_TABLE_CELLS,or program may crash! */
/****************************** TYPE DEFINITIONS *************************************************/

/* Added for debugger by CW on 7/3/91 */
typedef enum DebugModeTypeEnum ( INITIALIZING, IDLE, RUN, STOP, STEP_, TERMINATE ) DebugModeType;
            TokenDataType;
                                                /* Indicates what mode the debugger is currently in. */
typedef enum BreakTypeEnum ( NOBREAK, BREAK ) BreakType;  /* BREAK means stop at this equation when reached */

/* Added CW 6/21/91 "IDUNNO" type which means it is not sure if it is a DOUBLE or a DOUBLE_ARRAY */
typedef enum TokenDataTypeEnum
(
    UNINITIALIZED, INTEGER, FLOAT, LONG, DOUBLE, IDUNNO, CHARACTER, STRING_TYPE, BOOLEAN, DOUBLE_ARRAY
        TokenDataType;
) TokenTypeEnum;

UNINITIALIZED2, CONSTANT, FUNCTION, LITERAL, PARAMETER, VARIABLE, NUMBER, OPERATOR, FOR_VARIABLE, MACROTYPE
        TokenType;
) TokenType;
typedef enum VariableTypeEnum
(
    UNINITIALIZED3, AUX, LEVEL, RATE, VTYPE
        VariableType;
) VariableType;
typedef enum OperatorTypeEnum
(
    POWER, PRODUCT, DIV, MOD, PLUS, MINUS
        OperatorType;
) OperatorType;

/* Modified CW 8/14/91 to add Z_TYPE */
typedef enum WhereFromEnum
(
    UNINITIALIZED4, COMPUTED, EXOGENOUS, QUERY, Z_TYPE, DEF
        WhereFromType;
) WhereFromType;
typedef enum TEquationTypeEnum
(
    UNINITIALIZED5, LEVELTYPE, AUXTYPE, RATETYPE, SUPPLEMENTARYTYPE, CONSTANTTYPE
        TEquationType;
) TEquationType;
```

```
typedef union AddInfoUnion AddInfoType,
    *AddInfoPtr;

typedef struct AddLoopIndexStruct AddLoopIndexInfo,
    *AddLoopIndexInfoPtr;
/* SYMBOL TABLE ENTRY */ typedef struct SymTableEntryStruct SymTabEntry,
    *SymTabEntryPtr;

typedef struct SpecialEntryStruct SpecialEntry,
    *SpecialEntryPtr;

/* SYMBOL TABLE */
typedef SymTabEntryPtr SymbolTable[MAX_SYM_TABLE_SIZE];

/* SYNTAX TREE NODE */
typedef struct STNodeStruct STNode,
    *STNodePtr;

/* ADDITIONAL FUNCTION/ARRAY USAGE INFORMATION STRUCTURE FOR SYNTAX TREE NODES */ typedef struct AddSyntaxTreeInfoStruct AddSyntaxTreeInfo,
    *AddSyntaxTreeInfoPtr;

/* ADDITIONAL FUNCTION INFORMATION */ typedef struct AddFunctionInfoStruct AddFunctionInfo,
    *AddFunctionInfoPtr;

/* Added CW 6/21/91 */
typedef struct AddForInfoStruct AddForInfo,
    *AddForInfoPtr;

/* ADDITIONAL VARIABLE INFORMATION STRUCTURE */
typedef struct AddVariableInfoStruct AddVariableInfo,
    *AddVariableInfoPtr;

/* EQUATIONS */
typedef struct EquationStruct EquationType,
    *EquationPtr;

typedef struct HeaderNodeStruct HeaderNode,
    *HeaderNodePtr;

typedef struct ArcNodeStruct ArcNode,
    *ArcNodePtr;

typedef struct GraphStackStruct GraphStackType;

/* For graphing functions */
struct HeaderNodeStruct
```

```
        SymTabEntryPtr  Symbol;
        ArcNodePtr      FirstArc;       /* Pointer to first arc emnating from this header node */
        HeaderNodePtr   NextHeader;     /* Pointer to next header in hash bucket */
        short           NumPred;        /* Number of predecessor variables on which this node is
                                         * dependent */
        short           NumPermPred;
};
/* For graphing functions */
struct ArcNodeStruct
{
        ArcNodePtr      NextArc;
        HeaderNodePtr   DestHeader;
        short           FnFlag;         /* If 1, will be removed in attempts to break precedence */
};

/* SYMBOL TABLE ENTRY STRUCTURE */ struct SymTableEntryStruct
{
        char            *Name;
        short           Visited;
        short           PrintType;
        VariableType    VarType;        /* Info about how the variable is to be printed */
        TokenType       Type;
                                        /* Identifies whether the token is an identifier, operator,
                                         * or number */
        TokenDataType   DataType;       /* Identifies the data type associated with the token, if
                                         * applicable, NULL otherwise */
        WhereFromType   WhereFrom;      /* Identifies if the value is obtained from a file, a query,
                                         * or computed */
        TEquationType   EquationType;   /* Identifies the type of this equation */
        AddInfoType     *AddInfo;       /* Pointer to additional information associated with token,
                                         * if any */
        EquationPtr     InitValEquation,/* Pointer to equation for computing initial value */
                        ActiveValEquation; /* Pointer to equation for computing active value */
        HeaderNodePtr   GraphNode;      /* Pointer to graph node for this symbol */
        SymTabEntryPtr  Next;           /* Pointer to next entry in bucket */
        SymTabEntryPtr  Macro;
        char            *Comment;       /* For documentor - Added to store comment from .def file */
/*      double          Value;  */     /* Added CW 6/24/91 for debugger */
/*      double          *AValue; */    /* Added CW 6/26/91 for debugger - "fake" array values */
/*      BreakType       Break;  */     /* Added for debugger */
};

/* Added for debugger by CW 7/3/91 */
/* Stores a list of "watch variables" to update after each stop or break */
typedef struct WatchVarListStruct WatchVarList, *WatchVarListPtr;
struct WatchVarListStruct
{
        SymTabEntryPtr  Symbol;
        WatchVarListPtr Next;
};

/* Used as an element in the FunctionEntry[] array, which stores current location of parser in each nested function call */
```

```c
struct SpecialEntryStruct {
    SymTabEntryPtr  Entry;  /* symbol table entry last parsed in this function call */
    int             Count;  /* argument count that we are in inside the function call */
};

/* Additional array Information; number of dimensions and size of each dimension */
struct AddArrayInfoStruct
{
    short   NumDimensions;
    short   DimensionSize[MAX_DIMENSIONS];   /* DimensionSize[i] = Number of cells in dimension 'i' */
};

/* ADDITIONAL FUNCTION INFORMATION STRUCTURE */
struct AddFunctionInfoStruct
{
    short           NumLocalVars;               /* Number of local vars in a macro definiton */
    short           NumArguments;               /* Number of arguments in function call */
    short           LocVarTypes[MAX_LOCAL_VARS]; useless? */
         ID;                                    /* Stores ID of function for faster access */
    TokenDataType   ArgumentType[MAX_ARGUMENTS];   /* ArgumentType[i] = TokenType of argument 'i' */
    SymTabEntryPtr  Arguments[MAX_ARGUMENTS];   /* Pointer to symbol table entry of each argument */
    char            *LocalVars[MAX_LOCAL_VARS]; /* Names of local variables in macro */
};

/* Added CW 6/21/91 - additional FOR variable information - (is it used anymore?) */
struct AddForInfoStruct
{
    SymTabEntryPtr  Entry;
    AddForInfoPtr   Next;
};

/* ADDITIONAL LOOP INDEX INFORMATION STRUCTURE */
struct AddLoopIndexStruct
{
    int     LowLimit,                           /* low limit of FOR variable loop */
            HighLimit,                          /* high limit of FOR variable loop */
            CurVal;                             /* Number of arguments */
};

/* ADDITIONAL VARIABLE INFORMATION STRUCTURE - not used? */
struct AddVariableInfoStruct
{
    VariableType    VarType;
    int             EvalOrder;
};

/* ADDITIONAL SYMBOL TABLE INFORMATION UNION */
union AddInfoUnion
{
    AddFunctionInfo     FunctionInfo;
    struct AddArrayInfoStruct ArrayInfo;
    AddVariableInfo     VariableInfo;
    AddLoopIndexInfo    LoopIndexInfo;
    AddForInfo          ForInfo;
};
```

```c
/* additional information for a STNodePtr.  Used only for arrays and function calls. */
struct AddSyntaxTreeInfoStruct
{
    int         NumElements;              /* Number of arguments/indexes */
    STNodePtr   Nodes[MAX_DIMENSIONS];    /* Array of syntax trees to store parameters/indexes */
};

/* Element in the "graph stack" array, which while generating code it stores up a group of equations;to put under a single FOR
   loop structure */
struct GraphStackStruct
{
    EquationPtr  Equation;        /* Pointer to equation */
    char         *ForVariables;   /* Concatenated list of FOR variables in this equation, separated by "," */
};

/* SYNTAX TREE NODE STRUCTURE */
struct STNodeStruct
{
    SymTabEntryPtr        Symbol;     /* Pointer to symbol table entry */
    STNodePtr             LSon,       /* Left branch */
                          RSon;       /* Right branch */
    AddSyntaxTreeInfoPtr  AddInfo;    /* Pointer to additional information pertaining to parent(if
                                       * any) */
                                      /* Added 6/22/91 by CW to make errors reported in accurate locations */
    char                  ErrColumn;
};

/* Stores info about each equation, including a pointer to that equation (the STNodePtr) */
struct EquationStruct
{
    short           NumLoops;                  /* Number of FOR vars in the equation */
    short           IsActive;                  /* Is it Active or Initial value? - For Documentor */
    short           NoOfLines;                 /* Number of lines in .phm file for this equation - For Documentor */
    char            Letter;                    /* Letter code indicating equation type - For Documentor */
    int             LineNo;                    /* Line number in .phm file that equation was from - For Documentor */
    SymTabEntryPtr  Loops[MAX_NESTED_FOR];     /* Symbol table entry for each FOR variable in equation */
    STNodePtr       Equation;                  /* The equation tree */
    double          EquationNo;                /* Machine-generated equation number - For Documentor */
    EquationPtr     Next;
};
/* Beginning of more documentor stuff */

/* Linked list of all the lines (in syntax tree format), in the order they are in the .phm file */
typedef struct LineListStruct *LineListPtr;
struct LineListStruct
{
    EquationPtr  Equation;
    LineListPtr  Next;
};
/* Type of the binary tree to store information about equations involving FOR variables */
typedef struct BTreeStruct *BTreePtr;

/* Type for a linked list of equations */
typedef struct EquationsStruct *EquationsPtr;
```

```c
struct EquationsStruct
{
    EquationPtr    Equation;              /* A single equation */
    EquationsPtr   Next;
};

/* Binary search tree used for FOR loop optimization */
struct BTreeStruct
{
    char           *AllNames;             /* String that consists of all var names combined into one
                                           * string (used for sorting) */
    EquationsPtr   Equations;             /* List of equations that use these variables */
    BTreePtr       LSon;
    BTreePtr       RSon;
};

/* FOR DOCUMENTOR */
/* Linked list of variables in the model */
typedef struct VarListStruct *VarListPtr;
struct VarListStruct
{
    SymTabEntryPtr Symbol;
    VarListPtr     Next;
};

/* Binary search tree of symbols */
typedef struct SymbolBTreeStruct *SymbolBTreePtr;
struct SymbolBTreeStruct
{
    SymTabEntryPtr Symbol;
    SymbolBTreePtr LSon,
                   RSon;
};

/* Linked list of equations and how far to indent each equation */
typedef struct EquationListStruct *EquationListPtr;
struct EquationListStruct
{
    EquationPtr    Equation;
    int            IndentCount;
    EquationListPtr Next;
};

/* end of doc stuff */

/* Added CW 8/5/91 to do macros the new way */
typedef struct MacroListStruct *MacroListPtr;
typedef struct MacroLinesStruct *MacroLinesPtr;
struct MacroListStruct {
    MacroLinesPtr  MacroLines;            /* Lines that make up this macro */
    SymTabEntryPtr Macro;                 /* Symbol table entry created for this macro definition */
    MacroListPtr   Next;                  /* Next macro */
};

struct MacroLinesStruct {
```

```
        STNodePtr       Node;           /* Tree for this equation */
        int             AI;             /* Active or initial value equation? */
        MacroLinesPtr   Next;
};

typedef struct SymbollistStruct         *SymbolListPtr;
typedef struct StringListStruct         *StringListPtr;
struct SymbolListStruct (
        SymTabEntryPtr  Symbol;
        SymbolListPtr   Next;
);

struct StringListStruct
(
        char            *Line;
        StringListPtr   Next;
);

/* Linked list of all FOR variables in the model */
typedef struct ForListStruct ForListType, *ForListPtr;
struct ForListStruct
(
        char            *ForVariable;   /* Name of FOR variable */
        AddForInfoPtr   Info;           /* Additional FOR variable info - variables on rhs of its definition */
        ForListPtr      Next;
);

/* Defines enumerated type for the recover strategy when a parse error is found. Used in function parse_error() */
typedef enum
(
        DIE, CONTINUE, FLUSH, WARNING
        recover_strategy;
);

/* Sorted Linked list of equations */
typedef struct SortedEquationStruct SortedEquationType, *SortedEquationPtr;
struct SortedEquationStruct
(
        EquationPtr     Equation;
        char            *ForVariables;  /* Code to represent FOR variable grouping */
        SortedEquationPtr Next;
);

/*********************************** FUNCTION PROTOTYPES ***********************************/

/* External declarations */
#ifdef SUN
extern char     *CheckAlloc ();
extern AddSyntaxTreeInfoPtr NewSTAddInfo ();        /* Get memory for STAddInfo field */
extern AddInfoPtr NewSymTabAddInfo ();              /* Get memory for Symbol Table AddInfo field */
```

```
extern int         PrintHeaders ();                              /* Print out header info to file */
extern SymTabEntryPtr InsertInSymTab ();                         /* Insert token in symbol table */
extern SymTabEntryPtr LookUpSymTab ();                           /* Look up token in symbol table */
extern SymTabEntryPtr LookUpMacroTab ();                         /* Look up token in macro symbol table */
extern SymTabEntryPtr LookUpMainTab ();                          /* Look up token in main symbol table */
extern SymTabEntryPtr ForcedInsInMacroTab ();
extern STNodePtr   MakeLeafNode ();                              /* Make leaf node of an equation tree */
extern STNodePtr   MakeIntNode ();                               /* Make internal node of an equation tree */
extern STNodePtr   Pop ();                                       /* Pop value from STNode stack */
extern STNodePtr   SPop ();                                      /* Pop value from STNode stack */
extern int         Push ();                                      /* Push value onto STNode stack */
extern void        PrintSyntaxTree ();                           /* Print a tree in a C-ish format */
extern void        NewGenerateCode ();

extern char        *strdup ();                                   /* Here because <string.h> file messes up */
extern int         yyerror ();
extern int         HashSymTab ();
extern int         EvaluateIndex ();
extern int         EvaluateDimension ();
extern double      EvaluateConstant ();
extern ArcNodePtr  NewArc ();
extern void        PrintOutErrors ();
#endif
ifndef SUN
extern char        *CheckAlloc (int);
extern AddInfoPtr  AddSyntaxTreeInfoPtr NewSTAddInfo ();         /* Get memory for STAddInfo field */
extern AddInfoPtr  NewSymTabAddInfo ();                          /* Get memory for Symbol Table AddInfo field */
extern int         PrintHeaders (FILE * fp);                     /* Print out header info to file */
extern SymTabEntryPtr InsertInSymTab (char *);                   /* Insert token in symbol table */
extern SymTabEntryPtr LookUpSymTab (char *);                     /* Look up token in symbol table */
extern SymTabEntryPtr LookUpMacroTab (char *);                   /* Look up token in macro symbol table */
extern SymTabEntryPtr LookUpMainTab (char *);                    /* Look up token in main symbol table */
extern SymTabEntryPtr ForcedInsInMacroTab (char *);
extern STNodePtr   MakeLeafNode (char *);                        /* Make leaf node of an equation tree */
extern STNodePtr   MakeIntNode (char *, STNodePtr, STNodePtr);   /* Make internal node of an equation tree */
extern STNodePtr   Pop ();                                       /* Pop value from STNode stack */
extern STNodePtr   SPop ();                                      /* Pop value from STNode stack */
extern int         Push (STNodePtr);                             /* Push value onto STNode stack */
extern void        PrintSyntaxTree (FILE *, STNodePtr);          /* Print a tree in a C-ish format */
extern void        NewGenerateCode ();

extern char        *strdup (char *);                             /* Here because <string.h> file messes up */
extern int         yyerror (char *);
extern int         HashSymTab (char *);
extern int         EvaluateIndex (STNodePtr);
extern int         EvaluateDimension (STNodePtr);
extern double      EvaluateConstant (STNodePtr);
extern ArcNodePtr  NewArc ();
extern void        PrintOutErrors ();
#endif
/**************************************************/
/*     FILE: local_fns.c                          */
/*     COPYRIGHT   1991, DEVONRUE, LTD.           */
/*     ALL RIGHTS RESERVED.                       */
/**************************************************/ include <stdio.h>
```

```c
#include <math.h>
#include <ctype.h>
#include <string.h>
#include <malloc.h>
#include "../latest_parser/prophet.h"
#include "doc.h"

int UtilityMode=1;

extern FILE *DocErrorFile;
char FirstFile[MAX_BUF_LENGTH];
extern char DefinitionsFile[];
extern FILE *yymyin;
extern char InputFile[];
extern int atoof;
extern FILE *ErrorFile;
extern int ErrorFound;

int            MaxLevels;

/* prototypes */
void main (int argc, char **argv);

#ifdef SUN
void main (argc, argv)
        int        argc;
        char       **argv;
#endif
ifndef SUN
void main (int argc, char **argv)
#endif
{
        int    len;
        FILE   *dummy_fp;

/* BEGINNING OF CODE USED TO PREPARE PROGRAM BEFORE ACCEPTING USER INPUT */ if ((DocErrorFile = fopen (DOC_ERROR_FILE,"w")) == NULL) {
                fprintf (stderr, "%s: Could not open for write access the documentor error file %s.\n", argv[0], DOC_ERROR_FILE);
                exit(-1);
        } if (argc != 4) {
                fprintf (DocErrorFile, "Usage: %s source-file variable #levels\n", argv[0]);
                fprintf (DocErrorFile, "       source-file is the '.phm' file\n");
                fprintf (DocErrorFile, "       variable is the variable name\n");
                fprintf (DocErrorFile, "       #levels is the number of levels to expand to\n");
                fclose (DocErrorFile);
                exit(-1);
        }

/* Clear output file of any old data, in case an error occurs before anything is written to this file */
        if ((dummy_fp = fopen(OUTPUT_FILE, "w")) == NULL) {
                fprintf (DocErrorFile, "%s: Could not open output file %s.\n", argv[0], OUTPUT_FILE);
```

```
            fclose (DocErrorFile);
            exit (-1);
        }
        fclose (dummy_fp);

InitializeSymbolTable ();
        InitializeGeneral ();

strcpy(FirstFile,ConcatenateInputFiles(argv[1]));

/* remove ".phm" from end of file name */
        len=strlen(FirstFile);
        if ((len<5) || (strcmp(&FirstFile[len-4],".phm") != 0)) {
            fprintf (DocErrorFile, "%s: source file name must have '.phm' suffix.\n",argv[0]);
            fclose (DocErrorFile);
            exit (-1);
        }

/* add ".def" to end of filename */
        strcpy(DefinitionsFile,"");
        strncat(DefinitionsFile,FirstFile,len-4);
        strcat(DefinitionsFile,".def");

if ((yyin = fopen (InputFile, "r")) == NULL) {
            fprintf (DocErrorFile, "%s: Could not open equations file %s.\n", argv[0], InputFile);
            fclose (DocErrorFile);
            exit (-1);
        } if ((ErrorFile = fopen (ERROR_LOG_FILE,"w")) == NULL) {
            fprintf (DocErrorFile, "%s: Could not open for write access the error file %s.\n", argv[0], ERROR_LOG_FILE);
            fclose (DocErrorFile);
            exit (-1);
        }

/* Read in the argument list */
        sscanf(argv[3],"%d",&MaxLevels);
        if (MaxLevels < 1) {
            fprintf (DocErrorFile, "%s: Number of levels must be an integer greater than zero.\n", argv[0]);
            fclose (DocErrorFile);
            exit (-1);
        }
        if (MaxLevels >= MAX_COLUMNS) {
            fprintf (DocErrorFile, "%s: Number of levels must be an integer less than %d.\n", argv[0],MAX_COLUMNS);
            fclose (DocErrorFile);
            exit (-1);
        } while ((yyparse () != 0) && (ateof =='0'));
        fclose (yyin);
        fclose (ErrorFile);

PrintOutErrors();
```

```
        if (ErrorFound==FALSE) {
                CreateDefTable();
                NewGenerateCode();
                StoreEntireFile();
        }

/* END OF CODE USED TO PREPARE PROGRAM FOR DOCUMENTOR */

/* VERSION 2 OF DOCUMENTOR */
        one_time_initialization();
        if (Errorfound == TRUE) {
                CompilationFailedWarning(FirstFile); /* Dont bother continuing if error.  Let user know with dialog box what happened. */
                exit(-1);
        }
        else    ExpandVariable(argv[2],MaxLevels);

/* FINISH UP */

/* This code is never reached! */ fprintf(stderr,"This code in main() should not have been reached.  Something is wrong.\n");
        exit(-1);

CleanMemory();

DisposeEntireFile();

fclose (DocErrorFile);

if (ErrorFound==TRUE)
                exit(-1);
        else {
                /* See if the file is *really* empty.  If it is, say there were no errors. */
        /* not useful
                DocErrorFile = fopen(DOC_ERROR_FILE,"r");
                fgetc(DocErrorFile);
                if (feof(DocErrorFile) {
                        fclose(DocErrorFile);
                        DocErrorFile=fopen(DOC_ERROR_FILE,"w");
                        fprintf(DocErrorFile,"No errors found.\n");
                }
                fclose (DocErrorFile);
        */
                exit(0);
        }
}

/*****************************************/
/*                                       */
/*      FILE: compatibility.h            */
/*      COPYRIGHT    1991, DEVONRUE, LTD. */
/*      ALL RIGHTS RESERVED.             */
/*                                       */
/*****************************************/

/*#define SUN */
```

```
#define IBM

/* DEFINITIONS FOR SUN */ ifdef SUN typedef char *VoidPtr;

endif

/* DEFINITIONS FOR IBM */ ifdef IBM typedef void *VoidPtr;

endif

/**********************************************/
/*      FILE: functions.c                     */
/*      COPYRIGHT 1991, DEVONRUE, LTD.        */
/*      ALL RIGHTS RESERVED.                  */
/**********************************************/ include <stdio.h>
include <math.h>
#include <ctype.h>
#include <string.h>
#include <malloc.h>
#include "../latest_parser/prophet.h"
#include "doc.h"

StringListPtr       EntireFile;
extern FILE         *DocErrorFile;
extern char         DefinitionsFile[];
extern char         InputFile[];

FILE                *OutputFile;
EquationListPtr     EquationList;             /* Stores a list of all the equations that are to be printed */
                    EquationListCurrent;      /* Current location in EquationList */
VarListPtr          VarList;
SymbolBTreePtr      SymbolBTree;              /* list of all symbols in the file */
SymTabEntryPtr      Entry;
TreeNodePtr         TreeNodes;

int                 SpecialFlag = 1;          /* what is this? */ ifdef SUN
char                *CheckAlloc();
void                StoreEntireFile();
void                DisposeEntireFile();
void                FreeEquationList();
void                PrintExpandedVariables();
void                ExpandVariable();
```

```
void            DeleteSymbolList();
void            AddToSymbolList();
void            MakeListOfSymbolsInTree();
void            PutInUnsortedEquationList();
void            ExpandVariable2();
int             WhatIs();
void            IsVariableInThisTree();
char            FindWhereUsed();
void            *StripSpaces();
void            CreateDefTable();
void            PutInVarList();
void            MakeVarList();
EquationPtr     PutInEquationList();

SymbolBTreePtr  InsertSymbolTree();
void            FreeSymbolBTree();
#endif
ifndef SUN
char            *ChuckAlloc(int);
void            StoreEntireFile();
void            DisposeEntireFile();
void            FreeEquationList(EquationListPtr);
void            PrintExpandedVariables();
void            ExpandVariable(char *, int);
void            DeleteSymbolList(SymbolListPtr);
void            AddToSymbolList(SymbolListPtr, SymTabEntryPtr);
void            MakeListOfSymbolsInTree(SymbolListPtr, STNodePtr, SymTabEntryPtr);
void            PutInUnsortedEquationList(EquationListPtr, int);
void            ExpandVariable2(SymTabEntryPtr, int, int);
void            WhatIs();
int             IsVariableInThisTree(SymTabEntryPtr, STNodePtr);
void            FindWhereUsed(char *);
char            *StripSpaces(char *);
void            CreateDefTable();
void            PutInVarList(SymTabEntryPtr);
void            MakeVarList(STNodePtr);
EquationPtr     PutInEquationList(EquationPtr);
SymbolBTreePtr  InsertSymbolTree(SymTabEntryPtr, SymbolBTreePtr);
void            FreeSymbolBTree(SymbolBTreePtr);
endif extern void main_function();              /* Main tree function for drawing tree to screen */

/* allocate memory and check for success */
#ifdef SUN
char *CheckAlloc:(TheSize)
    int     TheSize;

#endif
ifndef SUN
char *CheckAlloc(int TheSize)
#endif
{
    char *result;

if ((result = (char *) calloc(1,TheSize)) == NULL) {
```

```
                fprintf(DocErrorFile,"INTERNAL ERROR: calloc failed.\n");
                fclose (DocErrorFile);
                exit(-1);
        } return result;
}

/* Strip the spaces from the beginning of a line */
#ifdef SUN
char *StripSpaces(line)
        char *line;
#endif
ifndef SUN
char *StripSpaces(char *line)
#endif
{
        register int i,len;
        register int quit;
        char *answer;

quit = FALSE;
        len=strlen(line);
        for (i=0; (i<len) && (quit == FALSE); i++)
                if ((line[i] != ' ') && (line[i] != '\t'))
                        quit = TRUE;

answer = &(line[i-1]);
        return answer;
}

/* NOT USED */
#ifdef SUN
void
PrintSyntaxTree2 (fp,TheNode)
        char        *fp;
        STNodePtr    TheNode;
#endif
ifndef SUN
void
PrintSyntaxTree2 (char *fp, STNodePtr TheNode)
#endif
{
        static STNodePtr LHS = NULL;
        int          i,
                     Number,
                     Dimension,
                     Arg;
        SymTabEntryPtr Entry,
                     CurArg;
        char         NumString[32];
        char         tcmp[132];
```

```
if (TheNode == NULL)
    return;

if (strcmp (TheNode->Symbol->Name, ".") == 0)
    LHS = TheNode->LSon;

if ((TheNode->LSon != NULL) && (strcmp (TheNode->Symbol->Name, ".") != 0))
    strcat(fp,"(");

PrintSyntaxTree2 (fp,TheNode->LSon);
if (TheNode->Symbol->PrintType == -1)
    strcat(fp,"FirstArg->");
strcat(fp,TheNode->Symbol->Name);
Entry = TheNode->Symbol;
if (Entry->Type == MACROTYPE)
{
    strcat(fp,"(&_");
    PrintSyntaxTree2 (fp,LHS);
    if (Entry->AddInfo != NULL)
    {
        for (I = 0; I < Entry->AddInfo->FunctionInfo.NumArguments; I++)
        {
            strcat(fp,",");
            if ((I == 2) && (strcmp(Entry->Name,"DELAYP") == 0))
                strcat(fp,"&");
            PrintSyntaxTree2 (fp,TheNode->AddInfo->Nodes[I]);
        }
    }
    strcat(fp,")");
}
else if (Entry->Type == FUNCTION)
{
    strcat(fp,"(");
    CurArg = TheNode->AddInfo->Nodes[0]->Symbol;
    if (CurArg->PrintType == -1)
        strcat(fp,"FirstArg->");
    if (Entry->AddInfo->FunctionInfo.ArgumentType[0] == DOUBLE)
        strcat(fp,"(double)");
    if (Entry->PrintType == -2)
        PrintSyntaxTree2(fp,TheNode->AddInfo->Nodes[0]);
    else
        strcat(fp,CurArg->Name);
    for (Arg = 1; Arg < Entry->AddInfo->FunctionInfo.NumArguments; Arg++)
    {
        CurArg = TheNode->AddInfo->Nodes[Arg]->Symbol;
        if (Entry->AddInfo->FunctionInfo.ArgumentType[Arg] == DOUBLE_ARRAY)
        {
            strcat(fp,",");
            if (Entry->PrintType == -1)
                strcat(fp,"FirstArg->");
            if (Entry->PrintType != -2)
                PrintSyntaxTree2(fp,TheNode->AddInfo->Nodes[Arg]);
        }
        else
            strcat(fp,CurArg->Name);
    }
}
```

```c
            else
                {
                strcat(fp,", (double)");
                PrintSyntaxTree2 (fp,TheNode->AddInfo->Nodes[Arg]);
                }

CurArg = TheNode->AddInfo->Nodes[Arg]->Symbol;
            if (Entry->AddInfo->FunctionInfo.ArgumentType[Arg] == DOUBLE_ARRAY) {
                sprintf (temp,"%d", CurArg->AddInfo->ArrayInfo.NumDimensions);
                strcat(fp,temp);
                }
            }

/* PRINT OUT THE ARGUMENTS "C" REQUIRES */ for (Arg = 0; Arg < Entry->AddInfo->FunctionInfo.NumArguments; Arg++)
    {
    CurArg = TheNode->AddInfo->Nodes[Arg]->Symbol;
    if (Entry->AddInfo->FunctionInfo.ArgumentType[Arg] == DOUBLE_ARRAY)
        {
        for (Dimension = 0; Dimension < CurArg->AddInfo->ArrayInfo.NumDimensions; Dimension++)
            sprintf (temp,"%d", CurArg->AddInfo->ArrayInfo.DimensionSize[Dimension]);
            strcat(fp,temp);
            } for (Dimension = 0; Dimension < CurArg->AddInfo->ArrayInfo.NumDimensions; Dimension++)
            {
            strcat(fp,",");
            if (CurArg->AddInfo->ArrayInfo.NumDimensions == 1)
                strcat(fp,"0,0");
            else
                {
                strcat(fp,"(double)");
                PrintSyntaxTree2 (fp,TheNode->AddInfo->Nodes[Arg]->AddInfo->Nodes[Dimension]);
                if ((TheNode->AddInfo->Nodes[Arg]->AddInfo->Nodes[Dimension]->Symbol->Type == VARIABLE) &&
                    (TheNode->AddInfo->Nodes[Arg]->AddInfo->Nodes[Dimension]->Symbol->DataType == INTEGER))
                    strcat(fp,"+1.0");
                }
            }
        }
    }
strcat(fp,")");
}
else if (TheNode->AddInfo != NULL)
    {
    if (TheNode->Symbol->AddInfo != NULL)
        {
        for (I = 0; I < TheNode->AddInfo->NumElements; I++)
            {
            strcat(fp,"[");
            if (TheNode->AddInfo->Nodes[I]->Symbol->Type == NUMBER)
                {
```

```c
                    sprintf (NumString, "%s", TheNode->AddInfo->Nodes[I]->Symbol->Name);
                    sscanf (NumString, "%d", &Number);
                    sprintf (temp, "%d", (Number > 0) ? Number - 1 : 0);
                    strcat(fp,temp);
                }
                else
                {
                    PrintSyntaxTree2 (fp,TheNode->AddInfo->Nodes[I]);
                    if (TheNode->AddInfo->Nodes[I]->Symbol->Type == CONSTANT)
                        strcat(fp,"-1");
                }
            }
            strcat(fp,"]");
        }
    }
}

PrintSyntaxTree2 (fp,TheNode->RSon);

if ((TheNode->LSon != NULL) && (strcmp (TheNode->Symbol->Name, "..") != 0))
    strcat(fp,")");
}

/* Read in the variable definitions file and place the definitions in the symbol table. */
#ifdef SUN
void CreateDefTable()
#endif
ifndef SUN
void CreateDefTable()
#endif
{
    register int    lineno=1;          /* Used for reporting line number where an error occurs */
    FILE            *fp;               /* File pointer for the definitions file */
    char            stuff[MAX_LENGTH_OF_SOURCE_LINE],   /* Temporary string */
                    comment[MAX_LENGTH_OF_SOURCE_LINE], /* Stores the definition string */
                    *variable;         /* Pointer to the variable string */
    int             Duplicate = 0;

/* Open definitions file, taking the file name from the global symbol 'DefinitionsFile' */
if ((fp = fopen(DefinitionsFile,"r")) != NULL) { fgets(stuff, MAX_LENGTH_OF_SOURCE_LINE, fp);    /* Throw away first header line */

/* Read in entire file until end of file has been reached */
    while (!feof(fp)) {

/* Read the variable name and then remove any extra garbage from the end of its name */
        fscanf(fp, "%s", stuff);
        variable = (char *) strtok(stuff, "(");

/* If we're not at end of file yet, then continue */
        if (!feof(fp)) {

/* Read in definition */
            fgets(comment, MAX_LENGTH_OF_SOURCE_LINE, fp);
```

```c
        /* Put the entry in the symbol table, and if it wasn't there before, set WhereFrom = DEF so that */
        /* the program can tell later if this symbol was from the original source code or from the */
        /* definitions file. */
        Entry = LookUpSymTab(variable);
        if (Entry == NULL) {
            Entry = InsertInSymTab(variable);
            Entry->WhereFrom = DEF;
        }

/* If there is already a comment there, then that means a duplicate definition has been found. */
        if (Entry->Comment != NULL) {
            fprintf(DocErrorFile,"Duplicate definition found in definitions file, variable %s, line %d\n",
                    variable,lineno);
            Duplicate = 1;
        }

/* Strip spaces from beginning of line, and strip return from end of line */
        if (comment[strlen(comment)-1] == '\n')
            comment[strlen(comment)-1] = '\0';
        Entry->Comment = strdup(StripSpaces(comment));
        lineno++;

} fclose(fp);

} if (Duplicate != 0) {
    fclose(DocErrorFile);
    exit(-1);
}

}

/* Puts a symbol in the linked list of variables. This list is used for preventing duplicate variables from being listed */
/* by the documentor. Symbol only gets inserted if there wasn't one already there. */
#ifdef SUN
void PutInVarList(Symbol)
    SymTabEntryPtr Symbol;
#endif
ifndef SUN
void PutInVarList(SymTabEntryPtr Symbol)
#endif
{
    register VarListPtr cur,
                        prev,
                        tmp;

cur = VarList->Next;
    prev = VarList;
    while (cur!=NULL) {
        if (cur->Symbol == Symbol)
            return;
```

```
            prev = cur;
            cur=cur->Next;
        }
        tmp = (VarListPtr) CheckAlloc(sizeof ("VarList));
        tmp->Symbol = Symbol;
        tmp->Next = NULL;
        prev->Next = tmp;
}

/* Recursively go down a syntax tree and locate all the valid symbols.  Place these symbols in the linked list for printout later. */
/* Does a postorder traversal of the syntax tree. */
#ifdef SUN
void MakeVarList(Node)
    STNodePtr Node;
#endif
ifndef SUN
void MakeVarList(STNodePtr Node)
#endif
{
    register int I;

if (Node == NULL)
        return;

MakeVarList(Node->LSon);
    MakeVarList(Node->RSon);

/* If its a function or a macro, then traverse the arguments to look for symbols. */
    if ((Node->Symbol->Type == MACROTYPE) || (Node->Symbol->Type == FUNCTION)) {
        for (I = 0; I < Node->Symbol->AddInfo->FunctionInfo.NumArguments; I++)
            MakeVarList(Node->AddInfo->Nodes[I]);
    }

/* If its a valid symbol, put it in the variable list. */
    else if ((Node->Symbol->Type == CONSTANT) || (Node->Symbol->Type == VARIABLE))
        PutInVarList(Node->Symbol);

/* If its an array, then traverse the indices to look for symbols.  Put array in the variable list too. */
    else if (Node->AddInfo != NULL) {
        PutInVarList(Node->Symbol);
        if (Node->Symbol->AddInfo != NULL)
            for (I = 0; I < Node->AddInfo->NumElements; I++)
                if (Node->AddInfo->Nodes[I]->Symbol->Type != NUMBER)
                    MakeVarList(Node->AddInfo->Nodes[I]);
    }
}

/* If not already there, put the equation pointer in the list of equation pointers.  If it is already there, return NULL */
#ifdef SUN
EquationPtr PutInEquationList(p)
    EquationPtr p;
```

```c
#endif
ifndef SUN
EquationPtr PutInEquationList(EquationPtr p)
#endif
{
    register EquationListPtr cur,prev,tmp;

cur = EquationList->Next;
    prev = EquationList;
    while ((cur!=NULL) && (cur->Equation->EquationNo <= p->EquationNo)) {
        if (cur->Equation->EquationNo == p->EquationNo)
            return NULL;
        prev = cur;
        cur=cur->Next;
    }
    tmp = (EquationListPtr) CheckAlloc(sizeof(*EquationList));
    tmp->Equation = p;
    tmp->Next = cur;
    prev->Next = tmp;
    return p;
}

/* Insert a symbol table entry in the binary search tree. */
#ifdef SUN
SymbolBTreePtr InsertSymbolBTree(Entry,Tree)
    SymTabEntryPtr Entry;
    SymbolBTreePtr Tree;
#endif
ifndef SUN
SymbolBTreePtr InsertSymbolBTree(SymTabEntryPtr Entry, SymbolBTreePtr Tree)
#endif
{
    if (Tree == NULL) {
        Tree = (SymbolBTreePtr) CheckAlloc(sizeof(*SymbolBTree));
        Tree->Symbol = Entry;
        Tree->LSon = NULL;
        Tree->RSon = NULL;
    }
    else if (strcmp(Entry->Name,Tree->Symbol->Name) < 0)
        Tree->LSon = InsertSymbolBTree(Entry,Tree->LSon);
    else
        Tree->RSon = InsertSymbolBTree(Entry,Tree->RSon);
    return Tree;
}

/* Free all memory allocated for the binary search tree */
#ifdef SUN
void FreeSymbolBTree(Tree)
    SymbolBTreePtr Tree;
#endif
ifndef SUN
void FreeSymbolBTree(SymbolBTreePtr Tree)
#endif
{
```

```c
        if (Tree == NULL)
                return;

FreeSymbolBTree(Tree->LSon);
        FreeSymbolBTree(Tree->RSon);
        free (Tree);
}

/* Reads file into linked list of strings */
#ifdef SUN
void StoreEntireFile()
#endif
ifndef SUN
void StoreEntireFile()
#endif
{
        StringListPtr   Cur,
                        Temp;
        FILE            *fp;
        char            Line[MAX_LENGTH_OF_SOURCE_LINE];

EntireFile=(StringListPtr) CheckAlloc(sizeof(*EntireFile));
        Cur = EntireFile;

if((fp=fopen(InputFile,"r")) == NULL) {
                fprintf(DocErrorFile,"INTERNAL ERROR: Could not reopen the input file %s\n",InputFile);
                fclose(DocErrorFile);
                exit(-1);
        } while (!feof(fp)) {
                fgets(Line, MAX_LENGTH_OF_SOURCE_LINE, fp);
                if (!feof(fp)) {
                        Temp = (StringListPtr) CheckAlloc(sizeof(*Temp));
                        Temp->Next = NULL;
                        Temp->Line = strdup(Line);
                        Cur->Next = Temp;
                        Cur = Temp;
                }
        }
        fclose(fp);
}

/* disposes linked list of strings containing the text of the file */
#ifdef SUN
void DisposeEntireFile()
#endif
ifndef SUN
void DisposeEntireFile()
#endif
{
        StringListPtr   Cur,
                        Prev;
```

```
Cur = EntireFile;

while (Cur!=NULL) {
    if (Cur->Line != NULL)
        free(Cur->Line);
    Prev = Cur;
    Cur = Cur->Next;
    free(Prev);
}

/* Free memory used by EquationList */
#ifdef SUN
void FreeEquationList(EquationList)
    EquationListPtr    EquationList;
#endif
ifndef SUN
void FreeEquationList(EquationListPtr EquationList)
#endif
{
    register EquationListPtr cur,prev;

cur = EquationList->Next;
    prev = EquationList;
    while (cur!=NULL) {
        free(prev);
        prev = cur;
        cur=cur->Next;
    }
}

/* Print list of expanded variable lines, as specified by EquationList */
#ifdef SUN
void PrintExpandedVariables()
#endif
ifndef SUN
void PrintExpandedVariables()
#endif
{
    register int      j;
    EquationListPtr   Eq;
    char              TempString[MAX_BUF_LENGTH]; /* Temporary string */
    int               Found,SomethingInBetween;
    EquationListPtr Eq2;

/* Go through equation list, and for each equation, go to the beginning of the file and read through the file */
    /* until the line is found. Then print out the following info:
        A or I, indicates Active value equation, or Initial value equation.
        Tabs, to make it indented properly.
        The line(s), taken from the file.                              */

Eq = EquationList->Next;
    while (Eq != NULL) {
```

```c
/* If this is an exogenous variable, just print it once, not lots of times. */
if (Eq->Equation->Equation->LSon->Symbol->WhereFrom == EXOGENOUS) {
    /*if (Eq->Equation->IsActive == 1)
        fprintf(OutputFile,"| "); 
    else*/
        fprintf(OutputFile,"| ");
    for (j=0; j<=Eq->IndentCount; j++)
        fprintf(OutputFile,"\t");
    fprintf(OutputFile,"%s\n", Eq->Equation->Equation->LSon->Symbol->Name);
    strcpy(TempString, Eq->Equation->Equation->LSon->Symbol->Name);
    while ((Eq != NULL) && (strcmp(TempString, Eq->Equation->Equation->LSon->Symbol->Name) == 0) )
        Eq = Eq->Next;
}

/* Otherwise, find the line in the file, and print the lines */
else {
    Eq2 = Eq;
    Found = FALSE;
    while ((Eq2 != NULL) && (Found == FALSE)) {
        if (Eq2->IndentCount == 0)
            Found = TRUE;
        Eq2=Eq2->Next;
    }
    if (Found == TRUE)
        fprintf(OutputFile,"|\t");
    else
        fprintf(OutputFile," \t");

for (j=0; j<Eq->IndentCount; j++) {
        Eq2 = Eq;
        Found = FALSE;
        SomethingInBetween = FALSE;
        while ((Eq2 != NULL) && (Found == FALSE) && (SomethingInBetween == FALSE)) {
            if (Eq2->IndentCount <= j)
                SomethingInBetween = TRUE;
            if (Eq2->IndentCount == j+1)
                Found = TRUE;
            Eq2=Eq2->Next;
        }
        if (Found == TRUE)
            fprintf(OutputFile,"|\t");
        else
            fprintf(OutputFile," \t");
    }
    fprintf(OutputFile,"\n");

for (j=0; j<Eq->IndentCount; j++) {
        Eq2 = Eq;
        Found = FALSE;
        SomethingInBetween = FALSE;
        while ((Eq2 != NULL) && (Found == FALSE) && (SomethingInBetween == FALSE)) {
            if (Eq2->IndentCount < j);
                SomethingInBetween = TRUE;
```

```c
                    if (Eq2->IndentCount == j)
                        Found = TRUE;
                    Eq2=Eq2->Next;
                }
                if (Found == TRUE)
                    fprintf(OutputFile,"|\t");
                else
                    fprintf(OutputFile," \t");
            }
            fprintf(OutputFile,"|_____");
        }
        if (SpecialFlag == 0)
            PrintSyntaxTree(OutputFile,Eq->Equation->Equation->LSon);
        else
            fprintf(OutputFile,Eq->Equation->Equation->LSon->Symbol->Name);
        fprintf(OutputFile,"\n");

Eq=Eq->Next;
    } for (k=0; k<=Eq->IndentCount; k++) {
        Eq2 = Eq->Next;
        Found = FALSE;
        SomethingInBetween = FALSE;
        while ((Eq2 != NULL) && (Found == FALSE) && (SomethingInBetween == FALSE))
        {
            if (Eq2->IndentCount <= Eq->IndentCount)
                SomethingInBetween = TRUE;
            if (Eq2->IndentCount == Eq->IndentCount+1)
                Found = TRUE;
            Eq2=Eq2->Next;
        }
        if (Found == TRUE)
            fprintf(OutputFile,"\t|");
        else
            fprintf(OutputFile,"\t ");
    } fprintf(OutputFile,"%s\n",Eq->Equation->Equation->LSon->Symbol->Name);
    /*fprintf(OutputFile,"\n");*/
}
if (EquationList->Next == NULL)
    fprintf(DocErrorFile,"\nEquation for variable not found.\n");

/* Create the TreeNode structure by traversing the list of equations */
TreeNodePtr TraverseEquationList(TreeNodePtr TheTreeNode, int Level)
```

```
        TreeNodePtr    TempTreeNode;

if (EquationListCurrent->Next != NULL)
        do
        {
            EquationListCurrent = EquationListCurrent->Next;
            TempTreeNode = (TreeNodePtr) CheckAlloc(sizeof(*TempTreeNode));
            strcpy(TempTreeNode->Name, EquationListCurrent->Equation->LSon->Symbol->Name);
            TempTreeNode->Equation = EquationListCurrent->Equation;

if (TheTreeNode == NULL)
                TheTreeNode = TempTreeNode;
            else {
                if (TheTreeNode->NumChildren+1>=MAX_CHILDREN) {
                    fprintf(stderr,"ERROR: MAX_CHILDREN exceeded\n");
                }
                else {
                    TheTreeNode->Children[TheTreeNode->NumChildren] = TempTreeNode;
                    TheTreeNode->NumChildren++;
                }
            }
            if ((EquationListCurrent->Next != NULL) && (EquationListCurrent->Next->IndentCount > Level) &&
                (TheTreeNode->NumChildren+1<MAX_CHILDREN))
                TraverseEquationList(TempTreeNode,Level+1);

}
        while ((EquationListCurrent->Next != NULL) &&
               (EquationListCurrent->Next->IndentCount == Level));

return TheTreeNode;
} void testit(TreeNodePtr lt, int n)
{
    int i;

if (lt==NULL)
        return;
    for (i=0; i<n; i++)
        printf("\t");
    printf("%s\n",lt->Name);
    for (i=0; i<lt->NumChildren; i++)
        testit(lt->Children[i],n+1);
}

/* Create TreeNode structure */
void CreateTreeNode()
{
    TreeNodes = NULL;

EquationListCurrent = EquationList;
    TreeNodes = TraverseEquationList(TreeNodes,0);
```

```c
/* Main function for expanding a variable.  Read in the variable name, look up its symbol table entry, read in the
   number of levels to expand to, then expand it. */
#ifdef SUN
void ExpandVariable(VariableName,TotalLevels)
     char      *VariableName;           /* Variable name */
     int       TotalLevels;             /* Maximum number of levels to expand to */
#endif
ifndef SUN
void ExpandVariable(char *VariableName, int TotalLevels)
#endif
{
     SymTabEntryPtr      Symbol;                /* Symbol table entry */

/* Look up the variable name */
     Symbol = LookUpSymTab(VariableName);
     if ((Symbol == NULL) || ((Symbol->Type != CONSTANT) && (Symbol->Type != VARIABLE))) {
          fprintf(DocErrorFile,"Variable [%s] does not exist in the model.\n",VariableName);
          fprintf(stderr,"Variable [%s] does not exist in the model.\n",VariableName);
          fclose(DocErrorFile);
          return;
     } if ((OutputFile = fopen(OUTPUT_FILE, "w")) == NULL) {
          fprintf(DocErrorFile, "ERROR: Could not open output file %s.\n", OUTPUT_FILE);
          fclose (DocErrorFile);
          exit (-1);
     }

/* Initialize EquationList */
     EquationList = (EquationListPtr) CheckAlloc(sizeof (*EquationList));
     EquationListCurrent = EquationList;

/* Expand this symbol.  Pass 0 to count which expansion level the program is on. */
     ExpandVariable2(Symbol, 0, TotalLevels);

/* Print out the variables stores in EquationList */
     PrintExpandedVariables();

fclose (OutputFile);

CreateTreeNode();

/* Free equation list */
     FreeEquationList(EquationList);

/* Do the tree thing */
     main_function(TreeNodes);
}

/* Delete symbol list */
#ifdef SUN
void DeleteSymbolList(SymbolList)
     SymbolListPtr  SymbolList;              /* Symbol list to free */
```

```
#endif
ifndef SUN
void DeleteSymbolList(SymbolListPtr SymbolList)
#endif
{
    SymbolListPtr Cur,
                  Prev;

Cur = SymbolList;
    while (Cur!=NULL) {
        Prev = Cur;
        Cur = Cur->Next;
        free(Prev);
    }
}

/* Add a symbol to the symbol list, if it was not there already. */
#ifdef SUN
void AddToSymbolList(SymbolList,Symbol)
    SymbolListPtr SymbolList;                    /* Symbol list to be added to */
    SymTabEntryPtr   Symbol;                     /* Symbol to add */
#endif
ifndef SUN
void AddToSymbolList(SymbolListPtr SymbolList, SymTabEntryPtr Symbol)
#endif
{
    SymbolListPtr Tmp,                  /* Temporary creation of a new node */
                  Current,              /* Current location in the symbol list */
                  Prev;                 /* Previous - used for inserting at end of list */
    int           Found = FALSE;        /* Indicates of the symbol is already there or not */

/* Find out if symbol is already in the list */
    Current = SymbolList->Next;
    Prev = SymbolList;
    while (Current!=NULL) {
        if (Current->Symbol->Name == Symbol->Name)
            Found = TRUE;
        Prev = Current;
        Current=Current->Next;
    }

/* If not in the list, add to the end of the list */
    if (Found == FALSE) {
        Tmp = (SymbolListPtr) CheckAlloc(sizeof(*SymbolList));
        Tmp->Next = NULL;
        Tmp->Symbol = Symbol;
        Prev->Next = Tmp;
    }
}

/* Make a linked list of all the symbols in a STNode structure, no duplicates allowed. */
#ifdef SUN
```

```c
void MakeListOfSymbolsInTree(SymbolList,Node,RootSymbol)
    SymbolListPtr  SymbolList;           /* Symbol list to store the list of symbols */
    STNodePtr      Node;                 /* Tree to traverse, looking for symbols in it */
    SymTabEntryPtr RootSymbol;           /* Original symbol on LHS - used to prevent selection of equations
                                            which use the LHS variable on the RHS (prevents the possibility of
                                            duplication and infinitely traversing down the tree structures) */ endif
ifndef SUN
void MakeListOfSymbolsInTree(SymbolListPtr SymbolList, STNodePtr Node, SymTabEntryPtr RootSymbol)
#endif
{
    register int   i;                    /* Loop counter */ if (Node == NULL)
        return;

/* Call this recursively for left tree */
    MakeListOfSymbolsInTree(SymbolList,Node->LSon,RootSymbol);

/* If its a valid symbol (one that can be expanded too), place in the symbol list for later expansion */
    if (((Node->Symbol->Type == CONSTANT) || (Node->Symbol->Type == VARIABLE) &&
         (RootSymbol != Node->Symbol) && ((Node->Symbol->Type == CONSTANT) &&
         (Node->Symbol->DataType == INTEGER))))
            AddToSymbolList(SymbolList,Node->Symbol);

/* If its a function or macro, call this function for all of the arguments */
    if ((Node->Symbol->Type == MACROTYPE) || (Node->Symbol->Type == FUNCTION)) {
        for (i=0; i<Node->Symbol->AddInfo->FunctionInfo.NumArguments; i++)
            MakeListOfSymbolsInTree(SymbolList,Node->AddInfo->Nodes[i],RootSymbol);
    }

/* If its an array, call this function for all of the indices */
    else if ((Node->AddInfo != NULL) & (Node->Symbol->AddInfo != NULL)) {
        for (i=0; i<Node->AddInfo->NumElements; i++)
            MakeListOfSymbolsInTree(SymbolList,Node->AddInfo->Nodes[i],RootSymbol);
    }

/* Call this recursively for right tree */
    MakeListOfSymbolsInTree(SymbolList,Node->RSon,RootSymbol);
}

/* Places equation at the end of the equation list ( so they'll be in order ) */
#ifdef SUN
void PutInUnsortedEquationList(p,IndentCount)
    EquationPtr  p;                      /* Equation to put in the equation list */
    int          IndentCount;            /* Number of tabs to indent this equation once it gets printed later */ endif
ifndef SUN
void PutInUnsortedEquationList(EquationPtr p, int IndentCount)
#endif
{
    register EquationListPtr  tmp;       /* Temporary creation of a node */
```

```c
        tmp = (EquationListPtr) CheckAlloc(sizeof (*EquationList));
        tmp->Equation = p;
        tmp->IndentCount = IndentCount;
        tmp->Next = NULL;
        EquationListCurrent->Next = tmp;
        EquationListCurrent = tmp;
}

/* This function gets passed a symbol, and it traverses the active value and initial value equations for this symbol.
   For each equation, it creates a symbol list (to store at most one of each symbol on RHS of equation), then
   traverses that symbol list passing each symbol to this function again.  The symbol list is then deleted. */
#ifdef SUN
void ExpandVariable2(Symbol, CurrentLevel, TotalLevels)
    SymTabEntryPtr   Symbol;                        /* Symbol that is to be expanded */
    int              CurrentLevel,                  /* Current expansion level */
                     TotalLevels;                   /* Maximum expansion level */
#endif
ifndef SUN
void ExpandVariable2(SymTabEntryPtr Symbol, int CurrentLevel, int TotalLevels)
#endif
{
    SymbolListPtr    SymbolList,                    /* Symbol lists get created here, and passed to other functions */
                     Cur;                           /* Used for traversing symbol list */
    EquationPtr      CurEq;                         /* Current location in equation list */
    char             temp[MAX_BUF_LENGTH];

if (CurrentLevel == TotalLevels)
        return;

strcpy(temp, "");

/* Initialize symbol list. */
    SymbolList = NULL;
    SymbolList = (SymbolListPtr) CheckAlloc(sizeof (*SymbolList));

/* Traverse active value equations for this symbol */
    CurEq = Symbol->ActiveValEquation;
    while (CurEq != NULL) {
        /* Create the symbol list (go down RHS and find all symbols that could be expanded.) */
        if ((SpecialFlag == 0) || (strcmp(temp,CurEq->Equation->LSon->Symbol->Name) != 0)) {
            PutInUnsortedEquationList(CurEq,CurrentLevel)
            strcpy(temp,CurEq->Equation->LSon->Symbol->Name);
        }
        MakeListOfSymbolsInTree(SymbolList,CurEq->Equation->RSon,Symbol);
        CurEq = CurEq->Next;
    } if (SpecialFlag == 0) {
        Cur = SymbolList->Next;
        while (Cur!=NULL) {
            ExpandVariable2(Cur->Symbol,CurrentLevel+1,TotalLevels);
            Cur=Cur->Next;
        }
    }
    DeleteSymbolList(SymbolList);
```

```
        SymbolList = NULL;
        SymbolList = (SymbolListPtr) CheckAlloc(sizeof (*SymbolList));

/* Traverse initial value equations for this symbol */
        CurEq = Symbol->InitValEquation;
        while (CurEq != NULL) {
                /* Create the symbol list (go down RHS and find all symbols that could be expanded.) */
                if ((SpecialFlag == 0) || (strcmp(temp,CurEq->Equation->LSon->Symbol->Name) != 0)) {
                        PutInUnsortedEquationList(CurEq,CurrentLevel)
                        strcpy(temp,CurEq->Equation->LSon->Symbol->Name);
                }
                MakeListOfSymbolsInTree(SymbolList,CurEq->Equation->RSon,Symbol);
                CurEq = CurEq->Next;
        }

/* Go through list of symbols, and pass them all to this function again */
        Cur = SymbolList->Next;
        while (Cur!=NULL) {
                ExpandVariable2(Cur->Symbol,CurrentLevel+1,TotalLevels);
                Cur=Cur->Next;
        }

DeleteSymbolList(SymbolList);
}

/* Print out definition of a variable */
#ifdef SUN
void WhatIs()
#endif
ifndef SUN
void WhatIs()
#endif
{
        char         VariableName[MAX_BUF_LENGTH];       /* Variable name */
        SymTabEntryPtr  Symbol;                          /* Symbol table entry for the variable */

/* Get variable name */
        printf("Enter variable name:");
        scanf("%s",VariableName);

/* Look up variable in symbol table */
        Symbol = LookUpSymTab(VariableName);
        if ((Symbol == NULL) || ((Symbol->Type != CONSTANT) && (Symbol->Type != VARIABLE))) {
                fprintf(DocErrorFile,"Variable (%s) does not exist in the model.\n",VariableName);
                return;
        }

/* Print out definition if the symbol was found */
        if (Symbol->Comment != NULL)
                fprintf(OutputFile,"\n%s: %s\n\n",Symbol->Name, Symbol->Comment);
        else
                fprintf(DocErrorFile,"\n%s: (no definition in the definitions file)\n\n");
```

```
/* Returns TRUE if the symbol passed to the function can be found anywhere in the STNode */
#ifdef SUN
int IsVariableInThisTree(Symbol,Tree)
    SymTabEntryPtr  Symbol;
    STNodePtr       Tree;
#endif
ifndef SUN
int IsVariableInThisTree(SymTabEntryPtr Symbol, STNodePtr Tree)
#endif
{
    register int   i;

if (Tree == NULL)
        return FALSE;

/* Found! */
    if (Tree->Symbol == Symbol)
        return TRUE;

/* Traverse function and array arguments/indices recursively */
    if ((Tree->Symbol->Type == MACROTYPE) || (Tree->Symbol->Type == FUNCTION) )
        for (i=0; i<Tree->Symbol->AddInfo->FunctionInfo.NumArguments; i++)
            if (IsVariableInThisTree(Symbol, Tree->AddInfo->Nodes[i]) == TRUE)
                return TRUE;
    else if ((Tree->AddInfo != NULL) && (Tree->Symbol->AddInfo != NULL))
        for (i=0; i<Tree->AddInfo->NumElements; i++)
            if (IsVariableInThisTree(Symbol, Tree->AddInfo->Nodes[i]) == TRUE)
                return TRUE;

if (IsVariableInThisTree(Symbol,Tree->LSon) == TRUE)
        return TRUE;
    if (IsVariableInThisTree(Symbol,Tree->RSon) == TRUE)
        return TRUE;

return FALSE;
}
/* Main function to print out all equations where a variable is used. */
#ifdef SUN
void FindWhereUsed(VariableName)
    char   *VariableName;                           /* Variable name! */
#endif
ifndef SUN
void FindWhereUsed(char *VariableName)
#endif
{
    SymTabEntryPtr   Symbol;                        /* Symbol table entry for the variable */
    HeaderNodePtr    GraphNode;                     /* Graph node pointer */
    ArcNodePtr       CurArc;                        /* Current arc being traversed */
    EquationPtr      CurEq;                         /* Current equation in list being traversed */
```

```
/* Find the variable's symbol first */
Symbol = LookUpSymTab(VariableName);
if ((Symbol == NULL) || ((Symbol->Type != CONSTANT) && (Symbol->Type != VARIABLE))) {
    fprintf(DocErrorFile,"Variable [%s] does not exist in the model.\n",VariableName);
    fclose (DocErrorFile);
    return;
} if ((OutputFile = fopen(OUTPUT_FILE, "w")) == NULL) {
    fprintf (DocErrorFile, "ERROR: Could not open output file %s.\n", OUTPUT_FILE);
    fclose (DocErrorFile);
    exit (-1);
}

/* Initialize EquationList */
EquationList = NULL;
EquationList = (EquationListPtr) CheckAlloc(sizeof ("EquationList));

/* Find all places where variable is used in computing another variable. */
GraphNode = Symbol->GraphNode;
if (GraphNode != NULL) {
    CurArc = GraphNode->FirstArc;
    while (CurArc != NULL) {
        CurEq = CurArc->DestHeader->Symbol->ActiveValEquation;
        while (CurEq != NULL) {
            if (IsVariableInThisTree(Symbol,CurEq->Equation->RSon) == TRUE)
                PutInEquationList(CurEq);
            CurEq = CurEq->Next;
        }

CurEq = CurArc->DestHeader->Symbol->InitValEquation;
        while (CurEq != NULL) {
            if (IsVariableInThisTree(Symbol,CurEq->Equation->RSon) == TRUE)
                PutInEquationList(CurEq);
            CurEq = CurEq->Next;
        }

CurArc = CurArc->NextArc;
    }
} fclose (OutputFile);
}

/* File is needed by the functions that do the graphical expanding of equations */ define MAX_ROWS        25    /* Maximum number of rows of "boxes" allowed in the flow diagram */
define MAX_COLUMNS     10    /* Maximum number of columns of "boxes" allowed in the flow diagram */
define MAX_CHILDREN    25    /* Maximum number of children allowed off of each variable */ typedef enum BooleanEnum {OUR_FALSE, OUR_TRUE} OUR_BOOLEAN;

typedef struct TreeNodeStruct   TreeNode,
                                *TreeNodePtr;
```

```c
struct TreeNodeStruct
{
    char         Name[33];
    EquationPtr  Equation;
    int          NumChildren;
    TreeNodePtr  Children[MAX_CHILDREN];
    int          X,
                 Y;
};

#define DEFAULT_FONT         "Erg14"
#define DEFAULT_FONT_ID      0
#define FONT6X10             "6x10"
#define FONT6X10_ID          1
#define FONT6X12             "6x12"
#define FONT6X12_ID          2
#define FONT6X13             "6x13"
#define FONT6X13_ID          3
#define FONT8X13             "8x13"
#define FONT8X13_ID          4
#define FONT8X13BOLD         "8x13B"
#define FONT8X13BOLD_ID      5
#define FONT9X15             "9x15"
#define FONT9X15_ID          6
#define BOLD14               "Bld14"
#define BOLD14_ID            7
#define BOLD17               "Bld17"
#define BOLD17_ID            8
#define ITALICS              "Itl14"
#define ITALICS_ID           9
#define FIXED                "fixed"
#define FIXED_ID             10
#define ROMAN6               "Rom6"
#define ROMAN6_ID            11
#define ROMAN7               "Rom7"
#define ROMAN7_ID            12
#define ROMAN8               "Rom8"
#define ROMAN8_ID            13
#define ROMAN10              "Rom10"
#define ROMAN10_ID           14
#define ROMAN11              "Rom11"
#define ROMAN11_ID           15
#define ROMAN14              "Rom14"
#define ROMAN14_ID           16
#define ROMAN16              "Rom16"
#define ROMAN16_ID           17
#define ROMAN17              "Rom17"
#define ROMAN17_ID           18
#define ROMAN22              "Rom22"
#define ROMAN22_ID           19
#define ROMAN28              "Rom28"
#define ROMAN28_ID           20
#define ROMAN29              "Rom29"
#define ROMAN29_ID           21
```

```c
/*****************************************/
/*   FILE: common graph.c                */
/*   COPYRIGHT 1991, DEVONRUE, LTD.      */
/*   ALL RIGHTS RESERVED.                */
/*****************************************/ include <stdio.h>
include <string.h>
#include <malloc.h>
#include "../latest_parser/prophet.h"
#include "proto.h"

extern int UtilityMode;

/* Variables */
FILE    *File5,
        *File6;
FILE    *File7;
FILE    *File8;
FILE    *ExoInitFP;
extern FILE *DocErrorFile;

int     SuppressExogenous=0;      /* Added to stop exogenous data from being printed to initial value file */

GraphStackType GraphStack[MAX_GRAPH_STACK];  /* stores equations that go under a single FOR loop - CW 1-22-91 added */
int            GraphStackTop;                /* CW 1-22-91 added */

/* External variables */
extern SymTabEntryPtr MainSymTab[],
                      MacroSymTab[];
extern int     InMACRO,
               ErrorFound;

void
AuxGraphInitVals (HeaderNodePtr DestHeader, STNodePtr TheNode)
{
    int             I;                /* Loop index */
    SymTabEntryPtr  Entry;             /* Pointer to symbol table entry for source variable */
    HeaderNodePtr   SourceHeader;      /* Pointer to GraphNode for source variable */
    ArcNodePtr      TempArc;           /* Temporary pointer to newly allocated memory for Arc */ if ((TheNode == NULL) || (strcmp (DestHeader->Symbol->Name, TheNode->Symbol->Name) == 0))
                                       /* Source and destination variables are the same. Do
        return;                        * nothing. */

AuxGraphInitVals (DestHeader, TheNode->LSon);   /* Recursive call for the destination node's left son */
    AuxGraphInitVals (DestHeader, TheNode->RSon);   /* Recursive call for the destination node's right son */ if ((TheNode->Symbol->Type == FUNCTION) || (TheNode->Symbol->Type == MACROTYPE))
    {                                  /* Is the node a FUNCTION ? */
```

```c
        if ((strcmp (TheNode->Symbol->Name, "SMOOTH") != 0)
            && (strcmp (TheNode->Symbol->Name, "SMOOTH1") != 0)
            && (strcmp (TheNode->Symbol->Name, "SMOOTH3") != 0)
            && (strcmp (TheNode->Symbol->Name, "DELAY") != 0)
            && (strcmp (TheNode->Symbol->Name, "DELAY3") != 0)
            && (strcmp (TheNode->Symbol->Name, "DELAYP") != 0)
            && (strcmp (TheNode->Symbol->Name, "DLINF3") != 0))
            for (I = 0; I < TheNode->AddInfo->NumElements; I++)    /* Yes. */
                AuxGraphInitVals (DestHeader, TheNode->AddInfo->Nodes[I]);    /* Recursively call
                                                                              * AuxGraphLevels for each of
                                                                              * the function's arguments. */
        return;
    }
    else if ((TheNode->Symbol->Type == VARIABLE) && (TheNode->Symbol->VarType == DOUBLE_ARRAY) && (UtilityMode == 0))
    {
        /* For each index of the array
           Check the symbol->Type of the array index
           If the Type == VARIABLE
               AuxGraphInitVals (DestHeader, TheNode->ArrayInfo->Nodes[I]); */
        for (I=0; I<TheNode->AddInfo->NumElements; I++)
            if (TheNode->AddInfo->Nodes[I]->Symbol->Type == VARIABLE)
                AuxGraphInitVals (DestHeader, TheNode->AddInfo->Nodes[I]);
    }
    else if (((TheNode->Symbol->Type == VARIABLE) || (TheNode->Symbol->DataType == INTEGER)) && (UtilityMode == 0))
        return;                     /* If the source is not a VARIABLE */
                                    /* Do no more */
    else if ((UtilityMode > 1) && (TheNode->Symbol->Type != VARIABLE) && (TheNode->Symbol->Type != CONSTANT))
        return;
    else if ((UtilityMode == 1) &&
        ((TheNode->Symbol->Type != VARIABLE) && (TheNode->Symbol->Type != CONSTANT) ||
         (TheNode->Symbol->DataType == INTEGER)))
        return;

/* FIND / CREATE SOURCE HEADER NODE */

Entry = TheNode->Symbol;
    if (Entry->GraphNode == NULL)                    /* Symbol table entry for source variable */
    {
        SourceHeader = (HeaderNodePtr) CheckAlloc (sizeof (HeaderNode));   /* If there is no GraphNode for this entry */
        SourceHeader->NumPred = 0;                                          /* Allocate memory and */
        SourceHeader->FirstArc = NULL;                                      /* Initialize fields. */
        SourceHeader->Symbol = Entry;
        Entry->GraphNode = SourceHeader;
    }
    else
        SourceHeader = Entry->GraphNode;             /* Get the GraphNode for this entry. */ if (FindArc (SourceHeader, DestHeader) == 1)     /* Dependency already exists ? */
        return;                                      /* Yes. Do nothing. */
```

```c
                                /* SET UP NEW ARC AND ATTACH TO SOURCE HEADER */

TempArc = NewArc ();                            /* Allocate memory for new arc */
    TempArc->DestHeader = DestHeader;               /* Set destination header */
    DestHeader->NumPred++;                          /* Increment number of predecessors for dependent variable */
    TempArc->NextArc = SourceHeader->FirstArc;      /* Insert new arc at the head of the list of arcs of the
                                                     * source header */
    SourceHeader->FirstArc = TempArc;

} void
AuxGraphLevels (HeaderNodePtr DestHeader, STNodePtr TheNode)
{
    int             I;                              /* Loop index */
    SymTabEntryPtr  Entry;                          /* Pointer to symbol table entry for source variable */
    HeaderNodePtr   SourceHeader;                   /* Pointer to GraphNode for source variable */
    ArcNodePtr      TempArc;                        /* Temporary pointer to newly allocated memory for Arc */ if ((TheNode == NULL) || (strcmp (DestHeader->Symbol->Name, TheNode->Symbol->Name) == 0))
        return;                                     /* Source and destination variables are the same. Do
                                                     * nothing. */

AuxGraphLevels (DestHeader, TheNode->LSon);     /* Recursive call for the destination node's left son */
    AuxGraphLevels (DestHeader, TheNode->RSon);     /* Recursive call for the destination node's right son */ if ((TheNode->Symbol->Type == FUNCTION) || (TheNode->Symbol->Type == MACROTYPE))
    {                                               /* Is the node a FUNCTION ? */
        for (I = 0; I < TheNode->AddInfo->NumElements; I++)     /* Yes, */
            AuxGraphLevels (DestHeader, TheNode->AddInfo->Nodes[I]);  /* Recursively call
                                                                        * AuxGraphLevels for each of
                                                                        * the function's arguments. */
        return;
    }
    else if ((TheNode->Symbol->EquationType != LEVELTYPE) && (UtilityMode == 0))  /* If the variable is not a level variable */
        return;                                     /* Need do no more. */
    else if ((TheNode->Symbol->Type != VARIABLE) && (TheNode->Symbol->Type != CONSTANT) && (UtilityMode != 0))
        return;

/* FIND / CREATE SOURCE HEADER NODE */

Entry = TheNode->Symbol;                        /* Symbol table entry for source variable */
    if (Entry->GraphNode == NULL)
    {                                               /* If there is no GraphNode for this entry */
        SourceHeader = (HeaderNodePtr) CheckAlloc (sizeof (HeaderNode));    /* Allocate memory and
                                                                             * initialize fields. */
        SourceHeader->NumPred = 0;
        SourceHeader->FirstArc = NULL;
        SourceHeader->Symbol = Entry;
        Entry->GraphNode = SourceHeader;
    }
    else
        SourceHeader = Entry->GraphNode;            /* Get the GraphNode for this entry. */
```

```c
    if (FindArc (SourceHeader, DestHeader) == 1)          /* Dependency already exists ? */
        return;                                            /* Yes. Do nothing. */

/* Direction of arc search changed, SG, May 22 1991 */

/* SET UP NEW ARC AND ATTACH TO SOURCE HEADER */ if (UtilityMode == 0) {
        TempArc = NewArc ();                               /* Allocate memory for new arc */
        TempArc->DestHeader = SourceHeader;                /* Set destination header */
        SourceHeader->NumPred++;                           /* Increment number of predecessors for dependent variable */
        TempArc->NextArc = DestHeader->FirstArc;           /* Insert new arc at the head of the list of arcs of the
                                                            * source header */

DestHeader->FirstArc = TempArc;
    }
    else
    {
        TempArc = NewArc ();                               /* Allocate memory for new arc */
        TempArc->DestHeader = DestHeader;                  /* Set destination header */
        DestHeader->NumPred++;                             /* Increment number of predecessors for dependent variable */
        TempArc->NextArc = SourceHeader->FirstArc;         /* Insert new arc at the head of the list of arcs of the
                                                            * source header */

SourceHeader->FirstArc = TempArc;
    }
} void
AuxGraphRest (HeaderNodePtr DestHeader, STNodePtr TheNode)
{
    int             I;                                     /* Loop index */
    SymTabEntryPtr  Entry;                                 /* Pointer to symbol table entry for source variable */
    HeaderNodePtr   SourceHeader;                          /* Pointer to GraphNode for source variable */
    ArcNodePtr      TempArc;                               /* Temporary pointer to newly allocated memory for Arc */ if ((TheNode == NULL) || (strcmp (DestHeader->Symbol->Name, TheNode->Symbol->Name) == 0))
        return;                                            /* Source and destination variables are the same. Do
                                                            * nothing. */

AuxGraphRest (DestHeader, TheNode->LSon);              /* Recursive call for the destination node's left son */
    AuxGraphRest (DestHeader, TheNode->RSon);              /* Recursive call for the destination node's right son */ if ((TheNode->Symbol->Type == FUNCTION) || (TheNode->Symbol->Type == MACROTYPE))
    {                                                      /* Is the node a FUNCTION ? */
        if ((strcmp (TheNode->Symbol->Name, "SMOOTH1") != 0)
            && (strcmp (TheNode->Symbol->Name, "SMOOTH1I") != 0)
            && (strcmp (TheNode->Symbol->Name, "SMOOTH3") != 0)
            && (strcmp (TheNode->Symbol->Name, "DELAY") != 0)
            && (strcmp (TheNode->Symbol->Name, "DELAY3") != 0)
            && (strcmp (TheNode->Symbol->Name, "DELAYP") != 0)
            && (strcmp (TheNode->Symbol->Name, "DLINF3") != 0))
            for (I = 0; I < TheNode->AddInfo->NumElements; I++)      /* Yes. */       /* Recursively call
                AuxGraphRest (DestHeader, TheNode->AddInfo->Nodes[I]);                 * AuxGraphLevels for each of
                                                                                       * the function's arguments. */
    } return;

else if ((TheNode->Symbol->Type == VARIABLE) && (TheNode->Symbol->VarType == DOUBLE_ARRAY))
```

```c
        for (I=0; I<TheNode->AddInfo->NumElements; I++)
            if (TheNode->AddInfo->Nodes[I]->Symbol->Type == VARIABLE)
                AuxGraphRest (DestHeader,TheNode->AddInfo->Nodes[I]);
    }
    else if ((TheNode->Symbol->EquationType == LEVELTYPE) || (TheNode->Symbol->Type != VARIABLE) ||
             (TheNode->Symbol->DataType == INTEGER))
        /* If the variable is not an Aux. or Rate variable */
        return;                                              /* Need do no more. */

/* FIND / CREATE SOURCE HEADER NODE */

Entry = TheNode->Symbol;                    /* Symbol table entry for source variable */
    if (Entry->GraphNode == NULL)
    {                                            /* If there is no GraphNode for this entry */
        SourceHeader = (HeaderNodePtr) CheckAlloc (sizeof (HeaderNode));  /* Allocate memory and
                                                                            * initialize fields. */
        SourceHeader->NumPred = 0;
        SourceHeader->FirstArc = NULL;
        SourceHeader->Symbol = Entry;
        Entry->GraphNode = SourceHeader;
    }
    else
        SourceHeader = Entry->GraphNode;         /* Get the GraphNode for this entry. */ if (FindArc (SourceHeader, DestHeader) == 1)  /* Dependency already exists ? */
        return;                                   /* Yes. Do nothing. */

/* SET UP NEW ARC AND ATTACH TO SOURCE HEADER */

TempArc = NewArc ();                          /* Allocate memory for new arc */
    TempArc->DestHeader = DestHeader;             /* Set destination header */

DestHeader->NumPred++;                        /* Increment number of predecessors for dependent variable */
    TempArc->NextArc = SourceHeader->FirstArc;    /* Insert new arc at the head of the list of arcs of the
                                                   * source header */
    SourceHeader->FirstArc = TempArc;
} void
GraphInitVals (EquationPtr Equation)
{
    SymTabEntryPtr  Entry;
    HeaderNodePtr   DestHeader;
    EquationPtr     CurEq;

/* SET UP ARCS FROM ALL PREDECESSORS */

CurEq = Equation;
```

```c
        while (CurEq != NULL)
        {
            Entry = CurEq->Equation->LSon->Symbol;
            if (Entry->GraphNode == NULL)
            {
                DestHeader = (HeaderNodePtr) CheckAlloc (sizeof (HeaderNode));
                DestHeader->NumPred = 0;
                DestHeader->FirstArc = NULL;
                DestHeader->Symbol = Entry;
                Entry->GraphNode = DestHeader;
            }
            else
                DestHeader = Entry->GraphNode;

AuxGraphInitVals (DestHeader, CurEq->Equation->RSon);
            CurEq = CurEq->Next;
        }
    } void
GraphLevels (EquationPtr Equation)
{
    SymTabEntryPtr  Entry;
    HeaderNodePtr   DestHeader;
    EquationPtr     CurEq;

CurEq = Equation;
    while (CurEq != NULL)
    {
        Entry = CurEq->Equation->LSon->Symbol;
        if (Entry->GraphNode == NULL)
        {
            DestHeader = (HeaderNodePtr) CheckAlloc (sizeof (HeaderNode));
            DestHeader->NumPred = 0;
            DestHeader->FirstArc = NULL;
            DestHeader->Symbol = Entry;
            Entry->GraphNode = DestHeader;
        }
        else
            DestHeader = Entry->GraphNode;

/* SET UP ARCS FROM ALL PREDECESSORS */

AuxGraphLevels (DestHeader, CurEq->Equation->RSon);
        CurEq = CurEq->Next;
    }
}

ArcNodePtr
NewArc ()
{
    ArcNodePtr   Temp;
    if ((Temp = (ArcNodePtr) calloc (1, sizeof (ArcNode))) == NULL)
    {
```

```c
            fprintf (DocErrorFile, "FATAL ERROR: MEMORY ALLOCATION FAILED INSIDE NewArc.\n");
            fclose(DocErrorFile);
            exit (-1);
        }
        else
            return Temp;
} void
GraphRest (EquationPtr Equation)
{
    SymTabEntryPtr  Entry;
    HeaderNodePtr   DestHeader;
    EquationPtr     CurEq;

/* CREATE GRAPH NODE FOR ENTRY IF NECESSARY */

CurEq = Equation;
    while (CurEq != NULL)
    {
        Entry = CurEq->Equation->LSon->Symbol;

if (Entry->GraphNode == NULL)
        {
            DestHeader = (HeaderNodePtr) CheckAlloc (sizeof (HeaderNode));
            DestHeader->NumPred = 0;
            DestHeader->FirstArc = NULL;
            DestHeader->Symbol = Entry;
            Entry->GraphNode = DestHeader;
        }
        else
            DestHeader = Entry->GraphNode;

/* SET UP ARCS FROM ALL PREDECESSORS */

AuxGraphRest (DestHeader, CurEq->Equation->RSon);
        CurEq = CurEq->Next;
    }
} int
FindArc (HeaderNodePtr SourceHeader, HeaderNodePtr DestHeader)
{
    ArcNodePtr  Cur;
    int         Found = 0;

Cur = SourceHeader->FirstArc;

while ((Cur != NULL) && (Found == 0))
    {
        if (strcmp (Cur->DestHeader->Symbol->Name, DestHeader->Symbol->Name) == 0)
            Found = 1;
        Cur = Cur->NextArc;
    }
}
```

```
              return Found;
         }
%{
/***********************************************************/
/*      FILE: access.l                                     */
/*      COPYRIGHT   1991, DEVONRUE, LTD.                   */
/*      ALL RIGHTS RESERVED.                               */
/***********************************************************/ include <string.h>
include "../latest_parser/prophet.h"
#include "y.tab.h"
define YYSTYPE MYSTRUCT /* Redefine input() so that input to lex will be read in from a file rather than from stdin */
undef input
#define input() (((yytchar=yysptr>yysbuf?U(*--yysptr):getc(yymyin))==10?(yyllneno++,yytchar):yytchar)==EOF?0:yytchar)

/* This is done to make 'yylval' of type 'char *'. */
typedef struct {
                char *token;
                int  col;
} MYSTRUCT;
extern MYSTRUCT yylval;

extern int yycolumn;   /* column that lexical analyzer is positioned at */

FILE *yymyin;          /* file pointer of file that is being parsed */

/* prototypes */
int Token (int);

/* DOCUMENTOR PART */
extern double CurrentEquationNumber;
double temp;
extern int NoOfLines;

%}
%e 500
%p 1604
%n 232
%k 141
%a 1000
%o 1200

Alpha           [A-Za-z]
AlphaNum        [A-Za-z_$0-9]
EndOfLine       \n
UnsignedInt     [0-9]+
Exponentiation  (((E|+"."?[0-9]+)?
Float           (((0-9]+"."?[0-9]*)|([0-9]*"."[0-9]+)){Exponentiation}
String          \"([^\"\n])*\"
WS              [ \t]+
SPACE           [ ]+
TAB             \t
```

```
Comment1                NOTE({WS}.*)?{EndOfLine}
Comment2                {WS}.*{EndOfLine}
Ignore                  ("PRINT"|"OPT"|"DOPT"|"CP"|"CT"|"TP"|"TT"|"OUTPUT"|"QUIT"|"REPLOT"|"RERUN"|"RESTORE"|"RUN"|"SPLOT"|"APPEND"|"INSERT")
%%
{SPACE}                        {yycolumn+=yyleng; }
{TAB}                          {yycolumn=(yycolumn/8+1)*8; }

{EndOfLine}"."/{ \t}           {NoOfLines++; yycolumn=1; }
{EndOfLine}"X"/{ \t}           {NoOfLines++; yycolumn=1; }
"."{ \t}.*{EndOfLine}{WS}?     {NoOfLines++; yycolumn=0; }

{EndOfLine}                    {return Token('\n'); }

^{Comment1}                    {NoOfLines=1; }
^{Comment2}                    {NoOfLines=1; }

^"DMNSN"                       {NoOfLines=1; return Token(DMNSN); }
^"FNCTN"                       {NoOfLines=1; return Token(FNCTN); }
^"FOR"                         {NoOfLines=1; return Token(FOR); }
^"INTRN"                       {NoOfLines=1; return Token(INTRN); }
^"MACRO"                       {NoOfLines=1; return Token(MACRO); }
^"MEND"                        {NoOfLines=1; return Token(MEND); }
^"NOISE"                       {NoOfLines=1; return Token(NOISE); }
^"SAVE"                        {NoOfLines=1; return Token(SAVE); }
^"SPEC"                        {NoOfLines=1; return Token(SPEC); }

^".".*/{EndOfLine}             {NoOfLines=1;
                                yylval.token=strdup(yytext);
                                yylval.token[0]=32;
                                if(sscanf(yylval.token,"%lf",&temp)==1)
                                    CurrentEquationNumber = temp;
                                return Token(SECTOR); }
^{Ignore}{WS}?.*/{EndOfLine}   {NoOfLines=1; }
^[ABCDEIKLNPRSTZV.?]           {NoOfLines=1; return Token(yytext[0]); }

"ABS_ERR"                      {return Token(ABS_ERR); }
"CMP_N_1"                      {return Token(CMP_N_1); }
"CPLOT"                        {return Token(CPLOT); }
"CPRNT"                        {return Token(CPRNT); }
"DT"                           {return Token(DT); }
"LENGTH"                       {return Token(LENGTH); }
"NS_SEED"                      {return Token(NS_SEED); }
"PLOT"                         {return Token(PLOT); }
"PLTPER"                       {return Token(PLTPER); }
"PRINT"                        {return Token(PRINT); }
"PRTPER"                       {return Token(PRTPER); }
"REL_ERR"                      {return Token(REL_ERR); }
"SAVPER"                       {return Token(SAVPER); }
"TIME"                         {return Token(TIME); }
"COMPARE"                      {return Token(COMPARE); }
">="                           {return Token(GE); }
">"                            {return Token('>'); }
```

```
"<="                          {return Token(LE);}
"<"                           {return Token('<');}
"!="                          {return Token(NE);}

[+\-*/()%=,#]                 {return Token(yytext[0]);}

".KL"                         {return Token(SUB_KL);}
".K"                          {return Token(SUB_K);}
".JK"                         {return Token(SUB_JK);}
".J"                          {return Token(SUB_J);}

{Alpha}{AlphaNum}*            {yylval.token=strdup(yytext); return Token(IDENT);}
{UnsignedInt}                 {yylval.token=strdup(yytext); return Token(INT);}
{Float}                       {yylval.token=strdup(yytext); return Token(FLOAT);}
{String}                      {yylval.token=strdup(yytext); return Token(STRING);}

.                             {return Token(BADTOKEN);}

%%

/* Rather than immediately return a token, do a few things to make sure the token is good, and adjust yycolumn and yylval.col */
#ifdef SUN
int Token (Value)
int Value;
#endif
ifndef SUN
int Token (int Value)
#endif
{
    register int l;

/* Max identifier length is 32, unless it is a sector or a string */
    if ((yyleng>32) && (Value!=SECTOR) && (Value!=STRING))
        Value = BADTOKEN;

/* Raise to upper case */
    if (Value == IDENT)
        for (l=0; l<yyleng; l++)
            if ((yylval.token[l] >= 'a') && (yylval.token[l] <= 'z'))
                yylval.token[l]-=32;

yylval.col=yycolumn; /* CW 9-10-90 added to fix error columns */

/* fix yycolumn's value to the proper column */
if (Value=='\n')
    yycolumn=0;
else
    yycolumn+=yyleng;

return Value;
```

```
/***************************************************/
/*    FILE: support_fns.c                          */
/*    COPYRIGHT    1991, DEVONRUE, LTD.            */
/*    ALL RIGHTS RESERVED.                         */
/***************************************************/ include <stdio.h>
include <string.h>
#include <malloc.h>
#include "../latest_parser/prophet.h"
#include "y.tab.h"
#include "proto.h"

/* External variables */
extern FILE *DocErrorFile;
extern int   InMACRO,
             ErrorFound;
extern SymTabEntryPtr MainSymTab[],
                      MacroSymTab[];
extern          SymTabEntryPtr Entry;
extern char *InputFile();
extern int yycolumn, yylineno, BeganStatement;
extern FILE *ErrorFile;
extern int ErrColumn, TableStatement;
extern int FVStackTop;
extern SymTabEntryPtr FVStack[];
extern int UtilityMode;
extern MacroListPtr MacroList;
extern int MacroCount;

/* Variables */
STNodePtr     StackArray[MAX_STACK];      /* Stack of STNodePtr's used by parser */
int           StackTop = 0;                /* Top of that stack */

/* Returns a hash value for the given token */
int
HashSymTab (char *Token)
{
    register char *p;
    register unsigned h = 0,
                      g;
    for (p = Token; *p != 0; p++)
    {
        h = (h << 4) + (*p);
        if (g = h & 0xf0000000)
        {
            h = h ^ (g >> 24);
            h = h ^ g;
        }
    }
    return h % MAX_SYM_TABLE_SIZE;
}
```

```c
/* Looks up the given Token in a symbol table, and returns a
 * pointer to it, or returns NULL if it was not found. */
SymTabEntryPtr
LookUpSymTab (char *Token)
{
    register SymTabEntryPtr Entry;
    register                HashValue;        /* Search status flag, initialized to TRUE. */

/* IF INSIDE A MACRO, FIRST SEARCH FOR LOCAL VARIABLES */ if (InMACRO == TRUE)
    {
        HashValue = HashSymTab (Token);
        for (Entry = MacroSymTab[HashValue]; Entry != NULL; Entry = Entry->Next)
            if (strcmp (Token, Entry->Name) == 0)
                return Entry;
    }

/* IF LOCAL VARIABLE IS NOT FOUND, OR NOT INSIDE A MACRO SEARCH FOR GLOBAL VARIABLES */

HashValue = HashSymTab (Token);
    for (Entry = MainSymTab[HashValue]; Entry != NULL; Entry = Entry->Next)
        if (strcmp (Token, Entry->Name) == 0)
            return Entry;

return NULL;
}

/* Same as LookUpSymTab() but specifically looks up the macro symbol table. */
SymTabEntryPtr
LookUpMacroTab (char *Token)
{
    register SymTabEntryPtr Entry;
    register                HashValue;        /* Search status flag, initialized to TRUE. */
    HashValue = HashSymTab (Token);
    for (Entry = MacroSymTab[HashValue]; Entry != NULL; Entry = Entry->Next)
        if (strcmp (Token, Entry->Name) == 0)
            return Entry;

return NULL;
}

/* Same as LookUpSymTab() but specifically looks up the main symbol table. */
SymTabEntryPtr
LookUpMainTab (char *Token)
{
    register SymTabEntryPtr Entry;
    register                HashValue;        /* Search status flag, initialized to TRUE. */
    HashValue = HashSymTab (Token);
    for (Entry = MainSymTab[HashValue]; Entry != NULL; Entry = Entry->Next)
        if (strcmp (Token, Entry->Name) == 0)
            return Entry;

return NULL;
}
```

```c
/* Inserts Token in a symbol table, and returns a pointer to the
 * new entry.  If the entry is already there, a pointer to the
 * old entry is returned (so nothing new is inserted). */
SymTabEntryPtr
InsertInSymTab (char *Token)
{
    register SymTabEntryPtr Entry = NULL,     /* Pointer to symbol table entry for token */
                            Bucket;            /* Pointer to first entry in bucket */
    register unsigned HashValue;               /* Number of "bucket" containing entry for token */
    Entry = LookUpSymTab (Token);
    if (Entry != NULL)
        return (Entry);
    HashValue = HashSymTab (Token);
    if (InMACRO == FALSE)
        Bucket = MainSymTab[HashValue];
    else
        Bucket = MacroSymTab[HashValue];
    if (((Entry = (SymTabEntryPtr) CheckAlloc (sizeof (*Entry))) != NULL) && ((Entry->Name = strdup (Token)) != NULL))
    {                                          /* New entry created */
        Entry->Next = Bucket;                  /* Insert entry at head of bucket */
        Entry->GraphNode = NULL;
        if (InMACRO == FALSE)
            MainSymTab[HashValue] = Entry;
        else
            MacroSymTab[HashValue] = Entry;
        return Entry;                          /* Return pointer to entry */
    }
    else if (Entry != NULL)                    /* New entry creation failed. If memory was alloted */
        free (Entry);                          /* Release memory and return NULL */
    return NULL;
}

/* Added 8/14/91 */
SymTabEntryPtr
InsertInMainTab (char *Token)
{
    register SymTabEntryPtr Entry = NULL,      /* Pointer to symbol table entry for token */
                            Bucket;             /* Pointer to first entry in bucket */
    register unsigned HashValue;                /* Number of "bucket" containing entry for token */
    Entry = LookUpMainTab (Token);
    if (Entry != NULL)
        return (Entry);
    HashValue = HashSymTab (Token);
    Bucket = MainSymTab[HashValue];
    if (((Entry = (SymTabEntryPtr) CheckAlloc (sizeof (*Entry))) != NULL) && ((Entry->Name = strdup (Token)) != NULL))
    {                                           /* New entry created */
        Entry->Next = Bucket;                   /* Insert entry at head of bucket */
        Entry->GraphNode = NULL;
        MainSymTab[HashValue] = Entry;
        return Entry;                           /* Return pointer to entry */
    }
    else if (Entry != NULL)                     /* New entry creation failed. If memory was alloted */
```

```
            free (Entry);
        return NULL;
}

/* Added 8/14/91 */
SymTabEntryPtr
InsertInMacroTab (char *Token)
{
    register SymTabEntryPtr Entry = NULL,
                            Bucket;
    register unsigned HashValue;
    Entry = LookUpMacroTab (Token);
    if (Entry != NULL)
        return (Entry);
    HashValue = HashSymTab (Token);
    Bucket = MacroSymTab[HashValue];
    if (((Entry = (SymTabEntryPtr) CheckAlloc (sizeof (*Entry))) != NULL) && ((Entry->Name = strdup (Token)) != NULL))
    {
        Entry->Next = Bucket;
        Entry->GraphNode = NULL;
        MacroSymTab[HashValue] = Entry;
        return Entry;
    }
    else if (Entry != NULL)
        free (Entry);
    return NULL;
}

/* Inserts in macro symbol table, returning pointer to the entry. */
SymTabEntryPtr
ForcedInsMacroTab (char *Token)
{
    register SymTabEntryPtr Entry = NULL,
                            Bucket;
    register unsigned HashValue;
    if ((Entry = LookUpMacroTab (Token)) != NULL)
        return Entry;
    HashValue = HashSymTab (Token);
    Bucket = MacroSymTab[HashValue];
    if (((Entry = (SymTabEntryPtr) CheckAlloc (sizeof (*Entry))) != NULL) && ((Entry->Name = strdup (Token)) != NULL))
    {
        Entry->Next = Bucket;
        Entry->GraphNode = NULL;
        MacroSymTab[HashValue] = Entry;
        return Entry;
    }
    else if (Entry != NULL)
        free (Entry);
    return NULL;
}
```

```c
/* Makes an internal node for the Operator, attaching an LSon and
 * an RSon to it.  Returns pointer to the new node. */
STNodePtr
MakeIntNode (char *Operator, STNodePtr LSon, STNodePtr RSon)
{
    register STNodePtr Node;
    if (((Node = (STNodePtr) CheckAlloc (sizeof (*Node))) != NULL) && ((Node->Symbol = LookUpSymTab (Operator)) != NULL))
    {
        Node->LSon = LSon;
        Node->RSon = RSon;
        return Node;
    }
    else if (Node != NULL)
    {
        free (Node);
        fprintf (DocErrorFile, "INTERNAL ERROR: Symbol table entry for operator: %s not found.\n", Operator);
    }
}

/* Makes a leaf node with no children, and returns pointer to it. */
STNodePtr
MakeLeafNode (char *Token)
{
    register STNodePtr Node;
    if (((Node = (STNodePtr) calloc (1, sizeof (*Node))) != NULL) && ((Node->Symbol = InsertInSymTab (Token)) != NULL))
    {
        Node->LSon = Node->RSon = NULL;
        return Node;
    }
    else if (Node != NULL)
    {
        free (Node);
        fprintf (DocErrorFile, "FATAL INTERNAL ERROR: Symbol table entry for token: %s ", Token);
        fprintf (DocErrorFile, " not found.\n", Token);
        fclose (DocErrorFile);
        exit (-1);
    }
    else if (Node == NULL)
    {
        fprintf (DocErrorFile, "FATAL INTERNAL ERROR: Memory allocation failed within MakeLeafNode");
        fclose (DocErrorFile);
        exit (-1);
        return NULL;
    }
}

/* Pushes the STNode onto the stack. */
int
Push (STNodePtr Node)
{
```

```c
        if (StackTop < MAX_STACK)
        {
            StackArray[StackTop] = Node;
            StackTop++;
            return 0;
        }
        else
        {
            fprintf(DocErrorFile, "FATAL INTERNAL ERROR:STACK OVERFLOW\n");
            fclose(DocErrorFile);
            exit (-1);
        }
}

/* Added CW 8/5/91 for new macro handling */
/* Returns element n that is in the stack */
STNodePtr
GetStackElement(int n)
{
        if (n >= StackTop) {
            fprintf(DocErrorFile, "INTERNAL ERROR: GetStackElement called for an element that does not exist\n");
            fclose(DocErrorFile);
            exit (-1);
        }
        return StackArray[n];
}

/* Pops the stack and returns a value, or returns NULL if the stack was empty. */
STNodePtr
Pop ()
{
        if (StackTop > 0)
        {
            StackTop--;
            return StackArray[StackTop];
        }
        else
            return NULL;
}

/* SPop() is same as Pop(), but quits with an error if the stack is empty. */
STNodePtr
SPop ()
{
        if (StackTop > 0)
        {
            StackTop--;
            return StackArray[StackTop];
        }
        else
        {
            fprintf(DocErrorFile, "FATAL ERROR:STACK UNDERFLOW\n");
            fclose(DocErrorFile);
```

```c
            exit (-1);
    }

/* Evaluate the expression contained in an array index, and return its value */
int
EvaluateIndex (STNodePtr TheNode)
{
    char        NumberString[32];
    int         Value;
    if (TheNode == NULL)
        return 0;

switch (TheNode->Symbol->Type)
    {
    case NUMBER:
        sprintf (NumberString, "%s", TheNode->Symbol->Name);
        sscanf (NumberString, "%d", &Value);
        break;
    case CONSTANT:
        sprintf (NumberString, "%s", TheNode->Symbol->InitValEquation->Equation->RSon->Symbol->Name);
        sscanf (NumberString, "%d", &Value);
        break;

case OPERATOR:
        if (strcmp ("+", TheNode->Symbol->Name) == 0)
            Value = EvaluateIndex (TheNode->LSon) + EvaluateIndex (TheNode->RSon);
        else if (strcmp ("-", TheNode->Symbol->Name) == 0)
            Value = EvaluateIndex (TheNode->LSon) - EvaluateIndex (TheNode->RSon);
        else
            Value = 0;
        break;

case VARIABLE:
        if ((TheNode->Symbol->DataType == INTEGER) && (TheNode->Symbol->AddInfo != NULL))
            Value = TheNode->Symbol->AddInfo->LoopIndexInfo.CurVal;
        else
            Value = 0;
        break;

default:
        Value = 0;
    } return Value;
}

/* Evaluate a constant definition and return it */
double
EvaluateConstant (STNodePtr TheNode)
{
```

```c
        char        NumberString[32];
        double      Value;
        if (TheNode == NULL)
            return 0;

switch (TheNode->Symbol->Type)
        {
        case NUMBER:
            sprintf (NumberString, "%s", TheNode->Symbol->Name);
            sscanf (NumberString, "%lf", &Value);
            break;
        case OPERATOR:
            if (strcmp ("+", TheNode->Symbol->Name) == 0)
                Value = EvaluateConstant (TheNode->LSon) + EvaluateConstant (TheNode->RSon);
            else if (strcmp ("-", TheNode->Symbol->Name) == 0)
                Value = EvaluateConstant (TheNode->LSon) - EvaluateConstant (TheNode->RSon);
            else
                Value = 0;
            break;

default:
            Value = 0;
            fprintf (DocErrorFile, "ERROR: In EvaluateConstant, Node = \"%s\".\n", TheNode->Symbol->Name);
        } return Value;
} int
EvaluateDimension (STNodePtr TheNode)
{
        char        NumberString[32];
        int         Value;
        if (TheNode == NULL)
            return 0;

switch (TheNode->Symbol->Type)
        {
        case NUMBER:
            sprintf (NumberString, "%s", TheNode->Symbol->Name);
            sscanf (NumberString, "%d", &Value);
            break;

case CONSTANT:
            sprintf (NumberString, "%s", TheNode->Symbol->InitValEquation->Equation->RSon->Symbol->Name);
            sscanf (NumberString, "%d", &Value);
            break;

case OPERATOR:
            if (strcmp ("+", TheNode->Symbol->Name) == 0)
                Value = EvaluateIndex (TheNode->LSon) + EvaluateIndex (TheNode->RSon);
            else if (strcmp ("-", TheNode->Symbol->Name) == 0)
```

```
                    Value = EvaluateIndex (TheNode->LSon) - EvaluateIndex (TheNode->RSon);
        else
            Value = 0;
        break;

case VARIABLE:
        if ((TheNode->Symbol->DataType == INTEGER) && (TheNode->Symbol->AddInfo != NULL))
            Value = TheNode->Symbol->AddInfo->LoopIndexInfo.HighLimit;
        else
            Value = 0;
        break;

default:
        Value = 0;

} return Value;

}

/* Added CW 8/5/91 to duplicate a tree/node for new macros */
STNodePtr
DuplicateNode (STNodePtr TheNode)
{
    int         I;
    STNodePtr   Duplicate;

if (TheNode == NULL)
        return NULL;

Duplicate = (STNodePtr) CheckAlloc(sizeof(*Duplicate));

Duplicate->Symbol = TheNode->Symbol;
    if ((TheNode->RSon != NULL))
        Duplicate->RSon = DuplicateNode (TheNode->RSon);
    else
        Duplicate->RSon = NULL;
    if ((TheNode->LSon != NULL))
        Duplicate->LSon = DuplicateNode (TheNode->LSon);
    else
        Duplicate->LSon = NULL;

if (TheNode->AddInfo != NULL) {
        Duplicate->AddInfo = NewSTAddInfo ();
        Duplicate->AddInfo->NumElements = TheNode->AddInfo->NumElements;
        for (I = 0; I < Duplicate->AddInfo->NumElements; I++)
            Duplicate->AddInfo->Nodes[I] = DuplicateNode (TheNode->AddInfo->Nodes[I]);
    } return (Duplicate);
}
```

```c
/* Prints a syntax tree for the given STNode, to file fp, in C format. */
void
PrintSyntaxTree (FILE * fp, STNodePtr TheNode)
{
    static STNodePtr    LHS = NULL;     /* Statically stores LHS of '=' for reference later in the recursion */
    int                 i,
                        Number,
                        Dimension,
                        Arg,
                        ThisIsAnEqualitySign = FALSE,  /* Flag to indicate if current node is =, -=, or += */
                        PrintParens = FALSE;           /* Only print parenthesis when this is TRUE - reduces parenthesis generation */
                        PrintSyntaxTreeLevel = 0;      /* Stores recursion level, because we dont want parenthesis around first 2 */
    static int
    SymTabEntryPtr      Entry,
                        CurArg;
    char                NumString[32],
                        BadArgument;       /* Flag that indicates if a function argument was bad */

/* This function also has the additional purpose of detecting type mismatches during function calls.
     * BadArgument will be set to TRUE when such a condition is found, in order to prevent duplicate
     * errors from being reported. */
    BadArgument = FALSE;

if (TheNode == NULL)
        return;

/* Keep track of what level of nesting this function is currently at.  Used for reducing parenthesis
     * around the outside of an equation */
    PrintSyntaxTreeLevel++;

/* Determine if this is an equality sign.  If it is, then don't print any parenthesis around it. */
    if ((strcmp (TheNode->Symbol->Name, "=") == 0) || (strcmp (TheNode->Symbol->Name, "+=") == 0) ||
        (strcmp (TheNode->Symbol->Name, "-=") == 0))
    {
        ThisIsAnEqualitySign = TRUE;
        LHS = TheNode->LSon;
    }

/* Print a parenthesis if necessary */
    if ((TheNode->LSon != NULL) && (ThisIsAnEqualitySign == FALSE) && (PrintSyntaxTreeLevel > 2))
    {
        PrintParens = TRUE;
        fprintf (fp, "(");
    }

/* Recursively print the left son */
    PrintSyntaxTree (fp, TheNode->LSon);

/* CODE TO PRINT OUT THE CURRENT NODE */

/* Print out symbol name (args & indices come later) */
    fprintf (fp, "%s", TheNode->Symbol->Name);
    Entry = TheNode->Symbol;
```

```c
/* Print out macro arguments if it is a macro call */
if (Entry->Type == MACROTYPE)
{
    if (TheNode->AddInfo->NumElements != Entry->AddInfo->FunctionInfo.NumArguments) {
        fprintf(DocErrorFile,"ERROR: Number of arguments for function \"%s\" is inconsistent in the equation file.\n",
                Entry->Name);
        ErrorFound=TRUE;
        return;
    }
    fprintf(fp,"(");
    if (TheNode->AddInfo != NULL)
    {
        /* for (I = 0; I < Entry->AddInfo->FunctionInfo.NumArguments; I++) */
        for (I = 0; I < TheNode->AddInfo->NumElements; I++)
        {
            if (I>0)
                fprintf (fp, ",");
            if ((I == 2) && (strcmp (Entry->Name, "DELAYP") == 0))      /* Special case for DELAYP */
                fprintf (fp, "&");
            PrintSyntaxTree (fp, TheNode->AddInfo->Nodes[I]);
        }
    }
    fprintf (fp, ")");
}
/* Print out arguments for function call */
else if (Entry->Type == FUNCTION)
{
    /* Number of arguments must match */
    if (TheNode->AddInfo->NumElements != Entry->AddInfo->FunctionInfo.NumArguments) {
        fprintf(DocErrorFile,"ERROR: Number of arguments for function \"%s\" is inconsistent in the equation file.\n",
                Entry->Name);
        ErrorFound=TRUE;
        return;
    }
    fprintf (fp, "(");
    CurArg = TheNode->AddInfo->Nodes[0]->Symbol;
    if (CurArg->PrintType == -1)
        fprintf (fp, "FirstArg->");
    if ((Entry->AddInfo->FunctionInfo.ArgumentType[0] == DOUBLE) && (CurArg->DataType != DOUBLE) &&
        (CurArg->DataType != DOUBLE_ARRAY)
        fprintf (fp, "(double)");
    if (Entry->PrintType != -2)
        PrintSyntaxTree (fp, TheNode->AddInfo->Nodes[0]);
    else
        fprintf (fp, "%s", CurArg->Name)
    for (Arg = 1; Arg < Entry->AddInfo->FunctionInfo.NumArguments; Arg++)
    {
        CurArg = TheNode->AddInfo->Nodes[Arg]->Symbol;
        if (Entry->AddInfo->FunctionInfo.ArgumentType[Arg] == DOUBLE_ARRAY)
            fprintf (fp, ",");
```

```
            if (Entry->PrintType == -1)
                fprintf (fp, "FirstArg->");
            if (Entry->PrintType != -2)
                PrintSyntaxTree (fp, TheNode->AddInfo->Nodes[Arg]);
            else
                fprintf (fp, "%s", CurArg->Name);
            }
        else
            {
            if ((CurArg->DataType != DOUBLE) && (CurArg->DataType != DOUBLE_ARRAY))
                fprintf (fp, ", (double)");
            else
                fprintf (fp, ", ");
            PrintSyntaxTree (fp, TheNode->AddInfo->Nodes[Arg]);
            }
        }

/* PRINT OUT THE ARGUMENTS "C" REQUIRES */ for (Arg = 0; Arg < Entry->AddInfo->FunctionInfo.NumArguments; Arg++)
        {
        CurArg = TheNode->AddInfo->Nodes[Arg]->Symbol;
        if (Entry->AddInfo->FunctionInfo.ArgumentType[Arg] == DOUBLE_ARRAY)
            {                                   /* Make sure array args are actually arrays */
            if (CurArg->AddInfo == NULL)
                {
                BadArgument = TRUE;
                ErrorFound = TRUE;
                fprintf (DocErrorFile, "ERROR: Argument %d of function %s requires an array.\n", Arg + 1, Entry->Name);
                }
            else
                fprintf (fp, ", %d", CurArg->AddInfo->ArrayInfo.NumDimensions);
            }
        } if (BadArgument == FALSE)
        {
        for (Arg = 0; Arg < Entry->AddInfo->FunctionInfo.NumArguments; Arg++)
            {
            CurArg = TheNode->AddInfo->Nodes[Arg]->Symbol;
            if (Entry->AddInfo->FunctionInfo.ArgumentType[Arg] == DOUBLE_ARRAY)
                {
                for (Dimension = 0; Dimension < CurArg->AddInfo->ArrayInfo.NumDimensions; Dimension++)
                    fprintf (fp, ", %d", CurArg->AddInfo->ArrayInfo.DimensionSize[Dimension]);
                for (Dimension = 0; Dimension < CurArg->AddInfo->ArrayInfo.NumDimensions; Dimension++)
                    {
                    fprintf (fp, ", ");
                    if (CurArg->AddInfo->ArrayInfo.NumDimensions == 1)
                        fprintf (fp, "0,0");
                    else
                        {
                        if (CurArg->DataType != DOUBLE)
                            fprintf (fp, "(double)");
                        PrintSyntaxTree (fp, TheNode->AddInfo->Nodes[Arg]->AddInfo->Nodes[Dimension]);
                        if ((TheNode->AddInfo->Nodes[Arg]->AddInfo->Nodes[Dimension]->Symbol->Type == VARIABLE) &&
                            (TheNode->AddInfo->Nodes[Arg]->AddInfo->Nodes[Dimension]->Symbol->DataType == INTEGER))
                            fprintf (fp, "+1.0");
```

```c
            fprintf (fp, ")");
        }                                       /* if */
    }
    else if (TheNode->AddInfo != NULL)          /* It is an array */
    {
        if (TheNode->Symbol->AddInfo != NULL)
        {
            for (I = 0; I < TheNode->AddInfo->NumElements; I++)
            {
                fprintf (fp, "[");
                if (TheNode->AddInfo->Nodes[I]->Symbol->DataType != INTEGER)
                    fprintf (fp, "(int)");

if (TheNode->AddInfo->Nodes[I]->Symbol->Type == NUMBER)
                {
                    sprintf (NumString, "%s", TheNode->AddInfo->Nodes[I]->Symbol->Name);
                    sscanf (NumString, "%d", &Number);
                    fprintf (fp, "%d", (Number > 0) ? Number - 1 : 0);
                }
                else
                {
                    PrintSyntaxTree (fp, TheNode->AddInfo->Nodes[I]);
                    if (TheNode->AddInfo->Nodes[I]->Symbol->Type == CONSTANT)
                        fprintf (fp, "-1");
                }
                fprintf (fp, "]");
            }
        }
    }

/* Recursively print out the right son */
    PrintSyntaxTree (fp, TheNode->RSon);

/* Print close parenthesis */
    if (PrintParens == TRUE)
        fprintf (fp, ")");

PrintSyntaxTreeLevel--;
}

/* CW 9-7-90 : Makes it easier to put a token in symbol table and initialize Type and DataType fields */
```

```c
void
InitializeTokenInSymTab (char *Token, TokenType Type, TokenDataType DataType)
{
    Entry = InsertInSymTab (Token);
    Entry->Type = Type;
    Entry->DataType = DataType;
}

/* CW 9-7-90 : Makes it easier to put a function in symbol table and initialize Type and AddInfo, fields */
void
InitializeFunctionInSymTab (char *Token, int NumberOfArguments)
{
    SymTabEntryPtr Entry;
    Entry = InsertInSymTab (Token);
    Entry->Type = FUNCTION;
    if ((Entry->AddInfo = (AddInfoPtr) calloc (1, sizeof (AddFunctionInfo))) == NULL)
    {
        fprintf (DocErrorFile, "INTERNAL ERROR: malloc failed for InitializeFunctionInSymTab.\n");
        fclose (DocErrorFile);
        exit (-1);
    }
    Entry->AddInfo->FunctionInfo.NumArguments = NumberOfArguments;
}

/* Delete one tree recursively */
void
DeleteTree (STNodePtr Tree)
{
    register char i;
    if (Tree != NULL)
    {
        DeleteTree (Tree->LSon);
        DeleteTree (Tree->RSon);

/* Free the additional info */
        if (Tree->AddInfo != NULL)
        {
            for (i = 0; i < Tree->AddInfo->NumElements; i++)
                DeleteTree (Tree->AddInfo->Nodes[i]);
            free (Tree->AddInfo);
        } free (Tree);
    }
}

/* Frees one table (either the main symbol table, or a macro symbol table) */
void
FreeATable (SymTabEntryPtr Table[])
{
    register int i;
    register SymTabEntryPtr Entry,
                            Entry2;
```

```c
register EquationPtr Equation,
                     Equation2;
register ArcNodePtr Arc,
                    Arc2;
/* Get rid of everything in the symbol table */ for (i = 0; i < MAX_SYM_TABLE_SIZE; i++)
{
    Entry = Table[i];
    while (Entry != NULL)
    {
        Entry2 = Entry->Next;

/* First free the AddInfo field */
        if (Entry->AddInfo != NULL)
            free (Entry->AddInfo);

/* Next free the InitValEquation field. Need to free a linked list of them. */
        Equation = Entry->InitValEquation;
        while (Equation != NULL)
        {
            Equation2 = Equation->Next;
            DeleteTree (Equation->Equation);   /* First, free the equation field */
            free (Equation);                    /* Finally, free the node itself */
            Equation = Equation2;
        }

/* Next free the ActiveValEquation field. Need to free a linked list of them. */
        Equation = Entry->ActiveValEquation;
        while (Equation != NULL)
        {
            Equation2 = Equation->Next;
            DeleteTree (Equation->Equation);   /* First, free the equation field */
            free (Equation);                    /* Finally, free the node itself */
            Equation = Equation2;
        }

/* Free the graph node and the list of arcs attached to it */
        if (Entry->GraphNode != NULL)
        {
            Arc = Entry->GraphNode->FirstArc;
            free (Entry->GraphNode);
            while (Arc != NULL)
            {
                Arc2 = Arc->NextArc;
                free (Arc);
                Arc = Arc2;
            }
        }

/* Finally, free the symbol table entry itself */
        free (Entry);

Entry = Entry2;
```

```c
/* Combine the input files into a single temporary file so it can later be parsed as one file.
** NOTE ** Currently, 'pp' is not doing this. It is just returning the same file name that was passed to it. */
char *
ConcatenateInputFiles (char *Name)
{
    FILE        *in,
                *out,
                *in1;
    char        Line[MAX_LENGTH_OF_SOURCE_LINE],
                Line2[MAX_LENGTH_OF_SOURCE_LINE];
    int         Count,
                i;
    char        Result[MAX_BUF_LENGTH];

if (UtilityMode != 0) {  /* If not "pp" utility */

/* Open the file that contains a list of filenames to concatenate. The format of the file is:
        #n
        name 1
        name 2
        ......
        name n
    An example would look like this:
        2
        foo.phm
        bar.phm
    */
    if ((in = fopen (Name, "r")) == NULL)
    {
        fprintf (DocErrorFile, "ERROR: Could not open file %s.\n", Name);
        fclose(DocErrorFile);
        exit (-1);
    }

/* Open temporary file for writing */
    if ((out = fopen (DEFAULT_TEMP_FILE_NAME, "w")) == NULL)
    {
        fprintf (DocErrorFile, "ERROR: Could not open file %s.\n", DEFAULT_TEMP_FILE_NAME);
        fclose(DocErrorFile);
        exit (-1);
    }

/* Read number of filenames to read in */
    fgets (Line, MAX_BUF_LENGTH, in1);
    if (sscanf (Line, "%d", &Count) != 1)
    {
        fprintf (DocErrorFile, "ERROR: Could not find the number of files to read in.\n");
        fclose(DocErrorFile);
        exit (-1);
    }
```

```
/* Read in each file, and write it back out to the temporary file (concatenates them) */
for (i = 0; i < Count; i++)
{
    fgets (Line, MAX_BUF_LENGTH, in);
    if (sscanf (line, "%s", Line2) == 1)
    {
        if ((in1 = fopen (Line2, "r")) == NULL)
        {
            fprintf (DocErrorFile, "ERROR: Could not open file %s.\n", Line2);
            fclose(DocErrorFile);
            exit (-1);
        }
        printf ("Reading file %s\n", Line2);
        if (UtilityMode != 0)
            if (i==0)
                strcpy(Result,Line2);
        fgets (Line, MAX_LENGTH_OF_SOURCE_LINE, in1);
        while (!feof (in1))
        {
            fputs (Line, out);
            fgets (Line, MAX_LENGTH_OF_SOURCE_LINE, in1);
        }
        fclose (in1);
    }
    else
    {
        fprintf (DocErrorFile, "ERROR: Error reading the input file %s.\n", Name);
        fclose(DocErrorFile);
        exit (-1);
    }
} fclose (out);
fclose (in);

strcpy (InputFile, DEFAULT_TEMP_FILE_NAME);
}
else
    strcpy(InputFile,Name);

return Result;
}

/* Used for writing info about an error to the error file, when the error was detected by the actions, rather than detected as a
   syntax error. */
void
parse_error (int ErrNo, recover_strategy recovery)
{
    register int    tmp,
                    number,
                    dummy;
```

```c
        /* The column needs to be adjusted by 1, if the current parse location is at the beginning of the next line. */
        if (yycolumn == 0)
            dummy = -1;
        else
            dummy = 0;

/* Print out error info to file */
        number = yylineno + dummy;
        if (BeganStatement == TRUE)
            fprintf (ErrorFile, "%d %d\n", number, ErrColumn, ErrNo);    /* Write error to the error file */
        else
            fprintf (ErrorFile, "%d %d\n", number, 0, 0);

/* Determine how to recover from the error */
        switch (recovery)
        {
            case DIE:    /* Print all errors now, quit parsing, then terminate program */
                fclose (ErrorFile);
                PrintOutErrors ();
                fprintf (DocErrorFile, "ERROR: Last error was fatal error.  Prophet is aborting.\n");
                fclose(DocErrorFile);
                exit (-1);
            case FLUSH:  /* Toss out all tokens on the current line until end of line is reached */
                BeganStatement = FALSE;
                while (Pop () != NULL);
                if (dummy == 0)
                    while ((tmp = yylex ()) != '\n' && tmp != 0);
                return;
            case CONTINUE:
                return;
            case WARNING:
                return;
            default:
                fprintf (DocErrorFile, "INTERNAL ERROR:  in function parse_error - bad recovery\n");
        }

TableStatement = FALSE;   /* Added CW 6/22/91, turn this var off if an error occurs before it can be turned off
                                   * by the appropriate rule. */
    }

/* Allocate memory for AddSyntaxTreeInfoPtr */
AddSyntaxTreeInfoPtr
NewSTAddInfo ()
{
    AddSyntaxTreeInfoPtr Ptr;
    if ((Ptr = (AddSyntaxTreeInfoPtr) calloc (1, sizeof (*Ptr))) == NULL)
    {
        fprintf (DocErrorFile, "INTERNAL ERROR: malloc failed for AddSyntaxTreeInfo %d.\n", yylineno);
        fclose(DocErrorFile);
        exit (-1);
    }
    else
        return Ptr;
```

```c
/* Allocate memory for AddInfoPtr */
AddInfoPtr
NewSymTabAddInfo ()
{
    AddInfoPtr      Ptr;
    if ((Ptr = (AddInfoPtr) calloc (1, sizeof (*Ptr))) == NULL)
    {
        fprintf (DocErrorFile, "INTERNAL ERROR: malloc failed for NewSymTabAddInfo.\n");
        fclose(DocErrorFile);
        exit (-1);
    }
    else
        return Ptr;
}

/* Adds variable to the FOR variable stack */
int
AddToFVStack (SymTabEntryPtr Entry)
{
    register int    Found = 0,
                    I = 0;

while ((I <= FVStackTop) && (Found == 0))
    {
        if (strcmp (Entry->Name, FVStack[I]->Name) == 0)
            Found = 1;
        I++;
    } if (Found == 0)
    {
        FVStackTop++;
        if (FVStackTop >= MAX_DIMENSIONS)
        {
            fclose(ErrorFile);
            PrintOutErrors();
            fprintf (DocErrorFile, "INTERNAL ERROR: Too many 'FOR' variables in statement.\n");
            fclose(DocErrorFile);
            exit (-1);
        }
        else
            FVStack[FVStackTop] = Entry;
    }
}

/* Print headers for code generation */
int
PrintHeaders (FILE * fp)
{
#ifdef SUN
    fprintf (fp, "#include <varargs.h>\n");
```

```
#endif
ifndef SUN
    fprintf (fp, "#include <stdarg.h>\n");
endif fprintf (fp, "#include \"math.h>\n");
    fprintf (fp, "#include \"numr.h\"\n");
    fprintf (fp, "#include \"macros.h\"\n");
    fprintf (fp, "#include \"ourmath.h\"\n");
    fprintf (fp, "#include \"local.h\"\n");
    fprintf (fp, "#include \"var_decl.h\"\n");
}

/* InitializeSymbolTable initializes the symbol table with operators and functions that are built-in to prophet */
void
InitializeSymbolTable ()
{
    InitializeTokenInSymTab ("+", OPERATOR, UNINITIALIZED);
    InitializeTokenInSymTab ("-", OPERATOR, UNINITIALIZED);
    InitializeTokenInSymTab ("/", OPERATOR, UNINITIALIZED);
    InitializeTokenInSymTab ("*", OPERATOR, UNINITIALIZED);
    InitializeTokenInSymTab ("$", OPERATOR, UNINITIALIZED);
    InitializeTokenInSymTab ("-=", OPERATOR, UNINITIALIZED);
    InitializeTokenInSymTab ("=", OPERATOR, UNINITIALIZED);
    InitializeTokenInSymTab ("+=", OPERATOR, UNINITIALIZED);
    InitializeTokenInSymTab ("--", OPERATOR, UNINITIALIZED);
    InitializeTokenInSymTab ("DT", CONSTANT, DOUBLE);
    InitializeTokenInSymTab ("TIME", VARIABLE, DOUBLE);
    InitializeTokenInSymTab ("LENGTH", CONSTANT, DOUBLE);
    InitializeTokenInSymTab ("PLTPER", CONSTANT, DOUBLE);
    InitializeTokenInSymTab ("PRTPER", CONSTANT, DOUBLE);
    InitializeTokenInSymTab ("SAVPER", CONSTANT, DOUBLE);
    InitializeTokenInSymTab ("ABS_ERR", CONSTANT, DOUBLE);
    InitializeTokenInSymTab ("REL_ERR", CONSTANT, DOUBLE);
    InitializeTokenInSymTab ("CMP_N_1", CONSTANT, DOUBLE);
    InitializeTokenInSymTab ("NS_SEED", CONSTANT, INTEGER);
    InitializeTokenInSymTab ("0", NUMBER, INTEGER);
    InitializeTokenInSymTab ("0.0", NUMBER, DOUBLE);

InitializeFunctionInSymTab ("ABS", 1);
    InitializeFunctionInSymTab ("ACOS", 1);
    InitializeFunctionInSymTab ("ASIN", 1);
    InitializeFunctionInSymTab ("ATAN", 1);
    InitializeFunctionInSymTab ("COS", 1);
    InitializeFunctionInSymTab ("EXP", 1);
    InitializeFunctionInSymTab ("LOGN", 1);
    InitializeFunctionInSymTab ("LOG10", 1);
    InitializeFunctionInSymTab ("PERCENT", 1);
    InitializeFunctionInSymTab ("POW", 2);
    InitializeFunctionInSymTab ("pow", 2);                /* C function */
    InitializeFunctionInSymTab ("ROUND", 1);
    InitializeFunctionInSymTab ("SIN", 1);
    InitializeFunctionInSymTab ("SQRT", 1);
    InitializeFunctionInSymTab ("TRUNCATE", 1);
    InitializeFunctionInSymTab ("MAX", 2);
```

```
InitializeFunctionInSymTab ("MIN", 2);

InitializeFunctionInSymTab ("TABLE", 5);
Entry = LookUpSymTab ("TABLE");
Entry->AddInfo->FunctionInfo.ArgumentType[0] = DOUBLE_ARRAY;
Entry->AddInfo->FunctionInfo.ArgumentType[1] = DOUBLE;
Entry->AddInfo->FunctionInfo.ArgumentType[2] = DOUBLE;
Entry->AddInfo->FunctionInfo.ArgumentType[3] = DOUBLE;
Entry->AddInfo->FunctionInfo.ArgumentType[4] = DOUBLE;
Entry->PrintType = -2;

InitializeFunctionInSymTab ("TABHL", 5);
Entry = LookUpSymTab ("TABHL");
Entry->AddInfo->FunctionInfo.ArgumentType[0] = DOUBLE_ARRAY;
Entry->AddInfo->FunctionInfo.ArgumentType[1] = DOUBLE;
Entry->AddInfo->FunctionInfo.ArgumentType[2] = DOUBLE;
Entry->AddInfo->FunctionInfo.ArgumentType[3] = DOUBLE;
Entry->AddInfo->FunctionInfo.ArgumentType[4] = DOUBLE;
Entry->PrintType = -2;

InitializeFunctionInSymTab ("TABXT", 5);
Entry = LookUpSymTab ("TABXT");
Entry->AddInfo->FunctionInfo.ArgumentType[0] = DOUBLE_ARRAY;
Entry->AddInfo->FunctionInfo.ArgumentType[1] = DOUBLE;
Entry->AddInfo->FunctionInfo.ArgumentType[2] = DOUBLE;
Entry->AddInfo->FunctionInfo.ArgumentType[3] = DOUBLE;
Entry->AddInfo->FunctionInfo.ArgumentType[4] = DOUBLE;
Entry->PrintType = -2;

InitializeFunctionInSymTab ("TABPL", 5);
Entry = LookUpSymTab ("TABPL");
Entry->AddInfo->FunctionInfo.ArgumentType[0] = DOUBLE_ARRAY;
Entry->AddInfo->FunctionInfo.ArgumentType[1] = DOUBLE;
Entry->AddInfo->FunctionInfo.ArgumentType[2] = DOUBLE;
Entry->AddInfo->FunctionInfo.ArgumentType[3] = DOUBLE;
Entry->AddInfo->FunctionInfo.ArgumentType[4] = DOUBLE;
Entry->PrintType = -2;

InitializeFunctionInSymTab ("CLIP", 4);
Entry = LookUpSymTab ("CLIP");
Entry->AddInfo->FunctionInfo.ArgumentType[0] = DOUBLE;
Entry->AddInfo->FunctionInfo.ArgumentType[1] = DOUBLE;
Entry->AddInfo->FunctionInfo.ArgumentType[2] = DOUBLE;
Entry->AddInfo->FunctionInfo.ArgumentType[3] = DOUBLE;

InitializeFunctionInSymTab ("FIFGE", 4);
Entry = LookUpSymTab ("FIFGE");
Entry->AddInfo->FunctionInfo.ArgumentType[0] = DOUBLE;
Entry->AddInfo->FunctionInfo.ArgumentType[1] = DOUBLE;
Entry->AddInfo->FunctionInfo.ArgumentType[2] = DOUBLE;
Entry->AddInfo->FunctionInfo.ArgumentType[3] = DOUBLE;

InitializeFunctionInSymTab ("SWITCH", 3);
Entry = LookUpSymTab ("SWITCH");
```

```
        Entry->AddInfo->FunctionInfo.ArgumentType[0] = DOUBLE;
        Entry->AddInfo->FunctionInfo.ArgumentType[1] = DOUBLE;
        Entry->AddInfo->FunctionInfo.ArgumentType[2] = DOUBLE;

InitializeFunctionInSymTab ("FIFGE", 3);
        Entry = LookUpSymTab ("FIFGE");
        Entry->AddInfo->FunctionInfo.ArgumentType[0] = DOUBLE;
        Entry->AddInfo->FunctionInfo.ArgumentType[1] = DOUBLE;
        Entry->AddInfo->FunctionInfo.ArgumentType[2] = DOUBLE;
        Entry->AddInfo->FunctionInfo.ArgumentType[3] = DOUBLE;

if (UtilityMode != 0) {
        InitializeFunctionInSymTab ("DELAY", 2);
        Entry = LookUpSymTab ("DELAY");
        Entry->Type = MACROTYPE;

InitializeFunctionInSymTab ("DELAY1", 2);
        Entry = LookUpSymTab ("DELAY1");
        Entry->Type = MACROTYPE;
        Entry->AddInfo->FunctionInfo.NumLocalVars = 1;
        Entry->AddInfo->FunctionInfo.LocalVars[0] = strdup ("Level");

InitializeFunctionInSymTab ("DELAY3", 2);
        Entry = LookUpSymTab ("DELAY3");
        Entry->Type = MACROTYPE;
        Entry->AddInfo->FunctionInfo.NumLocalVars = 6;
        Entry->AddInfo->FunctionInfo.LocalVars[0] = strdup ("Level1");
        Entry->AddInfo->FunctionInfo.LocalVars[1] = strdup ("Level2");
        Entry->AddInfo->FunctionInfo.LocalVars[2] = strdup ("Level3");
        Entry->AddInfo->FunctionInfo.LocalVars[3] = strdup ("Rate1");
        Entry->AddInfo->FunctionInfo.LocalVars[4] = strdup ("Rate2");
        Entry->AddInfo->FunctionInfo.LocalVars[5] = strdup ("DelPerLev");

InitializeFunctionInSymTab ("DELAYP", 3);
        Entry = LookUpSymTab ("DELAYP");
        Entry->Type = MACROTYPE;
        Entry->AddInfo->FunctionInfo.NumLocalVars = 6;
        Entry->AddInfo->FunctionInfo.LocalVars[0] = strdup ("Level1");
        Entry->AddInfo->FunctionInfo.LocalVars[1] = strdup ("Level2");
        Entry->AddInfo->FunctionInfo.LocalVars[2] = strdup ("Level3");
        Entry->AddInfo->FunctionInfo.LocalVars[3] = strdup ("Rate1");
        Entry->AddInfo->FunctionInfo.LocalVars[4] = strdup ("Rate2");
        Entry->AddInfo->FunctionInfo.LocalVars[5] = strdup ("DelPerLev");

InitializeFunctionInSymTab ("DLINF3", 2);
        Entry = LookUpSymTab ("DLINF3");
        Entry->Type = MACROTYPE;

InitializeFunctionInSymTab ("SMOOTH", 2);
        Entry = LookUpSymTab ("SMOOTH");
        Entry->Type = MACROTYPE;

InitializeFunctionInSymTab ("NOISE", 0);
```

```
InitializeFunctionInSymTab ("NORMRN", 2);
InitializeFunctionInSymTab ("PDPULSE", 4);
InitializeFunctionInSymTab ("PULSE", 3);
InitializeFunctionInSymTab ("SAMPLE", 3);

InitializeFunctionInSymTab ("SMOOTH1", 2);
Entry = LookUpSymTab ("SMOOTH1");
Entry->Type = MACROTYPE;
Entry->AddInfo->FunctionInfo.NumLocalVars = 1;
Entry->AddInfo->FunctionInfo.LocalVars[0] = strdup ("Delta");

InitializeFunctionInSymTab ("SMOOTH3", 2);
Entry = LookUpSymTab ("SMOOTH3");
Entry->Type = MACROTYPE;
Entry->AddInfo->FunctionInfo.NumLocalVars = 5;
Entry->AddInfo->FunctionInfo.LocalVars[0] = strdup ("Level1");
Entry->AddInfo->FunctionInfo.LocalVars[1] = strdup ("Level2");
Entry->AddInfo->FunctionInfo.LocalVars[2] = strdup ("Delta1");
Entry->AddInfo->FunctionInfo.LocalVars[3] = strdup ("Delta2");
Entry->AddInfo->FunctionInfo.LocalVars[4] = strdup ("Delta3");

InitializeFunctionInSymTab ("STEP", 2);
InitializeFunctionInSymTab ("RAMP", 2);

InitializeFunctionInSymTab ("PRDV", 3);
Entry = LookUpSymTab ("PRDV");
Entry->AddInfo->FunctionInfo.ArgumentType[0] = DOUBLE_ARRAY;
Entry->AddInfo->FunctionInfo.ArgumentType[1] = DOUBLE;
Entry->AddInfo->FunctionInfo.ArgumentType[2] = DOUBLE;
Entry->PrintType = -2;

InitializeFunctionInSymTab ("SHIFTC", 2);
Entry = LookUpSymTab ("SHIFTC");
Entry->AddInfo->FunctionInfo.ArgumentType[0] = DOUBLE_ARRAY;
Entry->AddInfo->FunctionInfo.ArgumentType[1] = DOUBLE;
Entry->PrintType = -2;

InitializeFunctionInSymTab ("SHIFTL", 2);
Entry = LookUpSymTab ("SHIFTL");
Entry->AddInfo->FunctionInfo.ArgumentType[0] = DOUBLE_ARRAY;
Entry->AddInfo->FunctionInfo.ArgumentType[1] = DOUBLE;
Entry->PrintType = -2;

InitializeFunctionInSymTab ("SUM", 1);
Entry = LookUpSymTab ("SUM");
Entry->AddInfo->FunctionInfo.ArgumentType[0] = DOUBLE_ARRAY;
Entry->PrintType = -2;

InitializeFunctionInSymTab ("SUMV", 3);
Entry = LookUpSymTab ("SUMV");
Entry->AddInfo->FunctionInfo.ArgumentType[0] = DOUBLE_ARRAY;
Entry->AddInfo->FunctionInfo.ArgumentType[1] = DOUBLE;
Entry->AddInfo->FunctionInfo.ArgumentType[2] = DOUBLE;
Entry->PrintType = -2;
```

```c
    InitializeFunctionInSymTab ("SCLPRD", 5);
    Entry = LookUpSymTab ("SCLPRD");
    Entry->AddInfo->FunctionInfo.ArgumentType[0] = DOUBLE_ARRAY;
    Entry->AddInfo->FunctionInfo.ArgumentType[1] = DOUBLE;
    Entry->AddInfo->FunctionInfo.ArgumentType[2] = DOUBLE;
    Entry->AddInfo->FunctionInfo.ArgumentType[3] = DOUBLE_ARRAY;
    Entry->AddInfo->FunctionInfo.ArgumentType[2] = DOUBLE;
    Entry->PrintType = -2;

InitializeFunctionInSymTab ("ObtainEValue", 1);
    InitializeFunctionInSymTab ("ObtainZValue", 1);

/* Added CW 8/14/91 */

InitializeFunctionInSymTab ("_Compare", 3);
    Entry = LookUpSymTab ("_Compare");
    Entry->Type = FUNCTION;
    Entry->AddInfo->FunctionInfo.ArgumentType[0] = STRING;
    Entry->AddInfo->FunctionInfo.ArgumentType[1] = DOUBLE;
    Entry->AddInfo->FunctionInfo.ArgumentType[2] = DOUBLE;
}

/* Search MacroList for a macro named MacroName, and return a pointer to the MacroList entry */
MacroListPtr
SearchForMacroLine(char *MacroName)
{
    MacroListPtr Cur;
    Cur = MacroList->Next;
    while (Cur != NULL) {
        if (strcmp(Cur->Macro->Name,MacroName) == 0)
            return Cur;
        Cur = Cur->Next;
    } return NULL;
}

/* Replaces leaf nodes of name OrigName with ReplacementNode, freeing the old node */
STNodePtr
RenameNodesInTree(STNodePtr TheNode, char *OrigName, STNodePtr ReplacementNode)
{
    int i;

if (TheNode == NULL)
        return NULL;

/* Determine if variable name match was found. If so, replace the node. Since this is a macro,
     * it is impossible that the arg being replaced has any AddInfo, so we can just delete it. */
    if (strcmp(OrigName,TheNode->Symbol->Name) == 0) {
        free(TheNode);       /* Frees a leaf node (if it isn't a leaf node, something must be wrong) */
        return(DuplicateNode(ReplacementNode));
    }
```

```
    if ((TheNode->RSon != NULL))
         TheNode->RSon = RenameNodesInTree(TheNode->RSon, OrigName, ReplacementNode);
    if ((TheNode->LSon != NULL))
         TheNode->LSon = RenameNodesInTree(TheNode->LSon, OrigName, ReplacementNode);

if (TheNode->AddInfo != NULL) {
         for (I = 0; I < TheNode->AddInfo->NumElements; I++)
              TheNode->AddInfo->Nodes[I] = RenameNodesInTree(TheNode->AddInfo->Nodes[I], OrigName, ReplacementNode);
    }
    return (TheNode);
}

/* Traverses the tree, looking for OrigName, and when it finds it, it:
   Replaces the old symbol entry pointer with a newly created symbol table entry, and adds the array of the
   LHS variable (whose info is passed by the arguments) to the new symbol table entry and the node. */
void
RenameLocalVars(STNodePtr TheNode, char *OrigName, STNodePtr LHS)
{
    int       i;

if (TheNode == NULL)
         return;

/* Determine if variable name match was found.  If so, do this:
       Construct name for the new variable.
       Create or look up the symbol table entry for the new variable.
       If the entry was created, then copy over the appropriate fields.
       if n>0, then also add stuff to TheNode->AddInfo.
       Replace TheNode->Symbol with the newly created symbol table entry.
    */
    if (strcmp(OrigName,TheNode->Symbol->Name) == 0) {
         char          NewName[40];
         SymTabEntryPtr NewSymbol;
         int           n;
         STNodePtr     i1,
                       i2,
                       i3;

/* Get indices and number of elements (from LHS) */
         if (LHS->AddInfo != NULL) {
              n = LHS->AddInfo->NumElements;
              i1 = LHS->AddInfo->Nodes[0];
              i2 = LHS->AddInfo->Nodes[1];
              i3 = LHS->AddInfo->Nodes[2];
         }
         else {
              n=0;
              i1=i2=i3=NULL;
         } sprintf(NewName,"%s$%d",OrigName,MacroCount);      /* Construct new name for the variable */
         NewSymbol = LookUpSymTab(NewName);                 /* See if name is already there */
         if (NewSymbol == NULL) {                           /* If not already there, create the entry */
              NewSymbol = InsertInSymTab(NewName);          /* Create new symbol table entry */
```

```c
        /* Copy over the simple fields */
        NewSymbol->VarType = TheNode->Symbol->VarType;
        NewSymbol->Type = TheNode->Symbol->Type;
        if (n>0)
            NewSymbol->DataType = DOUBLE_ARRAY;
        else
            NewSymbol->DataType = TheNode->Symbol->DataType;
        NewSymbol->WhereFrom = TheNode->Symbol->WhereFrom;
        NewSymbol->EquationType = TheNode->Symbol->EquationType;
        NewSymbol->Visited = TheNode->Symbol->Visited;
        NewSymbol->PrintType = TheNode->Symbol->PrintType;

/* Copy over AddInfo */
        if (n>0) {
            NewSymbol->AddInfo = (AddInfoPtr) CheckAlloc(sizeof(* NewSymbol->AddInfo));
            memcpy(NewSymbol->AddInfo,LHS->Symbol->AddInfo,sizeof(* NewSymbol->AddInfo));
        }

/* If n>0, add stuff to TheNode->AddInfo */
        if (n>0) {
            TheNode->AddInfo = (AddSyntaxTreeInfoPtr) CheckAlloc(sizeof(* TheNode->AddInfo));
            TheNode->AddInfo->NumElements = n;
            switch (n) {
                case 3: TheNode->AddInfo->Nodes[2] = DuplicateNode(I3);
                case 2: TheNode->AddInfo->Nodes[1] = DuplicateNode(I2);
                case 1: TheNode->AddInfo->Nodes[0] = DuplicateNode(I1);
            }
        }

TheNode->Symbol = NewSymbol;              /* Replace the symbol table entry with the new entry */
    } if ((TheNode->RSon != NULL))
        RenameLocalVars(TheNode->RSon, OrigName, LHS);
    if ((TheNode->LSon != NULL))
        RenameLocalVars(TheNode->LSon, OrigName, LHS);

if (TheNode->AddInfo != NULL) {
        for (I = 0; I < TheNode->AddInfo->NumElements; I++)
            RenameLocalVars(TheNode->AddInfo->Nodes[I], OrigName, LHS);
    }
    return;
}

/* Upon entering this function, the parser should be in the following state:
    - A macro call was last pushed on the stack, complete with its arguments attached as nodes.
    - Just parsed a macro call, which the parser treated like any old function.
    - The first element of the STNodePtr stack should be the LHS variable. This is needed to get
      the array indices for copying to variables in the new trees that will be created.
    What this function does is looks up the macro call in MacroList to get its definition. Then it
    generates in-line code expansion for that macro call. The expanded macro must rename the variables
```

```c
     that are local to the macro, so that each variable has a unique number as its suffix.  Its a bit
     tricky, so examine this function carefully to see how it works.
*/
STNodePtr
GenerateMacroLines()
{

STNodePtr      LHS;                  /* Pointer to node for LHS variable */
    STNodePtr      TheMacroNode;         /* Pointer to the macro call's node */
    char           *MacroName;           /* Name of the macro */
    MacroLinesPtr  Lines;                /* The lines of code used for the macro definition */
    MacroLinesPtr  Cur;                  /* Current place for traversing Lines */
    MacroLinesPtr  NewMacroLines;        /* Stores copies of the trees that were in Lines
                                          * Used for building the in-line expansion code
                                          */

MacroListPtr   TempMacroList;
    SymTabEntryPtr Symbol;               /* For returing pointer to an element during a search */
    SymTabEntryPtr NewEntry;             /* MacroList->Macro field */
    int            I;                    /* for loop indices */
    MacroLinesPtr  NewCur;               /* Current place for traversing NewMacroLines */
    SymTabEntryPtr LocalVarList[MAX_LOCAL_VARS]; /* List of local variables used */
    int            TopLocalVarList=-1;   /* Highest local var count */
    char           NewName[40];
    STNodePtr      NewNode;
    int            LocalFVStackTop;      /* Local copy of FVStackTop */
    SymTabEntryPtr LocalFVStack[3];      /* Local copy of FVStack */

/* Store the current contents of the FV stack, because inserting the new equations will erase this stack. */
    LocalFVStackTop = FVStackTop;
    for (I=0; I<=FVStackTop; I++)
         LocalFVStack[I]=FVStack[I];

LHS = GetStackElement(0);            /* Gets LHS's node, which must be the first one on the stack */
    TheMacroNode = SPop();               /* Pop the node that has the macro call */
    MacroName = TheMacroNode->Symbol->Name; /* Store name of macro in variable to make it easier to get at */

/* Search through MacroList to find the macro definition for MacroName.  It should be there, or it must be
     * some kind of wierd internal error (that should not happen!) */
    TempMacroList = SearchForMacroLine(MacroName);
    if (TempMacroList == NULL) {
         fprintf(DocErrorFile,"INTERNAL ERROR: Inside of GenerateMacroLines.  Macro name not found for %s.\n",MacroName);
         fclose(DocErrorFile);
         exit (-1);
    }
    Lines = TempMacroList->Macrolines;   /* Good, its found.  Store pointer to macro's definition */
    Symbol = TempMacroList->Macro;       /* Store pointer to macro's symbol table entry */

/* Loop for each tree (equation in the macro definition) and do a bunch of stuff */
    NewMacroLines = (MacroLinesPtr) CheckAlloc(sizeof(* NewMacroLines));
    NewCur = NewMacroLines;
    Cur = Lines->Next;
    while (Cur != NULL) {
         /* Make a new MacroLines structure for the new tree */
         NewCur->Next = (MacroLinesPtr) CheckAlloc(sizeof(* NewCur));
         NewCur = NewCur->Next;
```

```c
            /* Copy over the active value flag */
            NewCur->AI = Cur->AI;

/* Duplicate the tree and store a copy of it in NewMacroLines structure */
            NewCur->Node = DuplicateNode(Cur->Node);

/* For each argument in the macro call, rename all the nodes in the MacroLines structure so that these
             * nodes are replaced with the equivalent argument in the macro call. Example:
                 MACRO MY_MACRO(C1,C2,C3)      ...    (bunch of lines using C1,C2,and C3)... MEND
                 FOO = MY_MACRO(A1,A2,A3(P))

This would go through and replace all of the nodes whose symbol name is C_, with duplicates of
               the nodes A1, A2, and A3(P).  This will also duplicate the array indices since it is duplicating
               the whole node and deleting the previous node.

TheMacroNode has the nodes (the arguments) that must be duplicated and put in place of (after freeing)
               the nodes in NewCur->Node whose symbol names are arguments of MacroList->Macro (i.e. "Symbol" variable)
             */
            if (!Symbol->AddInfo->FunctionInfo.NumArguments != TheMacroNode->AddInfo->NumElements)
                return TheMacroNode;  /* The error must have been reported elsewhere, so just return and don't try to do anything */
            for (I=0; I<TheMacroNode->AddInfo->NumElements; I++)
                NewCur->Node = RenameNodesInTree(NewCur->Node,Symbol->AddInfo->FunctionInfo.Arguments[I]->Name,
                                                 TheMacroNode->AddInfo->Nodes[I]);

/* Then, put LHS variable into a list of local variables */
            for (I=0; I<=TopLocalVarList; I++) { /* Make sure it isn't already on list */
                if (LocalVarList[I] == Cur->Node->LSon->Symbol)
                    break;
            }
            if (I>TopLocalVarList) {
                TopLocalVarList++;
                LocalVarList[TopLocalVarList] = Cur->Node->LSon->Symbol;
            }

/* Just go on to next equation */
            Cur = Cur->Next;
        }

MacroCount++;  /* Count macros so that unique generation of macro expansion code's var names can be done */

/* Go through list of local variables, and replace all those names in the code with new names.
         * The tricky part here is the array indices, because they need to be copied to all the new local variables. */
        for (I=0; I<=TopLocalVarList; I++) {
            /* For each local variable, go through all the trees and replace them with a new name */
            NewCur = NewMacroLines->Next;
            while (NewCur != NULL) {
                RenameLocalVars(NewCur->Node,LocalVarList[I]->Name,LHS);
                NewCur = NewCur->Next;
            }
        }

/* Insert the newly formed equations */
        NewCur = NewMacroLines->Next;
        while (NewCur != NULL) {
```

```c
        for (I = 0; I <= LocalFVStackTop; I++)
            FVStack[I] = LocalFVStack[I];
        FVStackTop = LocalFVStackTop;
        InsertEquation(NewCur->Node,NewCur->AI,'X');
        NewCur = NewCur->Next;
    }

/* Create the node needed for returning a value to the calling function */
    sprintf(NewName,"%s$d",MacroName,MacroCount);
    NewEntry = InsertInSymTab(NewName);
    NewNode = MakeLeafNode(NewName);

if (LHS->AddInfo->NumElements>0) {
        NewNode->AddInfo = (AddSyntaxTreeInfoPtr) CheckAlloc(sizeof(* NewNode->AddInfo));
        NewNode->AddInfo->NumElements = LHS->AddInfo->NumElements;
        switch (LHS->AddInfo->NumElements) { case 3: NewNode->AddInfo->Nodes[2] = DuplicateNode(LHS->AddInfo->Nodes[2]);
            case 2: NewNode->AddInfo->Nodes[1] = DuplicateNode(LHS->AddInfo->Nodes[1]);
            case 1: NewNode->AddInfo->Nodes[0] = DuplicateNode(LHS->AddInfo->Nodes[0]);
        }
    }

/* Need to restore the FVstack to its original state so that the parser won't mess up once the node
     * is passed back to the calling function */
    for (I = 0; I <= LocalFVStackTop; I++)
        FVStack[I] = LocalFVStack[I];
    FVStackTop = LocalFVStackTop;

return NewNode;
}
```

```
COPYRIGHT       1991  DEVONRUE, LTD.          ACCESS Flow Diagramming Utility                    access.y
PROPRIETARY  &  CONFIDENTIAL                                                                3 December 1991

%{
/****************************************/
/*                                      */
/*      FILE: access.y                  */
/*      COPYRIGHT   1991, DEVONRUE, LTD.*/
/*      ALL RIGHTS RESERVED.            */
/*                                      */
/****************************************/

/* Purpose: ACCESS parser - used by "pp", "doc1", "doc2", and "tree" utilities.

General information that should be of interest:
Since yacc files do not allow comments outside of the rules, they are a bit tricky to document. The best
thing to do is start at the beginning and trace the rules to figure out what they do yourself.

The parser has a unique way of handling errors. There is a file called ErrorFile.dat which is used to store
information about every error. This file is later read in, and converted to English error messages to be printed
to the error file pointer. There is more than one method in which an error can be put in this file.
The following error reporting methods are used in this parser:
1) If it is an obvious syntax error that yacc can catch, yyerror() function is called, and the error code, line
   number, and column number is written to ErrorFile.dat. The error code is determined based on where the failure
   occurred while parsing a rule. The more complex rules set a global variable called "ErrNo", at every point in
   the rule. If a syntax error should happen to be found after parsing part-way through a rule, the last set value
   of ErrNo is taken to be the error code. Sometimes this code will not be set (ErrNo=0), in which case it is taken
   as a general syntax error.
2) Even if the syntax is correct as far as yacc can tell, the equation may still not be correct. The actions for
   rules perform many tests to make sure that the equation is correct. If something is wrong, then the function
   "parse_error" is called to write the error to ErrorFile.dat. It takes 2 args: a code indicating what type of
   error, and an error recovery code indicating if the parsing should continue (the normal case) or the program
   should print its errors out and immediately quit with a fatal error (NOT the normal case - may indicate internal
   error). It also makes use of a global variable called "ErrColumn". When yacc finds a syntax error, it has no
   trouble knowing what column it is at. BUT, when a rule's action locates an error, the column the error occurred
   in is RARELY the same as the column which is currently being parsed. yycolumn does not have the correct error
   position, but the column can still be found. There are 2 main ways of finding out where the column is that the
   error occurred:
      a) The yacc global variable "yylval" has been defined with 2 fields. One field has the token itself. The
         second field has the column that the token begins at; this column is found in the lexical analyzer
         quite easily. Usually, accessing this column field of yylval is sufficient for finding the
         column.
      b) Sometimes, such as when parsing the arguments of a function recursively, the yylval is no longer in
         existence because it was parsed in a different rule than when the error was detected. Each STNodePtr
         structure has a field that stores the column in which a node's token was found at. The STNodePtr
         is always available, so the ErrColumn can be set equal to whatever is in this field.

There are many error checks that are done in the actions. Some of these checks include:
 - The ->Type field of a symbol table entry must be undefined when parsed, or defined the same way when parsed
   another time (there are exceptions though). An indentifier cannot be used in conflicting ways (such as both
   as a VARIABLE and a CONSTANT - doing so will cause an error).
 - The ->DataType field of a symbol table entry must be undefined when parsed, or defined the same way when
   parsed another time (again, there are exceptions). A variable cannot be used in conflicting ways, such
   as both a DOUBLE and a DOUBLE_ARRAY. There is a DataType called IDUNNO which means that the parser
``` cannot yet tell if it should be a DOUBLE or a DOUBLE_ARRAY. DOUBLE is assumed, unless the parser can
later determine that it must be a DOUBLE_ARRAY by looking at the context of usage. Such is the way the
DYNAMO language syntax works, so this has to be done.
- The ->VarType field of a symbol table entry must be undefined when parsed, or defined the same way when
parsed another time (again, there are exceptions). A variable cannot be used both as a LEVEL and a RATE,
for example.

There are MANY other types of checks, but these are the most common ones.

There are two symbol tables that are used in the parser: a "main" symbol table, and a "macro" symbol table. The
macro symbol table doesn't get much use except while defining macros. ALL symbols are put in either or both of
these tables, even if they are as simple as "+". Common symbols are pre-loaded into the main symbol table by
a function InitializeSymbolTable()..

There is a FVStack[] stack which stores the FOR variables found while parsing a single equation. A number of places
in the code need to make use of this stack.

There is also an array called FunctionEntry[], and a variable FunctionEntryLevel. Each time parsing goes recursively
another level deeper into nested function calls, FunctionEntryLevel increases. FunctionEntry[] stores a pointer to
the symbol that was last parsed in the middle of each function call, and the numerical argument count of each function.
This information is needed in a few places, particularly with FOR variables. There is also a variable called
CheckDisable which is used to alter/silence some of the error checking for function arguments of type DOUBLE_ARRAY.

Parsing arrays and function calls; 2 variables NumElements[] and CurList are used to keep track of the number of elements
in each array. Since arrays/functions can be nested, CurList is used to keep track of which array/function is
being looked at, and is used as an index to NumElements[]. These numbers are later used for determining how many
elements must be popped off the stack in order to get all the array elements from the stack.

Different equations share many of the same rules. However, T statements are an exception. Although they share rules
used by other statements, there are a few tiny modifications that need to be made in the rule's actions for it to
work properly with T statements. Therefore, the variable TableStatement is used for that purpose (it is OurTrue when
a T statement is currently being parsed).

There is also a linked list called ForList, which is a list of all the FOR variable definitions in the file. This is
needed to store all the names on the right hand side of a FOR variable. An example:

FOR MY_LOOP=FOO,BAR,GLITCH,BLETCH

There will be an entry for MY_LOOP, and attached to that entry will be a list of the 4 constants on the right hand
side of the "=". This variable can later be looked up. The purpose of all this is for a feature added to E statements
which allows a FOR variable defined like the previous example to be used in an E statement's variable indices. Consult
the Functional Specification to find out about this feature with E statements.

There is code in this directory that is used for generating the Initialize.c file. The code is normally not needed
unless this file needs to be created again. The Initialize.c file contains hard-coded macro definitions suitable
to be used for in-line code expansion. The dynamo definitions for this file are stored in the file "basic.phm".
To regenerate Initialize.c:

1) Edit local_fns.c such that InitializeMacroCode() call is commented out, and GenerateInitializationCode() is
   uncommented.
2) Compile ("make")
3) Run pp on basic.phm
4) Undo changes in step #1
5) Recompile ("make"). done. (just make sure it works)

```c
#include <stdio.h>
include <string.h>
#include <malloc.h>
#include <math.h>
#include "../latest_parser/prophet.h"
#include "proto.h"

extern int UtilityMode;     /* Specifies what utility is currently using this parser.  Each utility defines this variable
                             * in its "local_fns.c" file.  Code is:
                             *     0 = pp (prophet parser)
                             *     1 = tree (flow diagramming)
                             *     2 = doc1 (documentors)
                             *     3 = doc2
                             *     4 = bug (debugger) **** NOT USED YET ****
                             */

/* This is done to make 'yylval' of type 'char **'. */
#define YYSTYPE MYSTRUCT
typedef struct
{
    char    *token;
    int     col;
} MYSTRUCT;

int     I,
        J,
        K,
        ErrorFound = FALSE,         /* Has any error happened anywhere yet? */
        NumIndices,                 /* Counts # of array indices found for an array */
        NumValues,                  /* Counts # of values found for a statement (T,E, etc.) */
        ErrNo,                      /* Stores the error number to be used by yyerror if syntax
                                     * error occurs */
        yycolumn = 0,               /* Current column that lexical analyzer is positioned - lex
                                     * increments */
        InMACRO = FALSE,            /* Is TRUE while parsing macro definition, FALSE otherwise */
        ateof = 0,
        Curlist = 0,
        ErrColumn = 0,              /* When parse error is detected, stores column that the
                                     * error occurred */
        OldLineNumber = 0,          /* Used to prevent duplicate error messages of same error */
        OldErrNo = 0,               /* Used to prevent duplicate error message of same error */
        BeganStatement = FALSE,     /* Becomes TRUE only when parsing begins properly.  It is
                                     * only set by rules which begin valid equations.  If yacc
                                     * gets confused and thinks that a middle-of-equation rule
                                     * is the correct rule to chose for the beginning of an
                                     * equation, then this value will still be false, and an
                                     * error will be reported. */
        TableStatement = FALSE,     /* Added CW 6/22/91, kludge to stop it from checking for arrays with
                                     * '*' for an index (as an error catcher) */

Indices[MAX_DIMENSIONS],
        ConstantType,               /* Type of the constant equation being parsed */
```

```c
char        TempInt,                        /* Temporary integer */
            MacroFound = FALSE,             /* TRUE if parsing a macro, FALSE otherwise */
            FVStackTop = -1,                /* Top of FOR variable stack (stack which stores FOR variables for a single equation */
            NumElements[MAX_NESTING];       /* Stores the #args at different levels of nesting */
            TempString1[MAX_BUF_LENGTH],    /* Temporary string */
            CurMacro[MAX_BUF_LENGTH],       /* Stores name of the current macro being parsed */
            InputFile[MAX_BUF_LENGTH],      /* Stores name of input file (Dynamo code file) */
            *TempString[MAX_TABLE_CELLS],   /* Temporary string storage */
            IntegerStrings[MAX_TABLE_CELLS + 1][4]; /* Used for speeding up Table statements by storing each integer
                                                       as a text string so that small integers do not need repeated
                                                       sprintf() calls to create the strings */

/*
 * Used to store small integers converted to string with sscanf. This is used to speed up loop in
 * "T_statement:" section which was repeatedly using sscanf to make the conversion. Now, this array is is
 * initialized at the beginning of program, and remains constant.
 */
FILE        *ErrorFile;                     /* CW 9-10-90 added, stores pointer to the error log file */
STNodePtr   Temp[TEMP_STNODE_LIMIT];        /* For temporary storage of lists of STNodes that have been
                                               popped */
OperatorType Op;                            /* Either PLUS or MINUS */
SymTabEntryPtr CurMacroEntry,               /* Pointer to macro currently being parsed */
            FVStack[MAX_DIMENSIONS],        /* Stack to store all FOR variables in the currently parsed equation */
            Entry,                          /* Temporary variable used for storing symbol table value */
            ForEntry,                       /* Added CW 6/21/91 to store pointer to FOR variable's symbol */
            MainSymTab[MAX_SYM_TABLE_SIZE], /* The main symbol table (hash table) to store all the
                                               tokens */
            MacroSymTab[MAX_SYM_TABLE_SIZE]; /* Symbol table for storing MACRO identifiers */
int         CheckDisable=FALSE;             /* Added 6/18/91 CW */
int         FunctionEntryLevel = 0;         /* These 2 vars used for keeping track of how far each nested function call has
been parsed. Added 6/18/91 CW */
SpecialEntry FunctionEntry[100];

/* External declarations */
extern int  yylineno,                       /* Line number; calculated by lexical analyzer */
            yyleng,                         /* Length of token; calculated by lexical analyzer */
            StackTop;                       /* Stores location of top of STNode stack */
extern char *yytext;                        /* Pointer to start of token */
extern FILE *yyin;                          /* Used so that lexical analyzer takes input from InputFile
                                             * rather than from stdin */

/* Added CW 8/5/91 for new improved macro method */
MacroListPtr MacroList = NULL;              /* Stores a list of all the definitions of each macro
                                             * (including built-in macros). Definition consists of
                                             * a linked list of STNodePtr's, one STNodePtr for each
                                             * equation in the MACRO definition. The list is later
                                             * used for generating in-line macro expansion code
                                             * whenever the macro is used. */

MacroLinesPtr MacroLines = NULL;            /* Stores a linked list of all the lines (the STNodePtr structures)
                                             * for the currently-parsed macro */
int         MacroCount = 0;                 /* Counts how many macro calls have been parsed. Its purpose is to
                                             * keep track of the end of each variable name inside the
                                             * in-line macro expansion code that is to be generated. */
```

```
/* Added CW 8/14/91 for new V statement */
int         VCount = 0;                    /* Counts how many V statements have been parsed, so that a dummy
                                              variable name can be generated */

/* Stuff for documentor */
LineListPtr     LineList,
                LineListCurrent;           /* Stores a linked list of all the equations that have been parsed,
                                              in the order that they are parsed. Needed because documentor
                                              needs to know order in which equations appear in file */
double          CurrentEquationNumber = 1.0; /* Used for counting the machine-generated equation number that
                                                appears on documentor output */
int             NoOfLines = 0;             /* Number of lines in the equation file */
FILE            *DocErrorFile;             /* Error file for documentor - errors go here */
VarListPtr      VarList;                   /* List of variables that are in the model */
SymbolBTreePtr  SymbolBTree;               /* Binary tree of variable information */
FILE            *File1,
                *File2,
                *File3,
                *File4;                    /* Used for the 4 output files of doc1 */
char            DefinitionsFile[MAX_BUF_LENGTH];  /* Name of definitions file (the ".def" file) */
EquationListPtr EquationList,
                EquationListCurrent;
int             PrintColumn;
EquationPtr     LastEquation;

int             EorZ=0;                    /* Indicates if E or Z statement is being parsed (done to reduce code) */
ForListPtr      ForList;

%token COMPARE
%token DMNSN FNCTN FOR INTRN MACRO MEND NOISE SAVE SPEC PRINT
%token ABS_ERR CMP_N_1 CPLOT CPRNT DT LENGTH NS_SEED PLOT PLTPER
%token PRTPER REL_ERR SAVPER TIME
%token SUB_K SUB_J SUB_KL SUB_JK
%token IDENT INT FLOAT STRING SECTOR RADTOKEN %token EXP
%token EQ NE GE LE %left '+' '-'
%left '*' '/' '%'

%left POWER
%right UMINUS

%% program:statement
       {
           /* If the stack is not at zero, something is seriously wrong! */
           if (StackTop != 0)
           {
               ErrColumn = 0;
               parse_error (100, DIE);
```

```
}
|program statement
    {
        /* If the stack is not at zero, something is seriously wrong! */
        if (StackTop != 0)
        {
            ErrColumn = 0;
            parse_error (100, DIE);
        }
    }
    ;

no_sub_scalar:IDENT
    | '$' IDENT
    {
        if (InMACRO == FALSE)
        {
            ErrColumn = $<col>1;
            parse_error (115, CONTINUE);
        }
        else
        if ((Entry = LookUpMacroTab ($<token>2)) == NULL)
        {
            Entry = ForcedInsInMacroTab ($<token>2);          /* Local Variable */
            Entry->PrintType = -1;
            Entry = LookUpMainTab (CurMacro);
            if (Entry == NULL)
            {
                ErrColumn = $<col>1;
                parse_error (127,CONTINUE);
            }
            else
            if (Entry->AddInfo != NULL)
            {
                Entry->AddInfo->FunctionInfo.LocalVars[Entry->AddInfo->FunctionInfo.NumLocalVars] = strdup ($<token>2);
                Entry->AddInfo->FunctionInfo.NumLocalVars++;
            }
        }
        $<token>$ = $<token>2;
        $<col>$ = $<col>2;
    }
    ;

current_scalar_level:no_sub_scalar SUB_K
    {
        Entry = InsertInSymTab ($<token>1);                    /* Create symbol table entry if necessary */
        if (Entry->Type == UNINITIALIZED)                      /* Check and/or initialize type */
            Entry->Type = VARIABLE;
        else if ((Entry->Type != VARIABLE) && (Entry->Type != PARAMETER))
        {
            ErrColumn = $<col>1;
            parse_error (104, CONTINUE);
        }
        if (Entry->VarType == UNINITIALIZED)                   /* Check and/or initialize variable type */
            Entry->VarType = LEVEL;
```

```c
        else if (Entry->VarType != LEVEL)
        {
            ErrColumn = $<col>1;
            parse_error (105, CONTINUE);
        }

FunctionEntry[FunctionEntrylevel+1].Entry = Entry;  /* Added 6/18/91 CW */
        FunctionEntry[FunctionEntrylevel+1].Count = 0; /* Added 6/18/91 CW */
        Temp[0]=MakeLeafNode($<token>1);                    /* Added CW 6/22/91 */
        Temp[0]->ErrColumn = $<col>1;
        Push (Temp[0]);             /* Passed all the tests. Push on stack. */
    }
    ;

current_array_level:current_scalar_level list
    {
        register int    FixedNumIndices;

NumIndices = NumElements[CurList];      /* Number of indices at the current array level */
        FixedNumIndices = NumIndices;
                                                /* Used to prevent array bounds from being trashed
                                                 * if number of indices is too high. */

/* CHECK THAT INDICATED NUMBER OF DIMENSIONS DOESN'T EXCEED MAX_DIMENSIONS. CORRECT IF NECESSARY. */
        if (NumIndices >= MAX_DIMENSIONS)
        {
            ErrColumn = $<col>1;
            parse_error (118, CONTINUE);
            for (I = 0; I < NumIndices - MAX_DIMENSIONS; I++)  /* Throw away extra elements! */
                DeleteTree (SPop ());
            FixedNumIndices = MAX_DIMENSIONS;       /* Lower number of elements so that program can safely
                                                     * continue */
        }

/* POP INDEX NODES AND ATTACH TO ARRAY IDENTIFIER */
        for (I = 0; I < FixedNumIndices; I++)       /* Pop the leaf nodes for the indices */
            Temp[I] = SPop ();
        Temp[FixedNumIndices] = SPop ();            /* Pop leaf node for variable identifier to insert indices */
        Entry = Temp[FixedNumIndices]->Symbol;

if (Entry->Type == UNINITIALIZED)           /* Check and initialize token type if necessary */
            Entry->Type = VARIABLE;
        else if ((Entry->Type != VARIABLE) && (Entry->Type != PARAMETER))
        {
            ErrColumn = $<col>1;
            parse_error (104, CONTINUE);
        } if ((Entry->DataType == UNINITIALIZED) || (Entry->DataType == IDUNNO))  /* Check and initialize token data type
                                                                                 * if necessary */
            Entry->DataType = DOUBLE_ARRAY;
        else if (Entry->DataType != DOUBLE_ARRAY)
        {
```

```
                ErrColumn = $<col>1;
                parse_error (116, CONTINUE);
        }
        if (Entry->VarType == UNINITIALIZED)         /* Check and initialize variable type if necessary */
                Entry->VarType = LEVEL;
        else if (Entry->VarType != LEVEL)
        {
                ErrColumn = $<col>1;
                parse_error (106, CONTINUE);
        }

/* If first time finding this array, allocate memory for it and set number of dimensions */
        if (Entry->AddInfo == NULL)
        {
                Entry->AddInfo = NewSymTabAddInfo ();
                Entry->AddInfo->ArrayInfo.NumDimensions = FixedNumIndices;
        } if (Temp[FixedNumIndices]->AddInfo == NULL)
                Temp[FixedNumIndices]->AddInfo = NewSTAddInfo (); /* Obtain pointer to new STAddInfo structure */

Temp[FixedNumIndices]->AddInfo->NumElements = FixedNumIndices;
        for (I = 0; I < FixedNumIndices; I++)        /* Set the Indices */
        {
                Temp[FixedNumIndices]->AddInfo->Nodes[I] = Temp[FixedNumIndices - I - 1];
                TempInt = EvaluateDimension (Temp[FixedNumIndices - I - 1]) -
                        Entry->AddInfo->ArrayInfo.DimensionSize[I];
                (TempInt > Entry->AddInfo->ArrayInfo.DimensionSize[I]) ? TempInt : Entry->AddInfo->ArrayInfo.DimensionSize[I];
        }

Temp[FixedNumIndices]->ErrColumn = $<col>1;  /* Added CW 6/22/91 */
        Push (Temp[FixedNumIndices]);                /* Push the leaf node back */
        CurList--;
}
;

current_level:current_scalar_level
{
        Entry = LookUpSymTab ($<token>1);            /* Look up variable name */ if (CheckDisable == FALSE) {
                if ((Entry->DataType == UNINITIALIZED) || (Entry->DataType == IDUNNO))
                        Entry->DataType = DOUBLE;
                else if (Entry->DataType != DOUBLE)      /* Check/set data type */
                {
                        ErrColumn = $<col>1;
                        parse_error (108, CONTINUE);
                }
        }
        else {
                if ((Entry->DataType == UNINITIALIZED) || (Entry->DataType == IDUNNO))
                        Entry->DataType = DOUBLE_ARRAY;
                else if (Entry->DataType != DOUBLE_ARRAY)  /* Check/set data type */
```

```
                    ErrColumn = $<col>1;
                    parse_error (116, CONTINUE);
            }
    }
|current_array_level
    {
            Entry = LookUpSymTab ($<token>1);          /* Look up variable name */
            if (Entry == NULL)
            {
                    fprintf (DocErrorFile,"INTERNAL ERROR: Entry not found for : %s\n", $<token>1);
                    fclose(DocErrorFile);
                    exit (-1);
            } if ((Entry->DataType == UNINITIALIZED) || (Entry->DataType == IDUNNO))
            {
                    Entry->DataType = DOUBLE_ARRAY;
            }
            else if (Entry->DataType != DOUBLE_ARRAY)
            {
                    ErrColumn = $<col>1;
                    parse_error (116, CONTINUE);
            } if (Entry->AddInfo == NULL)
            {
                    Entry->AddInfo = NewSymTabAddInfo ();       /* No conflicts to check, so just add the new info */
                    Entry->AddInfo->ArrayInfo.NumDimensions = NumIndices;  /* Allocate memory for additional info. */
                    /* Can't set size because it is not known */           /* Set the number of dimensions */
            }
            else
            /* Info is already there. Check for conflicts. */
            if ((Entry->AddInfo->ArrayInfo.NumDimensions != NumIndices))
            {                                                    /* Error if mismatch in number of indices. */
                    ErrColumn = $<col>1;
                    parse_error (110, CONTINUE);
            }
    }
;
past_scalar_level:no_sub_scalar SUB_J
    {
            Entry = InsertInSymTab ($<token>1);          /* Create symbol table entry if necessary */
            if (Entry->Type == UNINITIALIZED)            /* Check and/or initialize token type */
                    Entry->Type = VARIABLE;
            else if ((Entry->Type != VARIABLE) && (Entry->Type != PARAMETER))
            {
                    ErrColumn = $<col>1;
                    parse_error (104, CONTINUE);
            }
            if (Entry->VarType == UNINITIALIZED)         /* Check and/or initialize variable type */
                    Entry->VarType = LEVEL;
/**** CW 8/6/91 commented out because it conflicted with macros
            else if (Entry->VarType != LEVEL)
            {
```

```
            ErrColumn = $<col>1;
            parse_error (105, CONTINUE);
        }
     */

FunctionEntry[FunctionEntryLevel+1].Entry = Entry; /* Added 6/18/91 CW */
    FunctionEntry[FunctionEntryLevel+1].Count = 0; /* Added 6/18/91 CW */
    Temp[0]=MakeLeafNode($<token>1);
    Temp[0]->ErrColumn = $<col>1;                    /* Added CW 6/22/91 */
    Push (Temp[0]);           /* Passed all the tests. Create leaf node.Push on stack. */
    };

past_array_level:past_scalar_level list
    {
    register int    FixedNumIndices;

NumIndices = NumElements[CurList];
    FixedNumIndices = NumIndices;

/* CHECK THAT INDICATED NUMBER OF DIMENSIONS DOESN'T EXCEED MAX_DIMENSIONS. CORRECT IF NECESSARY. */ if (NumIndices >= MAX_DIMENSIONS)
        {
        ErrColumn = $<col>1;
        parse_error (118, CONTINUE);
        for (I = 0; I < NumIndices - MAX_DIMENSIONS; I++) /* Throw away extra elements! */
            DeleteTree (SPop ());
        FixedNumIndices = MAX_DIMENSIONS;          /* Lower number of elements so that program can safely
                                                    * continue */
        }

/* POP NODES FOR INDICES AND ATTACH TO NODE FOR ARRAY IDENTIFIER */ for (I = 0; I < FixedNumIndices; I++)           /* Pop the leaf nodes for the indices */
        Temp[I] = SPop ();
    Temp[FixedNumIndices] = SPop ();                /* Pop leaf node for variable identifier to insert indices */
    Entry = Temp[FixedNumIndices]->Symbol;
    if (Entry->Type == UNINITIALIZED)               /* Check and initialize token type if necessary */
        Entry->Type = VARIABLE;
    else if ((Entry->Type != VARIABLE) && (Entry->Type != PARAMETER))
        {
        ErrColumn = $<col>1;
        parse_error (104, CONTINUE);
        } if ((Entry->DataType == UNINITIALIZED) || (Entry->DataType == IDUNNO))  /* Check and initialize token data type
                                                                             * if necessary */
        Entry->DataType = DOUBLE_ARRAY;
    else if (Entry->DataType != DOUBLE_ARRAY)
        {
        ErrColumn = $<col>1;
        parse_error (116, CONTINUE);
        }
```

```c
        if (Entry->VarType == UNINITIALIZED)                    /* Check and initialize variable type if necessary */
            Entry->VarType = LEVEL;
        else if (Entry->VarType != LEVEL)
        {
            ErrColumn = $<col>1;
            parse_error (106, CONTINUE);
        }

/* Allocate memory for additional info if first time finding the array */
        if (Entry->AddInfo == NULL)
        {
            Entry->AddInfo = NewSymTabAddInfo ();
            Entry->AddInfo->ArrayInfo.NumDimensions = FixedNumIndices;
        } if (Temp[FixedNumIndices]->AddInfo == NULL)
            Temp[FixedNumIndices]->AddInfo = NewSTAddInfo (); /* Obtain pointer to new STAddInfo structure */
        Temp[FixedNumIndices]->AddInfo->NumElements = NumIndices;  /* Set the number of indices */ for (I = 0; I < FixedNumIndices; I++)
        {                                                      /* Set the indices */
            Temp[FixedNumIndices]->AddInfo->Nodes[I] = Temp[FixedNumIndices - I - 1];
            TempInt = EvaluateDimension (Temp[FixedNumIndices - I - 1]);
            Entry->AddInfo->ArrayInfo.DimensionSize[I] =
                (TempInt > Entry->AddInfo->ArrayInfo.DimensionSize[I]) ?
                TempInt : Entry->AddInfo->ArrayInfo.DimensionSize[I];
        }

Temp[FixedNumIndices]->ErrColumn = $<col>1;             /* Added CW 6/22/91 */
        Push (Temp[FixedNumIndices]);                           /* Push the leaf node back */
        CurList--;
    }
    ;

past_level:past_scalar_level
    {
        Entry = LookUpSymTab ($<token>1);                       /* Look up variable */ if (CheckDisable == FALSE) {
            if ((Entry->DataType == UNINITIALIZED) || (Entry->DataType == IDUNNO))
                Entry->DataType = DOUBLE;
            else if (Entry->DataType != DOUBLE)
            {
                ErrColumn = $<col>1;
                parse_error (108, CONTINUE);
            }
        }
        else {
            if ((Entry->DataType == UNINITIALIZED) || (Entry->DataType == IDUNNO))
                Entry->DataType = DOUBLE_ARRAY;
            else if (Entry->DataType != DOUBLE_ARRAY)
            {
                ErrColumn = $<col>1;
                parse_error (116, CONTINUE);
            }
        }
```

```
                )
            }
        }
past_array_level
        {
            Entry = LookUpSymTab ($<token>1);                  /* Look up variable */
            if ((Entry->DataType == UNINITIALIZED) || (Entry->DataType == IDUNNO))
                Entry->DataType = DOUBLE_ARRAY;
            else if (Entry->DataType != DOUBLE_ARRAY)
            {
                ErrColumn = $<col>1;
                parse_error (116, CONTINUE);
            } if (Entry->AddInfo == NULL)
            {                                                  /* No conflicts to check, so just add the new info */
                Entry->AddInfo = NewSymTabAddInfo ();           /* Allocate memory for additional info. */
                Entry->AddInfo->ArrayInfo.NumDimensions = NumIndices;  /* Set the number of dimensions */
                /* Can't set size because it is not known */
            }
            else
            /* Info is already there.  Check for conflicts. */
            if ((Entry->AddInfo->ArrayInfo.NumDimensions != NumIndices))
            {                                                  /* Error if mismatch in number of indices. */
                ErrColumn = $<col>1;
                parse_error (110, CONTINUE);
            }
        }
    ;

current_scalar_rate:no_sub_scalar SUB_JK
        {
            Entry = InsertInSymTab ($<token>1);                /* Create symbol table entry if necessary */
            if (Entry->Type == UNINITIALIZED)                  /* Check and/or initialize token type */
                Entry->Type = VARIABLE;
            else if ((Entry->Type != VARIABLE) && (Entry->Type != PARAMETER))
            {
                ErrColumn = $<col>1;
                parse_error (104, CONTINUE);
            }
            if (Entry->VarType == UNINITIALIZED)               /* Check and/or initialize variable type */
                Entry->VarType = RATE;
            else if (Entry->VarType != RATE)
            {
                ErrColumn = $<col>1;
                parse_error (106, CONTINUE);
            }

FunctionEntry[FunctionEntryLevel+1].Entry = Entry; /* Added 6/18/91 CW */
            FunctionEntry[FunctionEntryLevel+1].Count = 0;     /* Added 6/18/91 CW */
            Temp[0]=MakeLeafNode($<token>1);                   /* Added CW 6/22/91 */
            Temp[0]->ErrColumn = $<col>1;
            Push (Temp[0]);                                    /* Passed all the tests.  Create leaf node.Push on stack. */
        }
    ;

current_array_rate:current_scalar_rate list
```

```c
    register int    FixedNumIndices;

for (I = 0; I < MAX_DIMENSIONS; I++)
        Indices[I] = 0;
    NumIndices = NumElements[CurList];
    FixedNumIndices = NumIndices;

/* CHECK THAT INDICATED NUMBER OF DIMENSIONS DOESN'T EXCEED MAX_DIMENSIONS. CORRECT IF NECESSARY. */ if (NumIndices >= MAX_DIMENSIONS)
    {
        ErrColumn = $<col>1;
        parse_error (118, CONTINUE);
        for (I = 0; I < NumIndices - MAX_DIMENSIONS; I++)   /* Throw away extra elements! */
            DeleteTree (SPop ());
        FixedNumIndices = MAX_DIMENSIONS;                   /* Lower number of elements so that program can safely
                                                             * continue */
    } for (I = 0; I < FixedNumIndices; I++)                   /* Pop the leaf nodes for the indices */
        Temp[I] = SPop ();
    Temp[FixedNumIndices] = SPop ();                        /* Pop leaf node for variable identifier to insert indices. */

Entry = Temp[FixedNumIndices]->Symbol;
    if (Entry->Type == UNINITIALIZED)                       /* Check and initialize token type if necessary */
        Entry->Type = VARIABLE;
    else if ((Entry->Type != VARIABLE) && (Entry->Type != PARAMETER))
    {
        ErrColumn = $<col>1;
        parse_error (104, CONTINUE);
    } if ((Entry->DataType == UNINITIALIZED) || (Entry->DataType == IDUNNO))  /* Check and initialize token data type
                                                                             * if necessary */
        Entry->DataType = DOUBLE_ARRAY;
    else if (Entry->DataType != DOUBLE_ARRAY)
    {
        ErrColumn = $<col>1;
        parse_error (116, CONTINUE);
    } if (Entry->VarType == UNINITIALIZED)                    /* Check and initialize variable type if necessary */
        Entry->VarType = RATE;
    else if (Entry->VarType != RATE)
    {
        ErrColumn = $<col>1;
        parse_error (106, CONTINUE);
    } if (Entry->AddInfo == NULL)
    {
        Entry->AddInfo = NewSymTabAddInfo ();
        Entry->AddInfo->ArrayInfo.NumDimensions = FixedNumIndices;
```

```
        }
        if (Temp[FixedNumIndices]->AddInfo == NULL)
            Temp[FixedNumIndices]->AddInfo = NewSTAddInfo ();  /* Obtain pointer to new STAddInfo structure */
        Temp[FixedNumIndices]->AddInfo->NumElements = FixedNumIndices;   /* Set the number of indices */ for (I = 0; I < FixedNumIndices; I++)
        {
            Temp[FixedNumIndices]->AddInfo->Nodes[I] = Temp[FixedNumIndices - I - 1];
            TempInt = EvaluateDimension (Temp[FixedNumIndices - I - 1]);
            Entry->AddInfo->ArrayInfo.DimensionSize[I] =
                  (TempInt > Entry->AddInfo->ArrayInfo.DimensionSize[I]) ? TempInt : Entry->AddInfo->ArrayInfo.DimensionSize[I];
        }

Temp[FixedNumIndices]->ErrColumn = $<col>1;           /* Added CW 6/22/91 */
        Push (Temp[FixedNumIndices]);                          /* Push the leaf node back */
        CurList--;
    }
    ;

current_rate:current_scalar_rate
    {
        Entry = LookUpSymTab ($<token>1);                     /* look up variable */ if (CheckDisable == FALSE) {
            if ((Entry->DataType == UNINITIALIZED) || (Entry->DataType == IDUNNO))
                Entry->DataType = DOUBLE;
            else if (Entry->DataType != DOUBLE)
            {
                ErrColumn = $<col>1;
                parse_error (108, CONTINUE);
            }
        }
    }
    else
    {
        if ((Entry->DataType == UNINITIALIZED) || (Entry->DataType == IDUNNO))
            Entry->DataType = DOUBLE_ARRAY;
        else if (Entry->DataType != DOUBLE_ARRAY)
        {
            ErrColumn = $<col>1;
            parse_error (116, CONTINUE);
        }
    }
    }
    |current_array_rate
    {
        Entry = LookUpSymTab ($<token>1);                     /* look up variable */
        if ((Entry->DataType == UNINITIALIZED) || (Entry->DataType == IDUNNO))
            Entry->DataType = DOUBLE_ARRAY;
        else if (Entry->DataType != DOUBLE_ARRAY)
        {
            ErrColumn = $<col>1;
            parse_error (116, CONTINUE);
        }
    }
```

```
        if (Entry->AddInfo == NULL)
        {                                    /* No conflicts to check, so just add the new info */
            Entry->AddInfo = NewSymTabAddInfo();          /* Allocate memory for additional info. */
            Entry->AddInfo->ArrayInfo.NumDimensions = NumIndices;    /* Set the number of dimensions */
        }
        else
        /* Info is already there.  Check for conflicts. */
        if ((Entry->AddInfo->ArrayInfo.NumDimensions != NumIndices))
        {                                    /* Error if mismatch in number of indices. */
            ErrColumn = $<col>1;
            parse_error (110, CONTINUE);
        }
    }
    ;

future_scalar_rate:no_sub_scalar SUB_KI.
{
    Entry = InsertInSymTab ($<token>1);              /* Create symbol table entry if necessary */
    if (Entry->Type == UNINITIALIZED)                /* Check and/or initialize token type */
        Entry->Type = VARIABLE;
    else if ((Entry->Type != VARIABLE) && (Entry->Type != PARAMETER))
    {
        ErrColumn = $<col>1;
        parse_error (104, CONTINUE);
    }
    if (Entry->VarType == UNINITIALIZED)             /* Check and/or initialize variable type */
        Entry->VarType = RATE;
    else if (Entry->VarType != RATE)
    {
        ErrColumn = $<col>1;
        parse_error (106, CONTINUE);
    }

FunctionEntry[FunctionEntryLevel+1].Entry = Entry;  /* Added 6/18/91 CW */
    FunctionEntry[FunctionEntryLevel+1].Count = 0;   /* Added 6/18/91 CW */
    Temp[0]=MakeLeafNode($<token>1);                 /* Added CW 6/22/91 */
    Temp[0]->ErrColumn = $<col>1;
    Push (Temp[0]);           /* Passed all the tests. Create leaf node.Push on stack. */
}
;

future_array_rate:future_scalar_rate list
{
    register int    FixedNumIndices;

NumIndices = NumElements(CurList);
    FixedNumIndices = NumIndices;

/* CHECK THAT INDICATED NUMBER OF DIMENSIONS DOES NOT EXCEED MAX_DIMENSIONS.  CORRECT IF NECESSARY. */ if (NumIndices >= MAX_DIMENSIONS)
    {
        ErrColumn = $<col>1;
```

```
          parse_error (118, CONTINUE);
          for (I = 0; I < NumIndices - MAX_DIMENSIONS; I++) /* Throw away extra elements! */
              DeleteTree (SPop ());
          FixedNumIndices = MAX_DIMENSIONS;      /* Lower number of elements so that program can safely
                                                  * continue */
     } for (I = 0; I < FixedNumIndices; I++)        /* Pop the leaf nodes for the Indices */
         Temp[I] = SPop ();

Temp[FixedNumIndices] = SPop ();             /* Pop leaf node for variable identifier to insert indices. */

Entry = Temp[FixedNumIndices]->Symbol;
     if (Entry->Type == UNINITIALIZED)            /* Check and initialize token type if necessary */
         Entry->Type = VARIABLE;
     else if ((Entry->Type != VARIABLE) && (Entry->Type != PARAMETER))
     {
         ErrColumn = $<col>1;
         parse_error (104, CONTINUE);
     } if ((Entry->DataType == UNINITIALIZED) || (Entry->DataType == IDUNNO))  /* Check and initialize token data type
                                                                              *  if necessary */
         Entry->DataType = DOUBLE_ARRAY;
     else if (Entry->DataType != DOUBLE_ARRAY)
     {
         ErrColumn = $<col>1;
         parse_error (116, CONTINUE);
     } if (Entry->VarType == UNINITIALIZED)         /* Check and initialize variable type if necessary */
         Entry->VarType = RATE;
     else if (Entry->VarType != RATE)
     {
         ErrColumn = $<col>1;
         parse_error (106, CONTINUE);
     } if (Entry->AddInfo == NULL)
     {
         Entry->AddInfo = NewSymTabAddInfo ();
         Entry->AddInfo->ArrayInfo.NumDimensions = FixedNumIndices;
     } if (Temp[FixedNumIndices]->AddInfo == NULL)
         Temp[FixedNumIndices]->AddInfo = NewSTAddInfo (); /* Obtain pointer to new STAddInfo structure */
     Temp[FixedNumIndices]->AddInfo->NumElements = FixedNumIndices;   /* Set the number of indices */ for (I = 0; I < FixedNumIndices; I++)        /* Set the indices */
     {
         Temp[FixedNumIndices]->AddInfo->Nodes[I] = Temp[FixedNumIndices - I - 1];
         TempInt = EvaluateDimension (Temp[FixedNumIndices - I - 1]);
         Entry->AddInfo->ArrayInfo.DimensionSize[I] =
             (TempInt > Entry->AddInfo->ArrayInfo.DimensionSize[I]) ? TempInt : Entry->AddInfo->ArrayInfo.DimensionSize[I];
     }
```

```
            Temp[FixedNumIndices]->ErrColumn = $<col>1;
            Push (Temp[FixedNumIndices]);                      /* Added CW 6/22/91 */
            CurList--;                                         /* Push the leaf node back */
        }
        ;

future_rate:future_scalar_rate
        {
            Entry = LookUpSymTab ($<token>1);                  /* Look up variable */ if (CheckDisable == FALSE) {
                if ((Entry->DataType == UNINITIALIZED) || (Entry->DataType == IDUNNO))
                    Entry->DataType = DOUBLE;
                else if (Entry->DataType != DOUBLE)
                {
                    ErrColumn = $<col>1;
                    parse_error (108, CONTINUE);
                }
            }
            else {
                if ((Entry->DataType == UNINITIALIZED) || (Entry->DataType == IDUNNO))
                    Entry->DataType = DOUBLE_ARRAY;
                else if (Entry->DataType != DOUBLE_ARRAY)
                {
                    ErrColumn = $<col>1;
                    parse_error (116, CONTINUE);
                }
            }
        }
        |future_array_rate
        {
            Entry = LookUpSymTab ($<token>1);                  /* Look up variable */
            if ((Entry->DataType == UNINITIALIZED) || (Entry->DataType == IDUNNO))
                Entry->DataType = DOUBLE_ARRAY;
            else if (Entry->DataType != DOUBLE_ARRAY)
            {
                ErrColumn = $<col>1;
                parse_error (116, CONTINUE);
            } if (Entry->AddInfo == NULL)
            {
                Entry->AddInfo = NewSymTabAddInfo ();           /* No conflicts to check, so just add the new info */
                Entry->AddInfo->ArrayInfo.NumDimensions = NumIndices;  /* Allocate memory for additional info. */
                                                                /* Set the number of dimensions */
            }
            else
            /* Info is already there.  Check for conflicts. */
            if ((Entry->AddInfo->ArrayInfo.NumDimensions != NumIndices)
            {
                                                                /* Error if mismatch in number of indices. */
                ErrColumn = $<col>1;
                parse_error (110, CONTINUE);
            }
        }
```

```
variable:
    current_level
    | past_level
    | current_rate
    | future_rate
    | no_sub_scalar
    {
        Entry = InsertInSymTab ($<token>1);            /* Insert in symbol table */
        if ((Entry->Type == VARIABLE) && (Entry->DataType == INTEGER))
        {
            /*printf ("FOR VARIABLE: %s detected.\n",$<token>1); */
            AddToFVStack (Entry);
        }
        /* Added CW 6/21/91 */
        if (CheckDisable == FALSE) { if ((Entry->DataType == UNINITIALIZED) || (Entry->DataType == IDUNNO))
                Entry->DataType = DOUBLE;
            else if (Entry->DataType == DOUBLE_ARRAY)
            {
                ErrColumn = $<col>1;
                parse_error (108, CONTINUE);
            }
        }
        else {
            if ((Entry->DataType == UNINITIALIZED) || (Entry->DataType == IDUNNO))
                Entry->DataType = DOUBLE_ARRAY;
            else if (Entry->DataType == DOUBLE)
            {
                ErrColumn = $<col>1;
                parse_error (116, CONTINUE);
            }
        }

Temp[0] = MakeLeafNode($<token>1);             /* Added CW 6/22/91 */
        Temp[0]->ErrColumn = $<col>1;
        Push (Temp[0]);                                /* Create leaf node and push on stack */
    }
    |reserved_variables
    ;

function_call_or_no_sub_array:IDENT
    {
        ErrNo = 11;
        Entry = InsertInSymTab ($<token>1);            /* Place function or array name in the symbol table */
        FunctionEntry[FunctionEntryLevel+1].Entry = Entry; /* Added 6/18/91 CW */
        FunctionEntry[FunctionEntryLevel+1].Count = 0; /* Added 6/18/91 CW */

Temp[0]=MakeLeafNode($<token>1);
        Temp[0]->ErrColumn = $<col>1;
        Push (Temp[0]);
```

```c
    if ((Entry->Type == FUNCTION) || (Entry->Type == MACROTYPE))
    {
        if (Entry->Type == MACROTYPE)
        {
            MacroFound = TRUE;
            CurMacroEntry = Entry;
        }
    }
    else
    {
        if (Entry->Type == UNINITIALIZED)           /* Check and/or initialize type */
            Entry->Type = VARIABLE;
        else if ((Entry->Type != VARIABLE) && (Entry->Type != PARAMETER) && (Entry->Type != CONSTANT))
        {
            ErrColumn = $<col>1;
            parse_error (104, CONTINUE);
        } if ((Entry->DataType == UNINITIALIZED) || (Entry->DataType == IDUNNO))
            Entry->DataType = DOUBLE_ARRAY;
        else if (Entry->DataType != DOUBLE_ARRAY)
        {
            ErrColumn = $<col>1;
            parse_error (116, CONTINUE);
        }
    }
    /* Don't need to set FUNCTION type, because it should already be set if the function call is being made. */
} llst
{
    register int    FixedNumIndices;
    SymTabEntryPtr  TheMacroEntry;

NumIndices = NumElements(CurList);
    FixedNumIndices = NumIndices;
    Entry = LookUpSymTab ($<token>1);              /* Look up function or array */
    TheMacroEntry = Entry;
    /*
     * CW 9-13-90 added to prevent prophet from exceeding array bounds and trashing memory. This enables the
     * program to continue running w/o messing up memory, by popping the extra elements from the stack, and letting
     * program continue. This will ruin the actual values stored for the array, but that is fine because the code
     * cannot be generated now anyway. The main goal here is to keep the program running!
     *      Added CW 8/5/91 for new macros */
    if ((Entry->Type == FUNCTION || Entry->Type == MACROTYPE) && (NumIndices >= MAX_ARGUMENTS))
    {
        ErrColumn = $<col>1;
        parse_error (119, CONTINUE);
        for (I = 0; I < NumIndices - MAX_ARGUMENTS; I++)    /* Throw away extra elements! */
            DeleteTree (SPop (1));
        FixedNumIndices = MAX_ARGUMENTS;           /* Lower number of elements so that program can safely
                                                    * continue */
    }
```

```
       else if (Entry->DataType == DOUBLE_ARRAY && NumIndices >= MAX_DIMENSIONS)
       {
            ErrColumn = $<col>1;
            parse_error (118, CONTINUE);
            for (I = 0; I < NumIndices - MAX_DIMENSIONS; I++)
                 DeleteTree (SPop ());
            FixedNumIndices = MAX_DIMENSIONS;
       }
       for (I = 0; I < MAX_DIMENSIONS; I++)
            Indices[I] = 0;

if ((Entry->Type == FUNCTION) || (Entry->Type == MACROTYPE))
       {
            for (I = 0; I < FixedNumIndices; I++)           /* Pop the leaf nodes for the Indices */
                 Temp[I] = SPop ();
            Temp[FixedNumIndices] = SPop ();                /* Pop leaf node for identifier to insert Indices */
       }
       else
       {
            for (I = 0; I < FixedNumIndices; I++)           /* Pop the leaf nodes for the Indices */
                 Temp[I] = SPop ();
            Temp[FixedNumIndices] = SPop ();                /* Pop leaf node for variable identifier to insert Indices.
                                                             * This leaf node not needed. Must actually release the
                                                             * memory. */

Entry = Temp[FixedNumIndices]->Symbol;
            if (Entry->AddInfo == NULL)
            {
                 Entry->AddInfo = NewSymTabAddInfo ();
                 Entry->AddInfo->ArrayInfo.NumDimensions = FixedNumIndices;
            }
       } if (Temp[FixedNumIndices]->AddInfo == NULL)
            Temp[FixedNumIndices]->AddInfo = NewSTAddInfo ();   /* Obtain pointer to new STAddInfo structure */
       Temp[FixedNumIndices]->AddInfo->NumElements = FixedNumIndices;  /* Set the number of Indices */
       for (I = 0; I < FixedNumIndices; I++)                    /* Set the Indices */
       {
            Temp[FixedNumIndices]->AddInfo->Nodes[I] = Temp[FixedNumIndices - I - 1];
            if (Entry->DataType == DOUBLE_ARRAY)
            {
                 TempInt = EvaluateDimension (Temp[FixedNumIndices - I - 1]);

Entry->AddInfo->ArrayInfo.DimensionSize[I] =
                      (TempInt > Entry->AddInfo->ArrayInfo.DimensionSize[I]) ?
                      TempInt : Entry->AddInfo->ArrayInfo.DimensionSize[I];
            }
       }

Temp[FixedNumIndices]->ErrColumn = $<col>1;             /* Added CW 6/22/91 */
       Push (Temp[FixedNumIndices]);                           /* Push the identifier's leaf node back */

CurList--;

if (Entry->DataType == DOUBLE_ARRAY)                    /* Only set dimension# and sizes if it is an array! */
       {
            if (Entry->AddInfo == NULL)
```

```c
                    /* No conflicts to check, so just add the new info */
            Entry->AddInfo = NewSymTabAddInfo ();     /* Allocate memory for additional info. */
            Entry->AddInfo->ArrayInfo.NumDimensions = NumIndices;   /* Set the number of dimensions */
        }
    else
        /* Info is already there.  Check for conflicts. */
        if (Entry->AddInfo->ArrayInfo.NumDimensions != NumIndices)
        {                                             /* Error if mismatch in number of indices. */
            ErrColumn = $<col>1;
            parse_error (110, CONTINUE);
        }
    }
    /* Can't determine size of array here */
}
else
/*
 * Need to check number of arguments for consistency, but do not need to set number of arguments
 * because that will have already been done by this time. */
if (Entry->AddInfo->FunctionInfo.NumArguments != NumIndices)
{
    ErrColumn = $<col>1;
    parse_error (110, CONTINUE);              /* Inconsistent number of arguments */
}

/* Added 6/18/91 CW */
/* Check to make sure that any DOUBLE_ARRAY arguments are really arrays w/o indices */
if (Entry->Type == FUNCTION)
{
    STNodePtr TempArg;

for (I=0; I<Entry->AddInfo->FunctionInfo.NumArguments; I++)
    {
        TempArg = Temp[Entry->AddInfo->FunctionInfo.NumArguments-I-1];
        if (Entry->AddInfo->FunctionInfo.ArgumentType[I] == DOUBLE_ARRAY) {
            if ((TempArg->Symbol->DataType != DOUBLE_ARRAY) && (TempArg->Symbol->DataType != DOUBLE))
            {
                ErrColumn = TempArg->ErrColumn;
                parse_error(131,CONTINUE);
            }
            else if (TempArg->Symbol->DataType == DOUBLE_ARRAY)
            {
                if ((TempArg->AddInfo != 0) && (TempArg->AddInfo->NumElements+1 !=
                    TempArg->Symbol->AddInfo->ArrayInfo.NumDimensions))
                {
                    /* Make sure that there are no '*' in array indices before reporting errors */
                    K=0;
                    if (TempArg->AddInfo != 0)
                    {
                        for (J=0; J<TempArg->AddInfo->NumElements; J++)
                            if (strcmp(TempArg->AddInfo->Nodes[J]->Symbol->Name,"0") ==0)
                                K++;
                    }
                    if (K!=1)
                    {
                        ErrColumn = TempArg->ErrColumn;
                        parse_error(130,CONTINUE);
                    }
                }
```

```
    }
    else
    {

/* Notes on FunctionEntry: It is used to keep track of the current function/array syntab entry that is currently being
 * parsed through. There is a Count field which is used to count the current arg number that was just parsed. In the
 * following line, the field is used to figure out what argument number TempArg is in, in the function/array that it
 * is located inside of. This is necessary so we can find out what the correct argument type is. It can either be an
 * array, or just a normal double value. Depending on what the type is, it must be processed differently. */
        STNodePtr TempArg;
        /* Make sure that this isn't a double_array argument, then test for '*' in the indices */
        if (((FunctionEntry[FunctionEntryLevel].Entry==0) ||
             (FunctionEntry[FunctionEntryLevel].Entry->AddInfo==0) ||
             (FunctionEntry[FunctionEntryLevel].Entry->AddInfo->FunctionInfo.ArgumentType[FunctionEntry[FunctionEntryLevel].Count]
              != DOUBLE_ARRAY)) &&
            (TableStatement == FALSE))
        {
            TempArg = Temp[FixedNumIndices];
            /* Make sure that there are no '*' in array indices or it is an error */
            K=0;
            if ((TempArg->AddInfo != 0) && (TempArg->Symbol->Type != MACROTYPE) && (TempArg->Symbol->Type != FUNCTION))
                for (J=0; J<TempArg->AddInfo->NumElements; J++)
                    if (strcmp(TempArg->AddInfo->Nodes[J]->Symbol->Name, "0") == 0)
                        K++;

if (K>0)
            {
                ErrColumn = TempArg->ErrColumn;
                parse_error(108,CONTINUE);
            }
        }

/* Added CW 8/5/91 for new macros */
        if ((UtilityMode == 0) &&
            (TheMacroEntry->Type == MACROTYPE))
            Push(GenerateMacroLines());
    }
}
;

plus_minus:'+'
    {
        $<token>$ = "+";
        Op = PLUS;
    }
|'-'
    {
        $<token>$ = "-";
        Op = MINUS;
    }
;
opt_plus_minus:plus_minus
    |
```

```
        $<token>$ = "NULL";
)
;

SPEC_keywords:DT                    /* Added CW 6/22/91 */
{
    Temp[0]=MakeLeafNode("DT");
    Temp[0]->ErrColumn = $<col>1;   /* Create leaf node and push on the stack */
    Push (Temp[0]);
}
|LENGTH
{
    Temp[0]=MakeLeafNode("LENGTH"); /* Added CW 6/22/91 */
    Temp[0]->ErrColumn = $<col>1;
    Push (Temp[0]);                 /* Create leaf node and push on the stack */
}
|PLTPER
{
    Temp[0]=MakeLeafNode("PLTPER"); /* Added CW 6/22/91 */
    Temp[0]->ErrColumn = $<col>1;
    Push (Temp[0]);                 /* Create leaf node and push on the stack */
}
|PRTPER
{
    Temp[0]=MakeLeafNode("PRTPER"); /* Added CW 6/22/91 */
    Temp[0]->ErrColumn = $<col>1;
    Push (Temp[0]);                 /* Create leaf node and push on the stack */
}
|SAVPER
{
    Temp[0]=MakeLeafNode("SAVPER"); /* Added CW 6/22/91 */
    Temp[0]->ErrColumn = $<col>1;
    Push (Temp[0]);                 /* Create leaf node and push on the stack */
}
|ABS_ERR
{
    Temp[0]=MakeLeafNode("ABS_ERR");/* Added CW 6/22/91 */
    Temp[0]->ErrColumn = $<col>1;
    Push (Temp[0]);                 /* Create leaf node and push on the stack */
}
|REL_ERR
{
    Temp[0]=MakeLeafNode("REL_ERR");/* Added CW 6/22/91 */
    Temp[0]->ErrColumn = $<col>1;
    Push (Temp[0]);                 /* Create leaf node and push on the stack */
}
|CMP_N_1
{
    Temp[0]=MakeLeafNode("CMP_N_1");/* Added CW 6/22/91 */
    Temp[0]->ErrColumn = $<col>1;
    Push (Temp[0]);                 /* Create leaf node and push on the stack */
}
|NS_SEED
```

```
        Temp[0]=MakeLeafNode("NS_SEED");
        Temp[0]->ErrColumn = $<col>1;
        Push (Temp[0]);                         /* Added CW 6/22/91 */
    }
    ;                                           /* Create leaf node and push on the stack */ reserved_variables:SPEC_keywords
                                                , /* Leaf nodes for SPEC_keywords are already on the stack. Do
                                                   * nothing. */
                                                  /* Need to check if TIME needs to be handled seperately from
                                                   * the other keywords */
    | TIME
    {
        Temp[0]=MakeLeafNode("TIME");
        Temp[0]->ErrColumn = $<col>1;
        Push (Temp[0]);                         /* Added CW 6/22/91 */
    }                                           /* Create leaf node and push on the stack */
    |TIME_SUB_K
    {
        Temp[0]=MakeLeafNode("TIME");
        Temp[0]->ErrColumn = $<col>1;
        Push (Temp[0]);                         /* Added CW 6/22/91 */
    }
    ;                                           /* Create leaf node and push on the stack */ exp:exp '/' exp
    {
        Temp[0] = SPop ();                      /* Pop second expression */
        Temp[1] = SPop ();                      /* Pop first expression */
        Push (MakeIntNode ("/", Temp[1], Temp[0]));     /* Create internal node and push on stack */
    }
    |exp '*' exp
    {
        Temp[0] = SPop ();                      /* Pop second expression */
        Temp[1] = SPop ();                      /* Pop first expression */
        Push (MakeIntNode ("*", Temp[1], Temp[0]));     /* Create internal node and push on stack */
    }
    |exp '+' exp
    {
        Temp[0] = SPop ();                      /* Pop second expression */
        Temp[1] = SPop ();                      /* Pop first expression */
        Push (MakeIntNode ("+", Temp[1], Temp[0]));     /* Create internal node and push on stack */
    }
    |exp '-' exp
    {
        Temp[0] = SPop ();                      /* Pop second expression */
        Temp[1] = SPop ();                      /* Pop first expression */
        Push (MakeIntNode ("-", Temp[1], Temp[0]));     /* Create internal node and push on stack */
    }
    |exp POWER exp
    {
        Temp[0] = SPop ();                      /* Pop second expression */
        Temp[1] = SPop ();                      /* Pop first expression */
        Entry = LookUpSymTab ("pow");                   /* Create a function call "pow(exp,exp)" */
        Temp[2] = MakeLeafNode ("pow");
```

```
            Temp[2]->AddInfo = NewSTAddInfo ();
            Temp[2]->AddInfo->NumElements = 2;
            Temp[2]->AddInfo->Nodes[0] = Temp[1];
            Temp[2]->AddInfo->Nodes[1] = Temp[0];
            Push (Temp[2]);                                    /* Push leaf node on the stack */
        }
    |'-' exp
        {
            Temp[0] = SPop ();                                 /* Pop expression */
            Push (MakeIntNode ("-", NULL /* Temp[1] */, Temp[0]));  /* Create internal node and push on stack */
        }
    |'(' exp ')'   '(' exp ')'
        {
            Temp[0] = SPop ();                                 /* Pop second expression */
            Temp[1] = SPop ();                                 /* Pop first expression */
            Push (MakeIntNode ("*", Temp[1], Temp[0]));        /* Create internal node and push on stack */
        }
    |'(' exp ')'
        {
                                                               /* Just an expression. Internal node already on stack. Do
                                                                * nothing. */
        }
    | variable
        {
        }
    | function_call_or_no_sub_array
        {
        }
    | INT
        {
            Entry = InsertInSymTab ($<token>1);                /* Insert in symbol table */

/* CW 9-7-90 added */
            Entry->Type = NUMBER;
            Entry->DataType = INTEGER;

Temp[0]=MakeLeafNode($<token>1);
            Temp[0]->ErrColumn = $<col>1;
            Push (Temp[0]);                                    /* Create leaf node and push on stack */
        }
    |FLOAT
        {
            Entry = InsertInSymTab ($<token>1);                /* Insert in symbol table */

/* CW 9-7-90 added */
            Entry->Type = NUMBER;
            Entry->DataType = DOUBLE;

Temp[0]=MakeLeafNode($<token>1);
            Temp[0]->ErrColumn = $<col>1;
            Push (Temp[0]);                                    /* Create leaf node and push on stack */
        }
    ;

Lexp:exp '/' exp
        {
            Temp[0] = SPop ();                                 /* Pop second expression */
            Temp[1] = SPop ();                                 /* Pop first expression */
            Push (MakeIntNode ("/", Temp[1], Temp[0]));        /* Create internal node and push on stack */
        }
```

```
|exp '^' exp
{
    Temp[0] = SPop ();                              /* Pop second expression */
    Temp[1] = SPop ();                              /* Pop first expression */
    Push (MakeIntNode ("*", Temp[1], Temp[0]));     /* Create internal node and push on stack */
}
|exp POWER exp
{
    Temp[0] = SPop ();                              /* Pop second expression */
    Temp[1] = SPop ();                              /* Pop first expression */
    Entry = LookUpSymTab ("pow");
    Temp[2] = MakeLeafNode ("pow");
    Temp[2]->AddInfo = NewSTAddInfo ();
    Temp[2]->AddInfo->NumElements = 2;
    Temp[2]->AddInfo->Nodes[0] = Temp[1];
    Temp[2]->AddInfo->Nodes[1] = Temp[0];
    Push (Temp[2]);                                 /* Create a function call "pow(exp,exp)" */
}
|'-' exp
{
    Temp[0] = SPop ();                              /* Pop expression */
    Push (MakeIntNode ("-", NULL /* Temp[1] */, Temp[0]));  /* Create internal node and push on stack */
}
|'(' exp ')' '(' exp ')'
{
    Temp[0] = SPop ();                              /* Pop second expression */
    Temp[1] = SPop ();                              /* Pop first expression */
    Push (MakeIntNode ("*", Temp[1], Temp[0]));     /* Create internal node and push on stack */
}
|'(' exp ')'
|variable
|function_call_or_no_sub_array
|INT
{
    Entry = InsertInSymTab ($<token>1);             /* Insert in symbol table */

/* CW 9-7-90 added */
    Entry->Type = NUMBER;
    Entry->DataType = INTEGER;

Temp[0]=MakeLeafNode($<token>1);
    Temp[0]->ErrColumn = $<col>1;                   /* Create leaf node and push on stack */
    Push (Temp[0]);
}
|FLOAT
{
    Entry = InsertInSymTab ($<token>1);             /* Insert in symbol table */

/* CW 9-7-90 added */
    Entry->Type = NUMBER;
    Entry->DataType = DOUBLE;

Temp[0]=MakeLeafNode($<token>1);
    Temp[0]->ErrColumn = $<col>1;                   /* Create leaf node and push on stack */
    Push (Temp[0]);
}
```

```
element:exp                              /* Node for expression already on stack. */
|  '*'
{
    Temp[0]=MakeLeafNode("0");
    Temp[0]->ErrColumn = $<col>1;        /* Added CW 6/22/91 */
    Push (Temp[0]);
                                          /* Create leaf node and push on stack */
} list_elements:element
{
    CurList++;
    if (CurList >= MAX_NESTING)          /* Increment nesting level of arrays */
    {
        ErrColumn = $<col>1;
        parse_error (120, DIE);
    }
    NumElements[CurList] = 1;            /* Start counting number of elements in the list */

/* Added 6/18/91 CW */
    FunctionEntry[FunctionEntryLevel].Count++;
    if ((FunctionEntry[FunctionEntryLevel].Entry!=0) &&
        (FunctionEntry[FunctionEntryLevel].Entry->AddInfo!=0) &&
        (FunctionEntry[FunctionEntryLevel].Entry->AddInfo->FunctionInfo.ArgumentType[NumElements(CurList)]
          == DOUBLE_ARRAY))
            CheckDisable = TRUE;
    else
        CheckDisable = FALSE;

}
| list_elements ',' element
{
    NumElements[CurList]++;              /* Count number of elements in the list */

/* Added 6/18/91 CW */
    FunctionEntry[FunctionEntryLevel].Count++;
    if ((FunctionEntry[FunctionEntryLevel].Entry!=0) &&
        (FunctionEntry[FunctionEntryLevel].Entry->AddInfo!=0) &&
        (FunctionEntry[FunctionEntryLevel].Entry->AddInfo->FunctionInfo.ArgumentType[NumElements(CurList)]
          == DOUBLE_ARRAY))
            CheckDisable = TRUE;
    else
        CheckDisable = FALSE;

}
;
list: '(' {
/* Added 6/18/91 CW */
    FunctionEntryLevel++;
    if ((FunctionEntry[FunctionEntryLevel].Entry!=0) &&
        (FunctionEntry[FunctionEntryLevel].Entry->AddInfo!=0) &&
```

```
                    (FunctionEntry[FunctionEntryLevel].Entry->AddInfo->FunctionInfo.ArgumentType[0] == DOUBLE_ARRAY))
                CheckDisable = TRUE;
        else
            CheckDisable = FALSE;
    } list_elements {
        CheckDisable = FALSE;
        FunctionEntry[FunctionEntryLevel].Entry = NULL;    /* Added 6/18/91 CW */
        FunctionEntry[FunctionEntryLevel].Count = 0;       /* Added 6/18/91 CW */
        FunctionEntryLevel--;
    }
    ;

time_increment:DT '*' Lexp
    {
        Temp[0] = SPop ();                              /* Pop expression */
        Temp[1] = MakeLeafNode ("DT");
        Temp[2] = MakeIntNode ("*", Temp[1], Temp[0]);
        Push (Temp[2]);
    }
    ;

|DT '/' Lexp
    {
        Temp[0] = SPop ();                              /* Pop expression */
        Temp[1] = MakeLeafNode ("DT");
        Push (MakeIntNode ("/", Temp[1], Temp[0]));
    }

|'(' DT ')' '*' Lexp
    {
        Temp[0] = SPop ();                              /* Pop expression */
        Temp[1] = MakeLeafNode ("DT");
        Push (MakeIntNode ("*", Temp[1], Temp[0]));
    }

|'(' DT ')' '/' Lexp
    {
        Temp[0] = SPop ();                              /* Pop expression */
        Temp[1] = MakeLeafNode ("DT");
        Push (MakeIntNode ("/", Temp[1], Temp[0]));
    }

|'(' DT '*' exp ')' '*' Lexp
    {
        Temp[0] = SPop ();                              /* Pop second expression */
        Temp[1] = SPop ();                              /* Pop first expression */
        Temp[2] = MakeLeafNode ("DT");                  /* Create leaf node for 'DT' */
        Temp[3] = MakeIntNode ("*", Temp[2], Temp[1]);  /* Create internal node for '(DT * exp)' */
        Push (MakeIntNode ("*", Temp[3], Temp[0]));     /* Create internal node for integral and push on stack */
    }

|'(' DT '*' exp ')' '/' Lexp
    {
        Temp[0] = SPop ();                              /* Pop second expression */
        Temp[1] = SPop ();                              /* Pop first expression */
        Temp[2] = MakeLeafNode ("DT");                  /* Create leaf node for 'DT' */
        Temp[3] = MakeIntNode ("/", Temp[2], Temp[1]);  /* Create internal node for '(DT * exp)' */
        Push (MakeIntNode ("*", Temp[3], Temp[0]));     /* Create internal node for integral and push on stack */
    }

|'(' DT ')' Lexp
    {
```

```
            Temp[0] = SPop ();                      /* Pop expression */
            Temp[1] = MakeLeafNode ("DT");          /* Create leaf node for 'DT' */
            Push (MakeIntNode ("*", Temp[1], Temp[0]));  /* Create internal node for '(DT * exp)' */
        }
    | '(' DT '*' exp ')' Lexp
        {
            Temp[0] = SPop ();                      /* Pop second expression */
            Temp[1] = SPop ();                      /* Pop first expression */
            Temp[2] = MakeLeafNode ("DT");          /* Create leaf node for 'DT' */
            Temp[3] = MakeIntNode ("*", Temp[2], Temp[1]);  /* Create internal node for '(DT * exp)' */
            Push (MakeIntNode ("*", Temp[3], Temp[0]));  /* Create internal node for integral and push on stack */
        }
    | '(' DT '/' exp ')' Lexp
        {
            Temp[0] = SPop ();                      /* Pop second expression */
            Temp[1] = SPop ();                      /* Pop first expression */
            Temp[2] = MakeLeafNode ("DT");          /* Create leaf node for 'DT' */
            Temp[3] = MakeIntNode ("/", Temp[2], Temp[1]);  /* Create internal node for '(DT / exp)' */
            Push (MakeIntNode ("*", Temp[3], Temp[0]));  /* Create internal node for integral and push on stack */
        }
    ;

L_equation_specifier:'L'
        {
            ErrNo = 1;
            BeganStatement = TRUE;
        }
    ;

L_equation:L_equation_specifier
        {
            ErrNo = 1;
        } current_level
        {
            ErrNo = 2;
        } '=' 
        {
            ErrNo = 3;
        } past_level
        {
            ErrNo = 4;
        } plus_minus
        {
            ErrNo = 5;
        } time_increment
        {
            Temp[0] = SPop ();                      /* Pop time increment */
            Temp[1] = SPop ();                      /* Pop past level */
            Temp[2] = SPop ();                      /* Pop current level */
            if (strcmp (Temp[1]->Symbol->Name, Temp[2]->Symbol->Name) != 0)
                                                    /* Check the names of the levels on either side */
            {
                ErrColumn = $<col>7;                /* Not the same, handle error */
                parse_error (101, CONTINUE);
```

```c
        }
    else if ((Temp[1]->AddInfo != NULL) && (Temp[2]->AddInfo != NULL))    /* If the levels are arrays, check
                                                                           * indices */
        {
        /* CW 9-12-90 added, to make sure we don't try to compare array elements that do not exist */
        if (Temp[1]->AddInfo->NumElements > Temp[2]->AddInfo->NumElements)
            NumIndices = Temp[2]->AddInfo->NumElements;
        else
            NumIndices = Temp[1]->AddInfo->NumElements;

I = 0;
        while (((I < NumIndices) && (strcmp (Temp[1]->AddInfo->Nodes[I]->Symbol->Name,
                                              Temp[2]->AddInfo->Nodes[I]->Symbol->Name) == 0))
            {
            /* Corresponding indices of levels on either side of the
             * equation must be the same. It is safe to assume here that
             * the number of indices of the levels on either side of the
             * equation are the same, since they must equal the expected
             * number of indices as stored in the symbol table, and
             * previously checked by the parser. */
            I++;
            } if (I != NumIndices)
            {                                      /* A premature exit was made from the loop */
            ErrColumn = S<col>7;
            parse_error (102, CONTINUE);           /* Handle the error */
            }
        }

/* 2-1-91 CW changed so that "+=" and "-=" operators are used to improve efficiency */
    /* Temp[3] = MakeIntNode( (Op == PLUS) ? "+" : "-", Temp[1], Temp[0]);     Make internal node for RHS */
    /*
     * Temp[4] = MakeIntNode( "=", Temp[2], Temp[3]);                          Make internal node for
     * equation
     */
    if (Op == PLUS)
        Temp[4] = MakeIntNode ("+=", Temp[2], Temp[0]);
    else
        Temp[4] = MakeIntNode ("-=", Temp[2], Temp[0]);

Temp[4]->LSon->Symbol->EquationType = LEVELTYPE;
    if (MacroFound == TRUE)
        {
        Temp[4]->LSon->Symbol->Macro = CurMacroEntry;
        MacroFound = FALSE;
        }

InsertEquation (Temp[4], 1, 'L');          /* Equation made!  Insert it into symbol table as active eq */
    BeganStatement = FALSE;
    }

A_equation:'A'
    {
    ErrNo = 1;
    BeganStatement = TRUE;
    } A_S_ML_equation
    {
    Temp[0] = SPop ();
```

```
            Temp[0]->LSon->Symbol->EquationType = AUXTYPE;        /* CW 9-10-90 added */
            if (MacroFound == TRUE)
            {
                Temp[0]->LSon->Symbol->Macro = CurMacroEntry;
                MacroFound = FALSE;
            }
            InsertEquation (Temp[0], 1, 'A');               /* Equation made.  Insert into symbol table as active value eq */
            BeganStatement = FALSE;
        }
    ;

R_equation:'R'
        {
            ErrNo = 7;
            BeganStatement = TRUE;
        }
        future_rate
        {
            ErrNo = 2;
        }
        '='
        {
            ErrNo = 6;
        }
        exp
        {
            Temp[0] = SPop ();                      /* Pop expression */
            Temp[1] = SPop ();                      /* Pop future rate */
            Temp[2] = MakeIntNode ("=", Temp[1], Temp[0]);   /* Create internal node and push on stack */
            Temp[2]->LSon->Symbol->EquationType = RATETYPE;  /* CW 9-10-90 added */
            if (MacroFound == TRUE)
            {
                Temp[2]->LSon->Symbol->Macro = CurMacroEntry;
                MacroFound = FALSE;
            }
            InsertEquation (Temp[2], 1, 'R');               /* Insert new equation into symbol table as active value eq */
            BeganStatement = FALSE;
        }
    ;

S_equation:'S'
        {
            ErrNo = 1;
            BeganStatement = TRUE;
        }
        A_S_ML_equation
        {
            Temp[0] = SPop ();
            Temp[0]->LSon->Symbol->EquationType = AUXTYPE;        /* CW 9-10-90 added */
            if (MacroFound == TRUE)
            {
                Temp[0]->LSon->Symbol->Macro = CurMacroEntry;
                MacroFound = FALSE;
            }
            InsertEquation (Temp[0], 1, 'S');               /* Insert new equation into symbol table as active value eq */
            BeganStatement = FALSE;
        }
```

```
N_or_K:'N'
    | 'K'
    ;

unsubscripted_variable:no_sub_scalar
    {
        /* CW 9-9-90 added */
        Entry = InsertInSymTab ($<token>1);
        If (Entry->Type == UNINITIALIZED)
            Entry->Type = VARIABLE;
        else if ((Entry->Type != VARIABLE) && (Entry->Type != PARAMETER))
        {
            ErrColumn = $<col>1;
            parse_error (104, CONTINUE);
        } if ((Entry->DataType == UNINITIALIZED) || (Entry->DataType == IDUNNO))
            Entry->DataType = DOUBLE;
        else if (Entry->DataType != DOUBLE)
        {
            ErrColumn = $<col>1;
            parse_error (108, CONTINUE);
        }

Temp[0]=MakeLeafNode($<token>1);
        Temp[0]->ErrColumn = $<col>1;
        Push (Temp[0]);                    /* Create leaf node and push on stack */
    }
    |function_call_or_no_sub_array         /* Leaf node already on stack. Do nothing. */
    | reserved_variables                   /* Leaf node already on stack. Do nothing. */
    ;

NK_equation:N_or_K
    {
        ErrNo = 11;
        BeganStatement = TRUE;
    } unsubscripted_variable
    {
        ErrNo = 2;
    } '=' 
    {
        ErrNo = 6;
    } exp
    {
        Temp[0] = SPop ();                 /* Pop expression */
        Temp[1] = SPop ();                 /* Pop unsubscripted variable */
        Temp[2] = MakeIntNode ("=", Temp[1], Temp[0]);   /* Create internal node */
        if (MacroFound == TRUE)
        {
            Temp[2]->LSon->Symbol->Macro = CurMacroEntry;
            MacroFound = FALSE;
```

```
            InsertEquation (Temp[2], 0, 'N');              /* Insert new equation as initial value eqn. */
            BeganStatement = FALSE;
        }
    ;

SECTOR_statement:SECTOR
    ;

IDENT_or_INTEGER:IDENT
    {
        Entry = InsertInSymTab ($<token>1);                /* Put IDENT in the symbol table */
        if (Entry->Type == UNINITIALIZED)
        {
            Entry->Type = CONSTANT;
            Entry->DataType = INTEGER;
            Entry->WhereFrom = COMPUTED;
        }
        else if (Entry->Type != CONSTANT)
        {
            ErrColumn = $<col>1;
            parse_error (125, CONTINUE);
        }
    }
    |INT
    {
        Entry = InsertInSymTab ($<token>1);                /* Put integer in the symbol table */
        if (Entry->Type == UNINITIALIZED)
        {
            Entry->Type = NUMBER;
            Entry->DataType = INTEGER;
        }
    }
    ;

I_list:IDENT_or_INTEGER
    {
        ErrNo = 24;
        CurList++;
        NumElements[CurList] = 1;                          /* Go on to next nesting level */
        Temp[0]=MakeLeafNode($<token>1);                   /* Start counting number of elements */
        Temp[0]->ErrColumn = $<col>1;
        Push (Temp[0]);
    }
    |I_list
    {
        ErrNo = 17;
    } IDENT_or_INTEGER
    {
        Temp[0]=MakeLeafNode($<token>4);                   /* Put the identifier or integer in the symbol table */
        Temp[0]->ErrColumn = $<col>4;                                       /* Count number of elements */
        Push (Temp[0]);
        NumElements[CurList]++;
    }
    ;
```

```
basic_FOR_statement:FOR
    {
        ErrNo = 20;
        BeganStatement = TRUE;
    } IDENT
    {
        ErrNo = 2;
        if (LookUpSymTab($<token>3) != NULL) {
            ErrColumn = $<col>3;
            parse_error(132,CONTINUE);
        }
    }
    '='
    {
        ErrNo = 19;
    } IDENT_or_INTEGER
    {
        ErrNo = 17;
    }
    ','
    {
        ErrNo = 19;
    } IDENT_or_INTEGER
    {
        Entry = InsertInSymTab ($<token>3);    /* Put left-most FOR variable in the symbol table */
        ForEntry = Entry;                       /* Added CW 6/21/91 */
        if (Entry->Type == UNINITIALIZED)
        {
            Entry->Type = VARIABLE;
            Entry->DataType = INTEGER;
            Entry->AddInfo = NewSymTabAddInfo ();
            Temp[0] = MakeLeafNode ($<token>3);
        }
        Temp[1] = MakeLeafNode ($<token>7);
        Temp[2] = MakeLeafNode ($<token>11);
        Temp[1]->ErrColumn = $<col>7;
        Temp[2]->ErrColumn = $<col>11;
        Push (Temp[0]);
        Push (Temp[1]);
        Push (Temp[2]);
    }
    /* Added CW 6/21/91 */
    Entry->AddInfo->ForInfo.Entry=Temp[1]->Symbol;
    Entry->AddInfo->ForInfo.Next=(AddForInfoPtr)CheckAlloc(sizeof(AddForInfo));
    Entry->AddInfo->ForInfo.Next->Entry=Temp[2]->Symbol;
    Entry->AddInfo->ForInfo.Next->Next=NULL;
    ;
first_FOR_statement:basic_FOR_statement
    {
        ErrNo = 17;
    }
    ','
    {
        ErrNo = 19;
    } I_list
    {
```

```
AddForInfoPtr TempEntry;    /* Added CW 6/21/91 */
TempEntry = ForEntry->AddInfo->ForInfo.Next;

NumValues = NumElements(CurList);
for (I = 0; I < NumValues; I++)
{
    Temp[I] = SPop ();
    Entry = Temp[I]->Symbol;
    if (Entry->Type == UNINITIALIZED)
        Entry->Type = CONSTANT;
    else if (Entry->Type != CONSTANT)
    {
        ErrColumn = Temp[I]->ErrColumn;
        parse_error (126, CONTINUE);
    }
    if (Entry->DataType == UNINITIALIZED)
        Entry->DataType = INTEGER;
    else if (Entry->DataType != INTEGER)
    {
        ErrColumn = Temp[I]->ErrColumn;
        parse_error (126, CONTINUE);
    }

/* Added CW 6/21/91 */
    TempEntry->Next = (AddForInfoPtr)CheckAlloc(sizeof(AddForInfo));
    TempEntry=TempEntry->Next;
    TempEntry->Entry=Temp[I]->Symbol;
    TempEntry->Next=NULL;
}

Temp[NumValues] = SPop ();
Temp[NumValues + 1] = SPop ();
Temp[NumValues + 2] = SPop ();

Entry = Temp[NumValues]->Symbol;

if (Entry->Type == NUMBER)
{
    if (Entry->DataType != INTEGER)
    {
        ErrColumn = Temp[NumValues]->ErrColumn;
        parse_error (125, CONTINUE);
    }
}
else if (Entry->Type == CONSTANT)
{
    if (Entry->DataType != INTEGER)
    {
        ErrColumn = Temp[NumValues]->ErrColumn;
        parse_error (125, CONTINUE);
    }
}
else
{
```

```
            ErrColumn = Temp[NumValues]->ErrColumn;
            parse_error (125, CONTINUE);
        }

Entry = Temp[NumValues + 1]->Symbol;

if (Entry->Type == NUMBER)
        {
            if (Entry->DataType != INTEGER)
            {
                ErrColumn = Temp[NumValues+1]->ErrColumn;
                parse_error (125, CONTINUE);
            }
        }
        else if (Entry->Type == CONSTANT)
        {
            if (Entry->DataType != INTEGER)
            {
                ErrColumn = Temp[NumValues+1]->ErrColumn;
                parse_error (125, CONTINUE);
            }
        }
        else
        {
            ErrColumn = Temp[NumValues+1]->ErrColumn;
            parse_error (125, CONTINUE);
        }

Entry = Temp[NumValues + 2]->Symbol;
        InsertForList(Entry->Name,ForEntry->AddInfo);
        ForEntry->AddInfo=NewSymTabAddInfo();
        Entry->AddInfo->LoopIndexInfo.LowLimit = 1;
        Entry->AddInfo->LoopIndexInfo.HighLimit = NumValues + 2;
        Entry->AddInfo->LoopIndexInfo.CurVal = Entry->AddInfo->LoopIndexInfo.LowLimit;

NumValues += 2;

for (I = 0; I < NumValues; I++)
        {
            sprintf ((char *) TempString, "%d", I + 1);
            Temp[NumValues + I + 1] = MakeLeafNode ((char *) TempString);
            Temp[NumValues + I + 2] = MakeIntNode ("=", Temp[NumValues - I - 1], Temp[NumValues + I + 1]);
            InsertEquation (Temp[NumValues + I + 2], 0, 'F');
        }

CurList--;
    }
    ;

second_FOR_statement:basic_FOR_statement
    {
        ErrNo = 2;
    }
    '='
    {
        ErrNo = 19;
    }
    I_list
```

```
            AddForInfoPtr TempEntry;     /* Added CW 6/21/91 */

TempEntry = ForEntry->AddInfo->ForInfo.Next;

NumValues = NumElements(CurList);
            for (I = 0; I < NumValues; I++)
            {
                Temp[I] = SPop ();
                Entry = Temp[I]->Symbol;
                if (Entry->Type == UNINITIALIZED)
                    Entry->Type = CONSTANT;
                else if (Entry->Type != CONSTANT)
                {
                    ErrColumn = Temp[I]->ErrColumn;
                    parse_error (126, CONTINUE);
                } if (Entry->DataType == UNINITIALIZED)
                    Entry->DataType = INTEGER;
                else if (Entry->DataType != INTEGER)
                {
                    ErrColumn = Temp[I]->ErrColumn;
                    parse_error (126, CONTINUE);
                }
            }

/* Added CW 6/21/91 */
            TempEntry->Next = (AddForInfoPtr)CheckAlloc(sizeof(AddForInfo));
            TempEntry=TempEntry->Next;
            TempEntry->Entry=Temp[I]->Symbol;
            TempEntry->Next=NULL;
        }

Temp[NumValues]   = SPop ();          /* Pop Higher Limit */
        Temp[NumValues + 1] = SPop ();        /* Pop Lower Limit */
        Temp[NumValues + 2] = SPop ();        /* Pop FOR variable Identifier */

Entry = Temp[NumValues]->Symbol;

if (Entry->Type == NUMBER)
        {
            if (Entry->DataType != INTEGER)
            {
                ErrColumn = Temp[NumValues]->ErrColumn;
                parse_error (125, CONTINUE);
            }
        }
        else if (Entry->Type == CONSTANT)
        {
            if (Entry->DataType != INTEGER)
            {
                ErrColumn = Temp[NumValues]->ErrColumn;
                parse_error (125, CONTINUE);
            }
        }
```

```
        else
          {
            ErrColumn = Temp[NumValues]->ErrColumn;
            parse_error (125, CONTINUE);
          }

Entry = Temp[NumValues + 1]->Symbol;
        if (Entry->Type == NUMBER)
          {
            if (Entry->DataType != INTEGER)
              {
                ErrColumn = Temp[NumValues+1]->ErrColumn;
                parse_error (125, CONTINUE);
              }
          }
        else if (Entry->Type == CONSTANT)
          {
            if (Entry->DataType != INTEGER)
              {
                ErrColumn = Temp[NumValues+1]->ErrColumn;
                parse_error (125, CONTINUE);
              }
          }
        else
          {
            ErrColumn = Temp[NumValues+1]->ErrColumn;
            parse_error (125, CONTINUE);
          }

Entry = Temp[NumValues + 2]->Symbol;
        InsertForList(Entry->Name,ForEntry->AddInfo);
        ForEntry->AddInfo=NewSymTabAddInfo();
        Entry->AddInfo->LoopIndexInfo.LowLimit = EvaluateIndex (Temp[NumValues + 1]);
        Entry->AddInfo->LoopIndexInfo.HighLimit = EvaluateIndex (Temp[NumValues]);
        Entry->AddInfo->LoopIndexInfo.CurVal = Entry->AddInfo->LoopIndexInfo.LowLimit;

for (I = 0; I < NumValues; I++)
          {
            sprintf ((char *) TempString, "%d", EvaluateIndex (Temp[NumValues + 1]) + I);
            Temp[NumValues + I + 3] = MakeLeafNode ((char *) TempString);
            Temp[NumValues + I + 4] = MakeIntNode ("=", Temp[NumValues - I - 1], Temp[NumValues + I + 3]);
            InsertEquation (Temp[NumValues + I + 4], 0, 'F');
          }

CurList--;
      }
  ;

FOR_statement:first_FOR_statement
  | second_FOR_statement
  | basic_FOR_statement
    {
        Temp[2] = SPop ();                    /* Pop higher limit */
        Temp[1] = SPop ();                    /* Pop lower limit */
        Temp[0] = SPop ();                    /* Pop FOR Variable */
```

```c
InsertForList(Temp[0]->Symbol->Name,Temp[0]->Symbol->AddInfo);
ForEntry->AddInfo=NewSymTabAddInfo();

Entry = Temp[1]->Symbol;
if (Entry->Type == NUMBER)
{
    if (Entry->DataType != INTEGER)
    {
        ErrColumn = Temp[1]->ErrColumn;
        parse_error (125, CONTINUE);
    }
}
else if (Entry->Type == CONSTANT)
{
    if (Entry->InitValEquation == NULL)
    {
        Temp[3] = MakeLeafNode ("1");
        Temp[4] = MakeIntNode ("=", Temp[1], Temp[3]);
        InsertEquation (Temp[4], 0, 'F');
    }
}
else
{
    ErrColumn = Temp[1]->ErrColumn;
    parse_error (126, CONTINUE);
}

Entry = Temp[2]->Symbol;
if (Entry->Type == NUMBER)
{
    if (Entry->DataType != INTEGER)
    {
        ErrColumn = Temp[2]->ErrColumn;
        parse_error (125, CONTINUE);
    }
    if (Entry->InitValEquation == NULL)
}
else if (Entry->Type == CONSTANT)
{
    if (Entry->DataType != INTEGER)
    {
        ErrColumn = Temp[2]->ErrColumn;
        parse_error (125, CONTINUE);
    }
    if (Entry->InitValEquation == NULL)
    {
        Temp[3] = MakeLeafNode ("2");
        Temp[4] = MakeIntNode ("=", Temp[2], Temp[3]);
        InsertEquation (Temp[4], 0, 'F');
    }
}
else
{
    ErrColumn = Temp[2]->ErrColumn;
```

```
        parse_error (125, CONTINUE);
} switch (Temp[1]->Symbol->Type)
{
case NUMBER:
        sprintf (TempString1, "%s", Temp[1]->Symbol->Name);
        sscanf (TempString1, "%d", &Temp[0]->Symbol->AddInfo->LoopIndexInfo.LowLimit);
        break;

case CONSTANT:
        sprintf (TempString1, "%s", Temp[1]->Symbol->Name);
        sscanf (TempString1, "%d", &Temp[0]->Symbol->AddInfo->LoopIndexInfo.LowLimit);
        break;

default:
        break;
} switch (Temp[2]->Symbol->Type)
{
case NUMBER:
        sprintf (TempString1, "%s", Temp[2]->Symbol->Name);
        sscanf (TempString1, "%d", &Temp[0]->Symbol->AddInfo->LoopIndexInfo.HighLimit);
        break;

case CONSTANT:
        sprintf (TempString1, "%s", Temp[2]->Symbol->Name);
        sscanf (TempString1, "%d", &Temp[0]->Symbol->AddInfo->LoopIndexInfo.HighLimit);
        break;

default:
        break;
}

Temp[0]->Symbol->AddInfo->LoopIndexInfo.CurVal = Temp[0]->Symbol->AddInfo->LoopIndexInfo.LowLimit;

BeganStatement = FALSE;
}
;

executable_statement:L_equation
        | R_equation
        | A_equation
        | S_equation
        | NK_equation
        | constant_equation
        | E_statement
        | Z_statement
        | T_statement
        | FOR_statement
        | V_statement
        ;
```

```
declarative_statement:NOISE_statement
| SAVE_statement
| query_statement
| DMNSN_statement
| SECTOR_statement
;

statement:executable_statement
| declarative_statement
| MACRO_block
| empty_line;

comma_slash:','
| '/'
;

constant_value_assignment:no_sub_scalar
{
    ErrNo = 2;
    Entry = InsertInSymTab ($<token>1);           /* Insert constant variable into symbol table */

/* Entry->EquationType = CONSTANTTYPE; CW 9-10-90 added */

/* CW 9-8-90 added these actions */
    if (Entry->Type == UNINITIALIZED)
        Entry->Type = CONSTANT;
    if ((Entry->DataType == UNINITIALIZED) || (Entry->DataType == IDUNNO))
        Entry->DataType = ConstantType;
    else if (Entry->Type != CONSTANT)
    {
        ErrColumn = $<col>1;
        parse_error (112, CONTINUE);
    } if (Entry->DataType == DOUBLE_ARRAY) {
        ErrColumn = $<col>1;
        parse_error(108,CONTINUE);
    } if (Entry->DataType == IDUNNO)
        Entry->DataType = DOUBLE;

Temp[0]=MakeLeafNode($<token>1);
    Temp[0]->ErrColumn = $<col>1;
    Push (Temp[0]);                                /* Put constant on the stack */

}
;
number
{
    ErrNo = 18;

Temp[0] = Pop ();                              /* Pop expression */
    Temp[1] = Pop ();                              /* Pop leaf node for variable identifier */
    Temp[2]<= MakeIntNode ("=", Temp[1], Temp[0]); /* Create internal node for assignment */
    Temp[2]->Lson->Symbol->EquationType = CONSTANTTYPE;/* CW 9-10-90 added */
```

```
        if (MacroFound == TRUE)
        {
            Temp[2]->LSon->Symbol->Macro = CurMacroEntry;
            MacroFound = FALSE;
        }
        InsertEquation (Temp[2], 0, 'C');          /* Insert constant equation into symbol table */
    }
| SPEC_keywords
    {
        ErrNo = 7;
    }
'=' 
    {
        ErrNo = 18;
    }
number
    {
        Temp[0] = Pop ();                          /* Pop expression */
        Temp[1] = Pop ();                          /* Pop leaf node for keyword */
        Temp[2] = MakeIntNode ("=", Temp[1], Temp[0]);   /* Create internal node for assignment */
        if (MacroFound == TRUE)
        {
            Temp[2]->LSon->Symbol->Macro = CurMacroEntry;
            MacroFound = FALSE;
        }
        InsertEquation (Temp[2], 0, 'C');          /* Insert constant equation into symbol table */
    }
| IDENT {
        Entry = InsertInSymTab ($<token>1);        /* Place function or array name in the symbol table */
        Temp[0]=MakeLeafNode($<token>1);
        Temp[0]->ErrColumn = $<col>1;
        Push (Temp[0]);

if (ConstantType == INTEGER)
        {
            ErrColumn = $<col>1;
            parse_error (129,CONTINUE);
        }
        if ((Entry->DataType == UNINITIALIZED) || (Entry->DataType == IDUNNO))
            Entry->DataType = DOUBLE_ARRAY;
        else if (Entry->DataType != DOUBLE_ARRAY)
        {
            ErrColumn = $<col>1;
            parse_error (116, CONTINUE);
        }
    }
list
    {
        register int   FixedNumIndices;
        NumIndices = NumElements(CurList);
        FixedNumIndices = NumIndices;
        Entry = LookUpSymTab ($<token>1);          /* Look up function or array */ if (Entry->DataType == DOUBLE_ARRAY && NumIndices >= MAX_DIMENSIONS)
        {
```

```
        ErrColumn = $<col>1;
        parse_error (118, CONTINUE);
        for (I = 0; I < NumIndices - MAX_DIMENSIONS; I++)
            DeleteTree (SPop ());
        FixedNumIndices = MAX_DIMENSIONS;
    }
    for (I = 0; I < MAX_DIMENSIONS; I++)
        Indices[I] = 0;

for (I = 0; I < FixedNumIndices; I++)             /* Pop the leaf nodes for the Indices */
        Temp[I] = SPop ();
    Temp[FixedNumIndices] = SPop ();                  /* Pop leaf node for variable identifier to insert indices.
                                                       * This leaf node not needed. Must actually release the
                                                       * memory. */
    Entry = Temp[FixedNumIndices]->Symbol;
    if (Entry->AddInfo == NULL)
    {
        Entry->AddInfo = NewSymTabAddInfo ();
        Entry->AddInfo->ArrayInfo.NumDimensions = FixedNumIndices;
    }
    if (Temp[FixedNumIndices]->AddInfo == NULL)
        Temp[FixedNumIndices]->AddInfo = NewSTAddInfo (); /* Obtain pointer to new STAddInfo structure */
    Temp[FixedNumIndices]->AddInfo->NumElements = FixedNumIndices;  /* Set the number of indices */
    for (I = 0; I < FixedNumIndices; I++)
    {                                                 /* Set the indices */
        Temp[FixedNumIndices]->AddInfo->Nodes[I] = Temp[FixedNumIndices - I - 1];
        if (Entry->DataType == DOUBLE_ARRAY)
        {
            TempInt = EvaluateDimension (Temp[FixedNumIndices - I - 1]);
            Entry->AddInfo->ArrayInfo.DimensionSize[I] =
                (TempInt > Entry->AddInfo->ArrayInfo.DimensionSize[I]) ?
                TempInt : Entry->AddInfo->ArrayInfo.DimensionSize[I];
        }
    }

Temp[FixedNumIndices]->ErrColumn = $<col>1;
    Push (Temp[FixedNumIndices]);                     /* Push the identifier's leaf node back */
    CurList--;

if (Entry->AddInfo == NULL)
    {                                                 /* No conflicts to check, so just add the new info */
        Entry->AddInfo = NewSymTabAddInfo ();         /* Allocate memory for additional info. */
        Entry->AddInfo->ArrayInfo.NumDimensions = NumIndices;  /* Set the number of dimensions */
    }
    else
    /* Info is already there. Check for conflicts. */
    if (Entry->AddInfo->ArrayInfo.NumDimensions != NumIndices)
    {                                                 /* Error if mismatch in number of indices. */
        ErrColumn = $<col>1;
        parse_error (110, CONTINUE);
    }
    /* Can't determine size of array here */
    if (ConstantType == INTEGER)
        Entry->DataType = INTEGER;
```

```
        ErrNo = 2;
    }
    '='
    {
        ErrNo = 18;
    }
    number
    {
        Temp[0] = Pop ();                    /* Pop expression */
        Temp[1] = Pop ();                    /* Pop leaf node for array variable. Need to insert check in
                                              * here, to make sure that what was just popped, is in fact
                                              * an array and not a function call. */

Temp[1]->Symbol->Type = CONSTANT;
        Entry=Temp[1]->Symbol;
        Temp[2] = MakeIntNode ("=", Temp[1], Temp[0]);    /* Create internal node for assignment */
        if (MacroFound == TRUE)
        {
            Temp[2]->LSon->Symbol->Macro = CurMacroEntry;
            MacroFound = FALSE;
        }

InsertEquation (Temp[2], 0, 'C');    /* Insert constant equation into symbol table */
    }
    ;

constant_equation_specifier:'B'
    {
        ConstantType = IDUNNO;
        BeganStatement = TRUE;
    }
    |'C'
    {
        ConstantType = IDUNNO;
        BeganStatement = TRUE;
    }
    |'D'
    {
        ConstantType = IDUNNO;
        BeganStatement = TRUE;
    }
    |'I'
    {
        ConstantType = INTEGER;
        BeganStatement = TRUE;
    }
    |'P'
    {
        ConstantType = IDUNNO;
        BeganStatement = TRUE;
    }
    ;

constant_value_assignment_list:constant_value_assignment
    | constant_value_assignment_list comma slash constant_value_assignment
```

```
constant_equation:constant_equation_specifier constant_value_assignment_list
    {
        BeganStatement = FALSE;
    /*
        if (UtilityMode != 0)
            LastEquation->LineNo = LastEquation->LineNo-1;
    */
    }
    ;

IDENT_list:no_sub_scalar
    {
        CurList++;
        if (CurList >= MAX_NESTING)                         /* CW 9-10-90 added */
        {
            ErrColumn = $<col>1;
            parse_error (120, DIE);
        }
        NumElements[CurList] = 1;
        Entry = InsertInSymTab ($<token>1);                 /* Not known what to initialize this to at this point */
        Temp[0]=MakeLeafNode($<token>1);
        Temp[0]->ErrColumn = $<col>1;
        Push (Temp[0]);
    }
    |IDENT_list
    {
        ErrNo = 17;
    }
    ','
    {
        ErrNo = 11;
    }
    no_sub_scalar
    {
        NumElements[CurList]++;
        Entry = InsertInSymTab ($<token>5);
        Temp[0]=MakeLeafNode($<token>5);                    /* Not known what to initialize this to at this point */
        Temp[0]->ErrColumn = $<col>5;
        Push (Temp[0]);
    }
    ;

no_sub_scalar
    {
        Entry = InsertInSymTab ($<token>1);
        Temp[0]=MakeLeafNode($<token>1);
        Temp[0]->ErrColumn = $<col>1;
        Push (Temp[0]);
    }
    |function_call_or_no_sub_array
    ;

IDENT2 :IDENT2
    {
        char            WorkString[MAX_BUF_LENGTH],         /* Not known what to initialize this to at this point */
```

```
                    WorkString2[MAX_BUF_LENGTH];
    int             LocalFVStackTop;            /* Added CW 8/14/91 */

Temp[0] = SPop ();

Temp[0]->Symbol->Type = VARIABLE;
    strcpy (WorkString, "\"");
    strcat (WorkString, Temp[0]->Symbol->Name);
    if (Temp[0]->AddInfo != NULL)
    {
         strcat (WorkString, "(");
         for (J = 0; J < Temp[0]->AddInfo->NumElements; J++)
         {
             sprintf (WorkString2, "%s", Temp[0]->AddInfo->Nodes[J]->Symbol->Name);
             strcat (WorkString, WorkString2);
             if (J < Temp[0]->AddInfo->NumElements - 1)
                  strcat (WorkString, ",");
         }
         strcat (WorkString, ")");
    }
    strcat (WorkString, "\"");
    Temp[3] = MakeLeafNode (WorkString);
    Temp[3]->Symbol->Type = PARAMETER;
    if (EorZ == 1)
         Temp[1] = MakeLeafNode ("ObtainZValue");
    else
         Temp[1] = MakeLeafNode ("ObtainEValue");
    Temp[1]->AddInfo = NewSTAddInfo ();
    Temp[1]->AddInfo->NumElements = 1;
    Temp[1]->AddInfo->Nodes[0] = Temp[3];
    Temp[2] = MakeIntNode ("=", Temp[0], Temp[1]);

if (Temp[0]->Symbol->WhereFrom == UNINITIALIZED)
         Temp[0]->Symbol->WhereFrom = EXOGENOUS;
    else if (Temp[0]->Symbol->WhereFrom != EXOGENOUS)
    {
         ErrColumn = Temp[0]->ErrColumn;
         parse_error (107, CONTINUE);
    }

Temp[0]->Symbol->EquationType = RATETYPE;

LocalFVStackTop = FVStackTop;           /* Added CW 8/14/91 */
    if (UtilityMode == 0)
         InsertEquation (Temp[2], 1, 'E');
    FVStackTop = LocalFVStackTop;           /* Added CW 8/14/91 */
    InsertEquation (DuplicateNode (Temp[2]), 0, 'E');
}

IDENT2_list:IDENT2_
   |IDENT2_list
```

```
        ErrNo = 17;
    )  ',',
    {
        ErrNo = 11;
    } IDENT2_
    ;

E_statement:'E'
    (
        ErrNo = 11;
        BeganStatement = TRUE;
        EorZ = 1;
    } IDENT2_list
    {
        BeganStatement = FALSE;
        EorZ=0;
    }
    ;

V_statement: 'V' COMPARE '(' STRING ',' no_sub_scalar ',' no_sub_scalar ')' {
    char    temp[15];
    VCount++;                                        /* Keep track of counter for creating dummy var name */
    Temp[0] = MakeLeafNode($<token>8);               /* Create second variable */
    Temp[1] = MakeLeafNode($<token>6);               /* Create first variable */
    Temp[2] = MakeLeafNode($<token>4);               /* Create node for string */
    Entry = LookUpSymTab($<token>4);
    Entry->DataType = STRING_TYPE;                   /* Set its type to "STRING" */
    sprintf(temp,"vDummy%d",VCount);
    Temp[4] = MakeLeafNode(temp);                    /* Create dummy variable name for LHS */
    Entry=LookUpSymTab(temp);                        /* Make leaf node for LHS variable */
    Entry->VarType = VTYPE;
    Entry->DataType = INTEGER;
    Entry->Type = VARIABLE;
    Entry = LookUpSymTab ("_Compare");
    Entry->Type = FUNCTION;
    Temp[3] = MakeLeafNode ("_Compare");             /* Create a function call "_Compare(string,var1,var2)" */
    Temp[3]->AddInfo = NewSTAddInfo ();
    Temp[3]->AddInfo->NumElements = 3;
    Temp[3]->AddInfo->Nodes[0] = Temp[2];
    Temp[3]->AddInfo->Nodes[1] = Temp[1];
    Temp[3]->AddInfo->Nodes[2] = Temp[0];
    Temp[5] = MakeIntNode("=",Temp[4],Temp[3]);
    InsertEquation(Temp[5],0, 'v');                  /* Insert it! */
    }
    ;

Z_statement:'Z'
    {
        ErrNo = 11;
        BeganStatement = TRUE;
        EorZ=2;
    } IDENT2_list
    {
        BeganStatement = FALSE;
```

```
        EorZ=0;
    }
    ;

number:opt_plus_minus INT
    {
        if (strcmp ("-", $<token>1) == 0)            /* Negative integer */
        {
            Entry = InsertInSymTab ($<token>2);       /* Create symbol table entry for number */

/* CW 9-7-90 added */
            Entry->Type = NUMBER;
            Entry->DataType = INTEGER;

Temp[1] = MakeLeafNode ($<token>2);;      /* Create leaf node for number */
            Temp[1]->ErrColumn = $<col>2;
            Temp[2] = MakeIntNode ($<token>1, NULL, Temp[1]);  /* Create internal node for signed number */
            Push (Temp[2]);
        }
        else
        {
            Entry = InsertInSymTab ($<token>2);       /* Unsigned integer */

/* CW 9-7-90 added */
            Entry->Type = NUMBER;
            Entry->DataType = INTEGER;

Temp[0]=MakeLeafNode($<token>2);
            Temp[0]->ErrColumn = $<col>2;
            Push (Temp[0]);
        }
    }
    |opt_plus_minus FLOAT
    {
        if (strcmp ("-", $<token>1) == 0)            /* Negative float */
        {
            Entry = InsertInSymTab ($<token>2);       /* Create symbol table entry for number */

/* CW 9-7-90 added */
            Entry->Type = NUMBER;
            Entry->DataType = DOUBLE;

Temp[1] = MakeLeafNode ($<token>2);       /* Create leaf node for number */
            Temp[2] = MakeIntNode ($<token>1, NULL, Temp[1]);  /* Create internal node for signed number */
            Temp[1]->ErrColumn = $<col>2;
            Push (Temp[2]);
        }
        else
        {
            Entry = InsertInSymTab ($<token>2);       /* Unsigned float */

/* CW 9-7-90 added */
            Entry->Type = NUMBER;
            Entry->DataType = DOUBLE;
```

```
                Temp[0]=MakeLeafNode($<token>2);
                Temp[0]->ErrColumn = $<col>2;
                Push (Temp[0]);
        }
        ;

number_list:number
        {
                CurList++;
                if (CurList >= MAX_NESTING)
                {
                        ErrColumn = $<col>1;
                        parse_error (120, DIE);
                }
                NumElements[CurList] = 1;
        }
        |number_list comma_slash number
        {
                NumElements[CurList]++;
        }
        ;

table_identifier:no_sub_scalar
        {
                Entry = InsertInSymTab ($<token>1);

/* CW 9-7-90 added */
                if (Entry->Type == UNINITIALIZED)
                        Entry->Type = VARIABLE;
                else if (Entry->Type != VARIABLE)
                {
                        ErrColumn = $<col>1;
                        parse_error (104, CONTINUE);
                } if ((Entry->DataType == UNINITIALIZED) || (Entry->DataType == IDUNNO))
                        Entry->DataType = DOUBLE_ARRAY;
                else if (Entry->DataType != DOUBLE_ARRAY)
                {
                        ErrColumn = $<col>1;
                        parse_error (116, CONTINUE);
                }
                Temp[0]=MakeLeafNode($<token>1);
                Temp[0]->ErrColumn = $<col>1;
                Push (Temp[0]);
        }
        |function_call_or_no_sub_array          /* Leaf node already there - do nothing */
        ;

T_statement:'T'
        (
                ErrNo = 8;
```

```
            ErrColumn = yycolumn + 2;                    /***** wrong */
            BeganStatement = TRUE;
            TableStatement = TRUE;
        }
    table_identifier
        {
            TableStatement = FALSE;
            ErrNo = 2;
        }
    ','
        {
            ErrNo = 9;
        }
    number_list
        {
            register int    FixedNumValues;
            int             LoopStart, LoopEnd;

for (I = 0; I < MAX_DIMENSIONS; I++)
                Indices[I] = 0;

NumValues = NumElements(CurList);             /* Number of table values */
            FixedNumValues = NumValues;

if (NumValues >= MAX_TABLE_CELLS)
            {
                ErrColumn = $<col>5;
                parse_error (117, CONTINUE);
                for (I = 0; I < NumValues - MAX_TABLE_CELLS; I++)  /* Throw away extra elements! */
                    DeleteTree (SPop ());
                FixedNumValues = MAX_TABLE_CELLS;         /* Lower number of elements so that program can safely
                                                           * continue */
            } for (I = 0; I < FixedNumValues; I++)
            {
                Temp[I] = SPop ();                        /* Pop table values */
                Temp[FixedNumValues] = SPop ();           /* Pop table identifier */
/*PrintSyntaxTree(stdout,Temp[FixedNumValues]);printf("=%d\n",NumValues);*/
                Entry = InsertInSymTab (Temp[FixedNumValues]->Symbol->Name);
                Entry->EquationType = CONSTANTTYPE;
                Entry->Type = CONSTANT;
                Entry->DataType = DOUBLE_ARRAY;
                /* Entry->InitValEquation = NULL; */
                Entry->ActiveValEquation = NULL;
                if (Entry->AddInfo == NULL)
                    Entry->AddInfo = NewSymTabAddInfo ();
                Entry->AddInfo->ArrayInfo.NumDimensions = 1;
                Entry->AddInfo->ArrayInfo.DimensionSize[0] = NumValues;

if (Temp[FixedNumValues]->AddInfo != NULL)
                {
                    /* Check that the first index is the zero */
                    if ((Temp[FixedNumValues]->AddInfo->NumElements > 0) &&
                        (strcmp (Temp[FixedNumValues]->AddInfo->Nodes[0]->Symbol->Name, "0") != 0))
                    {                                     /* If the table is multi-dimensional */
```

```c
            ErrColumn = Temp[FixedNumValues]->ErrColumn;
            parse_error (103, CONTINUE);       /* It isn't. Handle error */
        }
        else
        {                                       /* It is. */
            NumIndices = Temp[FixedNumValues]->AddInfo->NumElements;
            Entry->AddInfo->ArrayInfo.NumDimensions = NumIndices;
            if (NumIndices > 1)
            {
                TempString[2] = Temp[FixedNumValues]->AddInfo->Nodes[1]->Symbol->Name;
                for (K = 2; K < NumIndices; K++)
                    if (strcmp ((TempString[K + 1] = Temp[FixedNumValues]->AddInfo->Nodes[K]->Symbol->Name), "0") == 0)
                    {
                        ErrColumn = Temp[FixedNumValues]->AddInfo->Nodes[K]->ErrColumn;
                        parse_error (121, CONTINUE);
                    }
            }

/* SET UP Indices */
            if (UtilityMode != 0) {
                LoopStart=0;
                LoopEnd=0;
            }
            else {
                LoopStart=1;
                LoopEnd=FixedNumValues;
            } for (I = LoopStart; I <= LoopEnd; I++)
            {
                Indices[0] = I - 1;           /* Set table's first index to I */
                for (J = 2; J <= NumIndices; J++)
                    Indices[J - 1] = EvaluateIndex (Temp[FixedNumValues]->AddInfo->Nodes[J - 1]) - 1;

Entry = InsertInSymTab (Temp[FixedNumValues]->Symbol->Name);
                if (Entry->AddInfo == NULL)
                {
                    Entry->AddInfo = NewSymTabAddInfo ();
                    Entry->AddInfo->ArrayInfo.NumDimensions = NumIndices;
                }
                Temp[FixedNumValues] = MakeLeafNode (Temp[FixedNumValues]->Symbol->Name);
                Temp[FixedNumValues]->AddInfo = NewSTAddInfo ();
                Temp[FixedNumValues]->Symbol->EquationType = CONSTANTTYPE;
                Temp[FixedNumValues]->Symbol->Type = CONSTANT;
                Temp[FixedNumValues]->AddInfo->NumElements = NumIndices;
                Temp[FixedNumValues]->AddInfo->Nodes[0] = MakeLeafNode (IntegerStrings[I]);
                for (J = 2; J <= NumIndices; J++)
                    Temp[FixedNumValues]->AddInfo->Nodes[J - 1] = MakeIntNode (TempString[J]);
                Temp[FixedNumValues + 1] = MakeIntNode ("=", Temp[FixedNumValues], Temp[FixedNumValues - 1]);
                /* Create internal node for assignment of value to table element */
                InsertEquation (Temp[FixedNumValues + 1], 0, 'T');
            }
        }
    }
    else
    {                                           /* Single dimensional table */
```

```c
if (Temp[FixedNumValues]->AddInfo == NULL)
            /* If additional info structure doesnt exist */
{
    Temp[FixedNumValues]->AddInfo = NewSTAddInfo ();   /* Create it */
    Temp[FixedNumValues]->AddInfo->NumElements = 1;    /* Set number of dimensions to 1 */
}

Entry = InsertInSymTab (Temp[Temp[FixedNumValues]->Symbol->Name);
Entry->EquationType = CONSTANTTYPE;
Entry->Type = CONSTANT;
Entry->DataType = DOUBLE_ARRAY;
Entry->InitValEquation = NULL;
Entry->ActiveValEquation = NULL;

if (Entry->AddInfo == NULL)
    Entry->AddInfo = NewSymTabAddInfo ();
Entry->AddInfo->ArrayInfo.NumDimensions = 1;
Entry->AddInfo->ArrayInfo.DimensionSize[0] = NumValues;

if (UtilityMode != 0) {
    LoopStart = 0;
    LoopEnd = 1;
}
else {
    LoopStart = 0;
    LoopEnd = FixedNumValues;
} for (I = LoopStart; I < LoopEnd; I++)
{
    /* Create individual statements for each table element */

Indices[0] = I;
    Entry = InsertInSymTab (S<token>3);  /* Create symbol table entry for individual element of
                                            * table */
    if (Entry->AddInfo == NULL)
    {
        Entry->AddInfo = NewSymTabAddInfo ();
        Entry->AddInfo->ArrayInfo.NumDimensions = NumIndices;
        /*
         * for (J=0; J<NumIndices; J++) Entry->AddInfo->ArrayInfo.Indices[J] = Indices[J];
         */
    }

Temp[FixedNumValues] = MakeLeafNode (S<token>3);
    Temp[FixedNumValues]->AddInfo = NewSTAddInfo ();
    Temp[FixedNumValues]->AddInfo->Nodes[0] = MakeLeafNode ((IntegerStrings[I + 1]);
    /* Set table's first index to I */

Temp[FixedNumValues]->AddInfo->NumElements = 1;
    Temp[FixedNumValues]->Symbol->EquationType = CONSTANTTYPE;
    Temp[FixedNumValues]->Symbol->Type = CONSTANT;
    Temp[FixedNumValues + 1] = MakeIntNode ("=", Temp[FixedNumValues], Temp[FixedNumValues - (I + 1)]);
    /*
     * Create internal node for assignment of value to table element
     */
    InsertEquation (Temp[FixedNumValues + 1], 0, 'T');
}
```

```
            CurList--;
            BeganStatement = FALSE;
        };

NOISE_statement:NOISE
        {
            ErrNo = 23;
            BeganStatement = TRUE;
        } exp
        {
            /* Make equation for NS_SEED = expression */
            Temp[0] = MakeLocalNode ("NS_SEED");
            Temp[1] = SPop ();
            Temp[2] = MakeIntNode ("=", Temp[0], Temp[1]);
            InsertEquation (Temp[2], 0, 'C');
            BeganStatement = FALSE;
        }
        ;

SAVE_statement:SAVE
        {
            BeganStatement = TRUE;
        } IDENT_list
        {
            NumValues = NumElements(CurList);

/* CW 9-10-90 added to prevent prophet from exceeding array bounds and trashing memory */
            if (NumValues >= TEMP_STNODE_LIMIT)
            {
                ErrColumn = $<col>3;
                parse_error (109, DIE);
            } for (I = 0; I < NumValues; I++)
            {
                Temp[I] = SPop ();
                Temp[I]->Symbol->SaveFlag = 1;
            /*    DeleteTree (Temp[I]);       /* CW 9-10-90 added to free the memory associated with this
                                               * leaf node */
            }

CurList--;
            BeganStatement = FALSE;
        }
        ;

query_statement:'?'
        {
            ErrNo = 11;
            BeganStatement = TRUE;
        } IDENT_list
        {
            NumValues = NumElements(CurList);

/* CW 9-10-90 added to prevent prophet from exceeding array bounds and trashing memory */
```

```
        if (NumValues >= TEMP_STNODE_LIMIT)
        {
            ErrColumn = $<col>3;
            parse_error (109, DIE);
        }
        for (I = 0; I < NumValues; I++)
        {
            Temp[I] = SPop ();
            if (Temp[I]->Symbol->WhereFrom == UNINITIALIZED)
                Temp[I]->Symbol->WhereFrom = QUERY;
            else if (Temp[I]->Symbol->WhereFrom != QUERY)
            {
                ErrColumn = Temp[I]->ErrColumn;
                parse_error (113, CONTINUE);
            }
            DeleteTree (Temp[I]);       /* CW 9-10-90 added to free the memory associated with this
                                         * leaf node */
        }
        CurList--;
        BeganStatement = FALSE;
    };

empty_line:'\n'
    ;

dimension_spec:no_sub_scalar
    {
        ErrNo = 13;
        Entry = InsertInSymTab ($<token>1);

/* CW 9-8-90 added */
        if (Entry->Type == UNINITIALIZED)
            Entry->Type = VARIABLE;
        else if ((Entry->Type != VARIABLE) && (Entry->Type != PARAMETER))
        {
            ErrColumn = $<col>1;
            parse_error (104, CONTINUE);
        }

/* added SG on 28 Sept 1990 */
        if ((Entry->DataType == UNINITIALIZED) || (Entry->DataType == IDUNNO))
            Entry->DataType = DOUBLE_ARRAY;
        else if (Entry->DataType != DOUBLE_ARRAY)
        {
            ErrColumn = $<col>1;
            parse_error (116, CONTINUE);
        }

Temp[0]=MakeLeafNode($<token>1);
        Temp[0]->ErrColumn = $<col>1;
        Push (Temp[0]);
    }
    ;
    {
```

```c
        ErrNo = 22;
) expression_list
{
        ErrNo = 15;
} ')' 
{
        register int    FixedNumIndices;

NumIndices = NumElements[CurList];          /* Determine the number of indices */

FixedNumIndices = NumIndices;
        /*
        * CW 9-13-90 added to prevent prophet from exceeding array bounds and trashing memory. This enables the
        * program to continue running w/o messing up memory, by popping the extra elements from the stack, and letting
        * program continue. This will ruin the actual values stored for the array, but that is fine because the code
        * cannot be generated now anyway. The main goal here is to keep the program running!
        */
        if (NumIndices >= MAX_DIMENSIONS)
        {
                ErrColumn = $<col>1;
                parse_error (118, CONTINUE);
                for (I = 0; I < NumIndices - MAX_DIMENSIONS; I++)  /* Throw away extra elements! */
                        DeleteTree (SPop ());
                FixedNumIndices = MAX_DIMENSIONS;         /* Lower number of elements so that program can safely
                                                           * continue */
        } for (I = 0; I < FixedNumIndices; I++)             /* Pop the indices */
                Temp[I] = SPop ();
        Temp[FixedNumIndices] = SPop ();                  /* Pop the array identifier */

/* Entry = LookUpSymTab (Temp[FixedNumIndices]->Symbol->Name);    Get pointer to symbol table entry for array */
        Entry = Temp[FixedNumIndices]->Symbol;
        /* CW 9-13-90 removed redundant section of code which duplicated what was in no_sub_scalar section above. */
        if (Entry->AddInfo == NULL)
        {
                Entry->AddInfo = NewSymTabAddInfo ();             /* No conflicts to check, so just add the new info */
                Entry->AddInfo->ArrayInfo.NumDimensions = FixedNumIndices;   /* Allocate memory for additional info. */
                                                                  /* Set the number of dimensions */
                for (I = 0; I < FixedNumIndices; I++)             /* Set the size of each dimension */
                {
                        sscanf (Temp[FixedNumIndices - I - 1]->Symbol->Name, "%d", &J);  /* Convert it to an integer */
                        Entry->AddInfo->ArrayInfo.DimensionSize[I] = J;
                        DeleteTree (Temp[I]);                     /* CW 9-13-90 added */
                }
        }

/* CW 9-12-90 added */
        else
        {                                                 /* Info is already there.  Check for conflicts. */
                if ((Entry->AddInfo->ArrayInfo.NumDimensions != FixedNumIndices))
                {                                         /* Error if mismatch in number of indices. */
                        ErrColumn = Temp[FixedNumIndices]->ErrColumn;
                        parse_error (110, CONTINUE);
                }
```

```
        for (I = 0; I < FixedNumIndices; I++)
        {                                        /* Set the size of each dimension (if necessary) */
            sscanf (Temp[FixedNumIndices - I - 1]->Symbol->Name, "%d", &J);  /* Convert it to an integer */
            J++;                                 /* Increase size by 1, since element 0 is never used */
            if ((Entry->AddInfo->ArrayInfo.DimensionSize[I] <= J))   /* Dimension size can be bigger */
                Entry->AddInfo->ArrayInfo.DimensionSize[I] = J;      /* increase size */
            DeleteTree (Temp[I]);                /* CW 9-13-90 added */
        }

CurList--;

BeganStatement = FALSE;
    }
    ;

dimension_spec_list:dimension_spec
| dimension_spec_list
    {
        ErrNo = 17;
    } ',' dimension_spec
    ;

DMNSN_statement:DMNSN
    {
        ErrNo = 11;
        BeganStatement = TRUE;
    } dimension_spec_list
    ;

MACRO_begin:MACRO
    {
        ErrNo = 12;
        BeganStatement = TRUE;
    } no_sub_scalar
    {
        ErrNo = 13;

Entry = InsertInSymTab ($<token>3);
        CurMacroEntry = Entry;

/* CW 9-7-90 added *//* Must be uninited, or it is an attempt to redeclare a macro */
        if (Entry->Type == UNINITIALIZED)
        {
            Entry->Type = MACROTYPE;
            Entry->DataType = INTEGER;
        }
        else
        {
            ErrColumn = $<col>3;
            parse_error (114, CONTINUE);
        }
        strcpy (CurMacro, $<token>3);
```

```
        Temp[0]=MakeLeafNode($<token>3);
        Temp[0]->ErrColumn = $<col>3;
        Push (Temp[0]);

Entry = ForcedInsInMacroTab ($<token>3);
        Entry->PrintType = -1;
        Entry->Type = VARIABLE;
        Entry->VarType = LEVEL;
        Entry->DataType = DOUBLE;

InMACRO = TRUE;

/* Added CW 8/5/91 for new macros */
        if (UtilityMode == 0)
                MacroLines = (MacroLinesPtr) CheckAlloc(sizeof(* MacroLines));
    }
    ;
expression_list
    {
        ErrNo = 14;
    }
    {
        ErrNo = 15;
    }
    ')' ;
    {
        register int    FixedNumIndices;

InMACRO = TRUE;
        NumIndices = NumElements[CurList];
        FixedNumIndices = NumIndices;
        /*
         * CW 9-13-90 added to prevent prophet from exceeding array bounds and trashing memory. This enables the
         * program to continue running w/o messing up memory, by popping the extra elements from the stack, and letting
         * program continue. This will ruin the actual values stored for the array, but that is fine because the code
         * cannot be generated now anyway. The main goal here is to keep the program running!
         */
        if (NumIndices >= MAX_ARGUMENTS)
        {
            ErrColumn = $<col>5;
            parse_error (119, CONTINUE);
            for (I = 0; I < NumIndices - MAX_ARGUMENTS; I++)  /* Throw away extra elements! */
                DeleteTree (SPop ());
            FixedNumIndices = MAX_ARGUMENTS;            /* lower number of elements so that program can safely
                                                         * continue */
        } for (I = 0; I < FixedNumIndices; I++)           /* Pop the arguments */
            Temp[I] = SPop ();
        Temp[FixedNumIndices] = SPop ();                /* Pop the MACRO identifier */
        Temp[FixedNumIndices]->AddInfo = NewSTAddInfo ();

Entry = Temp[FixedNumIndices]->Symbol;

if (Entry->AddInfo == NULL)                     /* This should normally be the case */
        {
            Entry->AddInfo = NewSymTabAddInfo ();       /* Allocate memory for additional info. */
```

```
                Entry->AddInfo->FunctionInfo.NumArguments = FixedNumIndices;        /* Set the number of arguments */
                Entry->AddInfo->FunctionInfo.NumLocalVars = 0;
                Temp[FixedNumIndices]->AddInfo->NumElements = FixedNumIndices;
                for (I = 0; I < FixedNumIndices; I++)       /* Set the arguments */
                {
                    Temp[FixedNumIndices]->AddInfo->Nodes[I] = Temp[FixedNumIndices - I - 1];
                    Temp[FixedNumIndices]->AddInfo->Nodes[I]->Symbol->Type = PARAMETER;
                    Entry->AddInfo->FunctionInfo.Arguments[I] = Temp[FixedNumIndices - I - 1]->Symbol;
                }
            }
            else
            {
                ErrColumn = Temp[FixedNumIndices]->ErrColumn;
                parse_error (111, CONTINUE);
            }

CurList--;
            BeganStatement = FALSE;
        }
    ;

MACRO_end:MEND
    {
        /* Added CW 8/5/91 for new macros */
        MacroListPtr  TempPtr;

InMACRO = FALSE;                                     /* Exiting macro, so turn off the flag */

/* Added CW 8/5/91 for new macros */
        if (UtilityMode == 0) {
            TempPtr = (MacroListPtr) CheckAlloc(sizeof(* TempPtr));
            TempPtr->MacroLines = MacroLines;
            TempPtr->Macro = CurMacroEntry;
            TempPtr->Next = MacroList->Next;
            MacroList->Next = TempPtr;
        }
    }
    ;

MACRO_L_equation:L_equation_specifier A_S_ML_equation
    {
        Temp[0] = SPop ();                                   /* Pop the equation */
        Temp[0]->LSon->Symbol->EquationType = LEVELTYPE;
        InsertEquation (Temp[0], 1, 'L');
        BeganStatement = FALSE;
    }
    ;

A_S_ML_equation:current_level
    {
        ErrNo = 2;
    }
    |
```

```
        ErrNo = 6;
} exp
{
    Temp[0] = SPop ();                    /* Pop expression */
    Temp[1] = SPop ();                    /* Pop current level */
    Push (MakeIntNode ("=", Temp[1], Temp[0]));   /* Create internal node and push on stack */
}
;

INTRN_statement: INTRN
{
        ErrNo = 11;
} IDENT
;

expression_list:exp
{
    CurList++;
    if (CurList >= MAX_NESTING)
    {
        ErrColumn = $<col>1;
        parse_error (120, DIE);
    }
    NumElements(CurList) = 1;
}
|expression_list
{
        ErrNo = 17;
} ',' 
{
        ErrNo = 23;
} exp
{
    NumElements(CurList)++;
}
;

MACRO_statement:executable_statement
| MACRO_L_equation
| INTRN_statement
| empty_line;

MACRO_body:MACRO_statement
| MACRO_body MACRO_statement;

MACRO_block:MACRO_begin MACRO_body MACRO_end
;
%%

/* NOTE:  All functions are declared in both Sun and ANSI formats, so that the code can run on any computer.
 *        Be sure that SUN is declared or not declared in compatibility.h according to the type of computer
 *        you are using. */
```

```c
/* CW 9-10-90 : Do some miscellaneous initializations */
void
InitializeGeneral ()
{
    register int    i;
    for (i = 0; i < MAX_ARGUMENTS; i++)
        NumElements[i] = 0;

/* Define these IntegerStrings, so that the index of the array is equivalent to the ascii version of that number. */
    /* This is used in Table statements to save cpu time */
    for (i = 0; i < MAX_TABLE_CELLS; i++)
    {
        sprintf (IntegerStrings[i], "%d", i);
        Entry = InsertInSymTab (IntegerStrings[i]);
        Entry->Type = NUMBER;
        Entry->DataType = INTEGER;
    }

/* DOCUMENTOR - list of equations in the order that they are parsed */
    if (UtilityMode != 0) {
        LineList = (LineListPtr) CheckAlloc(sizeof(* LineList));
        LineList->Next = NULL;
        LineList->Equation = NULL;
        LineListCurrent = LineList;
    }

MacroList = (MacroListPtr) CheckAlloc(sizeof(* MacroList));
    MacroLines = NULL;
}

/* Adds an equation tree onto a symbol table entry */
void
InsertEquation (STNodePtr Tree, int ActiveValEqFlag, char c)
{
    EquationPtr    tmp;
    int            i;
    LineListPtr    tmp2;

/*NOTE: UtilityMode=0 does not care about third argument "c" */

/* If the utility is the code generator (pp), do this */
    if (UtilityMode == 0) {
        /* Added CW 8/5/91 for new macros - if parsing a macro definition, the currently defined MacroLines
           structure (which stores all the equations for a single macro definition) has another equation
           added onto it. */
        if (INMACRO == TRUE) {
            MacroLinesPtr MacroLine;
            MacroLine = (MacroLinesPtr) CheckAlloc(sizeof(* MacroLine));
            MacroLine->Node = Tree;
                                        /* The equation inside the macro */
            MacroLine->AI = ActiveValEqFlag;    /* Whether its active or initial value */
            MacroLine->Next = MacroLines->Next;  /* Attach it to MacroLines */
            MacroLines->Next = MacroLine;
            return;
        }
```

```
        /* Allocate memory for a new equation pointer */
        if ((tmp = (EquationPtr) calloc (1, sizeof (*tmp))) == NULL)
        {
            fclose(ErrorFile);
            PrintOutErrors();
            fprintf (DocErrorFile, "INTERNAL ERROR: malloc failed for InsertEquation.\n");
            fclose(DocErrorFile);
            exit (-1);
        } tmp->Equation = Tree;                       /* Attach equation here */
        tmp->NumLoops = FVStackTop + 1;             /* Number of FOR variables used in this equation */
        for (I = 0; I <= FVStackTop; I++)           /* What each FOR variable is */
            tmp->Loops[I] = FVStack[I];
        FVStackTop = -1;                            /* Reset FVStack */ if (ActiveValEqFlag != 1)                   /* Initial value equation */
        {
            tmp->Next = Tree->LSon->Symbol->InitValEquation;
            Tree->LSon->Symbol->InitValEquation = tmp;
        }
        else                                        /* Active value equation */
        {
            tmp->Next = Tree->LSon->Symbol->ActiveValEquation;
            Tree->LSon->Symbol->ActiveValEquation = tmp;
        }
    }

/* If the utility is one of the documentors or flow diagramming, do this */
    else {
        /* Allocate memory for a new equation */
        if((tmp = (EquationPtr)calloc (1,sizeof (*tmp)))==NULL)
        {
            fclose(ErrorFile);
            PrintOutErrors();
            fprintf(DocErrorFile,"INTERNAL ERROR: calloc failed for InsertEquation.\n");
            fclose(DocErrorFile);
            exit(-1);
        } tmp->Equation = Tree;                       /* Attach equation here */
        tmp->NumLoops = FVStackTop+1;               /* Number of FOR variables used in this equation */
        for (I=0;I<=FVStackTop;I++)                 /* What each FOR variable is */
            tmp->Loops[I] = FVStack[I];
        FVStackTop = -1;                            /* Reset FVStack */
        tmp->IsActive = ActiveValEqFlag;            /* DOCUMENTOR */ if (ActiveValEqFlag != 1)                   /* Initial value equation */
        {
            tmp->Next = Tree->LSon->Symbol->InitValEquation;
            Tree->LSon->Symbol->InitValEquation = tmp;
        }

/* DOCUMENTOR SECTION */
        if (c != 'F')                               /* Only count equations if not a FOR statement (which are being ignored) */
```

```
        CurrentEquationNumber+=0.001;
    Tree->LSon->Symbol->InitValEquation->EquationNo = CurrentEquationNumber;  /* Set the equation number */
    if (c != 'C') /* constants have a line number off by one for some reason */
        Tree->LSon->Symbol->InitValEquation->LineNo = yylineno-NoOfLines;  /* Set the line number of this equation */
    else
        Tree->LSon->Symbol->InitValEquation->LineNo = yylineno-NoOfLines+1;  /* Set the line number of this equation */
    Tree->LSon->Symbol->InitValEquation->NoOfLines = NoOfLines;  /* Number of lines used by this equation */
    Tree->LSon->Symbol->InitValEquation->Letter = c;  /* Equation type identification letter */
    LastEquation = Tree->LSon->Symbol->InitValEquation;

tmp2 = (LineListPtr) CheckAlloc(sizeof(*LineList));  /* Add equation to the linked list of lines */
    tmp2->Equation = Tree->LSon->Symbol->InitValEquation;
    tmp2->Next = NULL;

LineListCurrent->Next = tmp2;
    LineListCurrent = tmp2;

}               /* Active value equation */
    else
    {
        tmp->Next = Tree->LSon->Symbol->ActiveValEquation;
        Tree->LSon->Symbol->ActiveValEquation = tmp;

/* DOCUMENTOR SECTION */
        CurrentEquationNumber=floor(CurrentEquationNumber)+1;  /* Increment by 1 because this is a major equation */
        Tree->LSon->Symbol->ActiveValEquation->EquationNo = CurrentEquationNumber;  /* Set the equation number */
        Tree->LSon->Symbol->ActiveValEquation->LineNo = yylineno-NoOfLines;  /* Set the line number of this equation */
        Tree->LSon->Symbol->ActiveValEquation->NoOfLines = NoOfLines;  /* Number of lines used by this equation */
        Tree->LSon->Symbol->ActiveValEquation->Letter = c;  /* Equation type identification letter */
        tmp2 = (LineListPtr) CheckAlloc(sizeof(*LineList));  /* Add equation to the linked list of lines */
        tmp2->Equation = Tree->LSon->Symbol->ActiveValEquation;
        tmp2->Next = NULL;

LineListCurrent->Next = tmp2;
        LineListCurrent = tmp2;

}
}

/* Free MacroList (the list of all macro definitions) */
void
FreeMacroList()
{
    MacroListPtr   CurList,PrevList;
    MacroLinesPtr  CurLines,PrevLines;

CurList = MacroList->Next;
    PrevList = MacroList;
    while (CurList != NULL) {
```

```
            CurLines = CurList->MacroLines->Next;
            PrevLines = CurList->MacroLines;
            while (CurLines != NULL) {
                free(PrevLines);
                PrevLines = CurLines;
                CurLines = CurLines->Next;
            }
            free(PrevLines);
        free(PrevList);
        PrevList = CurList;
        CurList = CurList->Next;
    }
    free(PrevList);

/* Free all memory allocated using malloc or calloc - NOT USED, WASTE OF CPU TIME! MEMORY FREED WHEN pp EXITS! */
void
CleanMemory ()
{
return;
    FreeATable (MainSymTab);
    FreeATable (MacroSymTab);
    FreeMacroList ();
}

/* CW 9-11-90 : Reads in the error file produced by yyerror and parse_error, then prints out the error messages */
void
PrintOutErrors ()
{
    register int    i,
                    LoopLimit,
                    CurrentLine = 0;
    int             LineNumber,
                    Column,
                    ErrNo;
    FILE            *fp;
    char            line[MAX_LENGTH_OF_SOURCE_LINE];
    char            number[10];

strcpy (line, "");

if ((ErrorFile = fopen (ERROR_LOG_FILE, "r")) == NULL)
    {
        fprintf (DocErrorFile, "INTERNAL ERROR: failed to open error log [%s] in function PrintOutErrors.\n", ERROR_LOG_FILE);
        fclose(DocErrorFile);
        exit (-1);
    } if ((fp = fopen (InputFile, "r")) == NULL)
    {
        fprintf (DocErrorFile, "INTERNAL ERROR: failed to re-open input file [%s] in function PrintOutErrors.\n", InputFile);
        fclose(DocErrorFile);
        exit (-1);
    }
```

```c
while (!feof (ErrorFile))
{
    if ((fscanf (ErrorFile, "%d %d\n", &LineNumber, &Column, &ErrNo)) < 3)
        break;

if (!((LineNumber == OldLineNumber) && ((ErrNo == OldErrNo) || (ErrNo == 0))))
    {
        OldLineNumber = LineNumber;
        OldErrNo = ErrNo;

LoopLimit = LineNumber - CurrentLine;
        for (i = 0; i < LoopLimit; i++)
        {
            fgets (line, MAX_LENGTH_OF_SOURCE_LINE-1, fp);
            CurrentLine++;
        } sprintf (number, "%d", LineNumber);
        fprintf (DocErrorFile, "%s", line);
        if (Column == -1)
            Column = strlen (line) - 1;
        for (i = 1; i <= Column; i++)
            fprintf (DocErrorFile, " ");
        fprintf (DocErrorFile, "^\n%s:", number);
    } switch (ErrNo)
    {
        case 1:
            fprintf (DocErrorFile, "ERROR: Level variable with '.K' subscript expected.\n");
            ErrorFound = TRUE;
            break;
        case 2:
            fprintf (DocErrorFile, "ERROR: '=' expected.\n");
            ErrorFound = TRUE;
            break;
        case 3:
            fprintf (DocErrorFile, "WARNING: Level variable with '.J' subscript expected.\n");
            ErrorFound = TRUE;
            break;
        case 4:
            fprintf (DocErrorFile, "ERROR: '+' or '-' expected.\n");
            ErrorFound = TRUE;
            break;
        case 5:
            fprintf (DocErrorFile, "ERROR: Integral term incorrect or missing.\n");
            ErrorFound = TRUE;
            break;
        case 6:
            fprintf (DocErrorFile, "ERROR: Incorrect expression syntax.\n");
            ErrorFound = TRUE;
            break;
        case 7:
            fprintf (DocErrorFile, "ERROR: Rate variable with '.KL' subscript expected.\n");
            ErrorFound = TRUE;
            break;
```

```
case 8:
        fprintf (DocErrorFile, "ERROR: Table identifier expected.\n");
        ErrorFound = TRUE;
        break;
case 9:
        fprintf (DocErrorFile,
                "ERROR: List of table values delimited by ',' or '/' expected. Trailing delimiter not allowed.\n");
        ErrorFound = TRUE;
        break;
case 11:
        fprintf (DocErrorFile, "ERROR: Variable identifier expected.\n");
        ErrorFound = TRUE;
        break;
case 12:
        fprintf (DocErrorFile, "ERROR: Macro identifier expected.\n");
        ErrorFound = TRUE;
        break;
case 13:
        fprintf (DocErrorFile, "ERROR: '(' expected.\n");
        ErrorFound = TRUE;
        break;
case 14:
        fprintf (DocErrorFile, "ERROR: in list of arguments\n");
        ErrorFound = TRUE;
        break;
case 15:
        fprintf (DocErrorFile, "ERROR: ')' expected.\n");
        ErrorFound = TRUE;
        break;
case 16:
        fprintf (DocErrorFile, "NOT IN USE - This error code should not be used\n");
        break;
case 17:
        fprintf (DocErrorFile, "ERROR: ';' expected.\n");
        ErrorFound = TRUE;
        break;
case 18:
        fprintf (DocErrorFile, "ERROR: Integer or Floating point number expected.\n");
        ErrorFound = TRUE;
        break;
case 19:
        fprintf (DocErrorFile, "ERROR: Iteration index constant or integer expected.\n");
        ErrorFound = TRUE;
        break;
case 20:
        fprintf (DocErrorFile, "ERROR: Iteration control variable expected.\n");
        ErrorFound = TRUE;
        break;
case 21:
        fprintf (DocErrorFile, "NOT IN USE - Reassign error code 11 for this\n");
        break;
case 22:
        fprintf (DocErrorFile, "ERROR: Integer expected.\n");
        ErrorFound = TRUE;
        break;
```

```
        case 23:
            fprintf (DocErrorFile, "ERROR: Expression expected.\n");
            ErrorFound = TRUE;
            break;
        case 24:
            fprintf (DocErrorFile, "ERROR: Variable or integer expected.\n");
            ErrorFound = TRUE;
            break;
        case 100:
            fprintf (DocErrorFile, "INTERNAL ERROR: Stack top has been corrupted. Contact Devonrue, Ltd.\n");
            ErrorFound = TRUE;
            break;
        case 101:
            fprintf (DocErrorFile, "ERROR: Level variable on RHS differs form level variable on LHS.\n");
            ErrorFound = TRUE;
            break;
        case 102:
            fprintf (DocErrorFile, "ERROR: Array element on RHS differs from array element on LHS.\n");
            ErrorFound = TRUE;
            break;
        case 103:
            fprintf (DocErrorFile, "ERROR: First index of a multi-dimensional table must be '*'\n");
            ErrorFound = TRUE;
            break;
        case 104:
            fprintf (DocErrorFile, "ERROR: Identifier previously used as a non-variable.\n");
            ErrorFound = TRUE;
            break;
        case 105:
            fprintf (DocErrorFile, "ERROR: Variable previously used as a non-Level.\n");
            ErrorFound = TRUE;
            break;
        case 106:
            fprintf (DocErrorFile, "ERROR: Variable previously used as a non-Rate\n");
            ErrorFound = TRUE;
            break;
        case 107:
            fprintf (DocErrorFile, "ERROR: Value of variable has been previously obtained/computed.\n");
            ErrorFound = TRUE;
            break;
        case 108:
            fprintf (DocErrorFile, "ERROR: Expecting variable of data type: FLOATING POINT instead finding pointer to array.\n");
            ErrorFound = TRUE;
            break;
        case 109:
            fprintf (DocErrorFile,
                "INTERNAL ERROR: Temp array overflow.  Reduce number of elements, or contact Devonrue, Ltd.\n");
            ErrorFound = TRUE;
            break;
        case 110:
            fprintf (DocErrorFile, "ERROR: Inconsistent number of dimensions/arguments in array/function.\n");
            ErrorFound = TRUE;
            break;
```

```
case 111:
    fprintf (DocErrorFile, "ERROR: Macro has been defined previously.\n");
    ErrorFound = TRUE;
    break;
case 112:
    fprintf (DocErrorFile, "ERROR: Constant expected.\n");
    ErrorFound = TRUE;
    break;
case 113:
    fprintf (DocErrorFile,
        "ERROR: Value of variable has been previously obtained through an E statement or an equation.\n");
    ErrorFound = TRUE;
    break;
case 114:
    fprintf (DocErrorFile, "ERROR: Macro expected.\n");
    ErrorFound = TRUE;
    break;
case 115:
    fprintf (DocErrorFile, "ERROR: Local variable cannot be used outside of a macro definition.\n");
    ErrorFound = TRUE;
    break;
case 116:
    fprintf (DocErrorFile, "ERROR: Used previously as a scalar variable.\n");
    ErrorFound = TRUE;
    break;
case 117:
    fprintf (DocErrorFile, "ERROR: Maximum number of table elements exceeded.  Reduce table size.\n");
    ErrorFound = TRUE;
    break;
case 118:
    fprintf (DocErrorFile, "ERROR: Too many elements in array. Reduce array size.\n");
    ErrorFound = TRUE;
    break;
case 119:
    fprintf (DocErrorFile, "ERROR: Too many arguments in function call.\n");
    ErrorFound = TRUE;
    break;
case 120:
    fprintf (DocErrorFile, "ERROR: Maximum nesting levels exceeded.\n");
    ErrorFound = TRUE;
    break;
case 121:
    fprintf (DocErrorFile, "ERROR: * may only be used as the first index of a table.\n");
    ErrorFound = TRUE;
    break;
case 125:
    fprintf (DocErrorFile, "ERROR: Integer or integer constant expected.\n");
    ErrorFound = TRUE;
    break;
case 126:
    fprintf (DocErrorFile,
        "ERROR: Constants should be defined by an 'I' statement prior to use in 'FOR' statement.\n");
    ErrorFound = TRUE;
    break;
```

```
        case 127: fprintf (DocErrorFile, "ERROR: Previous MACRO definition incorrect.\n");
                 ErrorFound=TRUE;
                 break;
        case 128: fprintf (DocErrorFile, "ERROR: Array subscript expected.\n");
                 ErrorFound=TRUE;
                 break;
        case 129: fprintf (DocErrorFile, "ERROR: 'I' statements cannot be used to initialize an array.\n");
                 ErrorFound=TRUE;
                 break;
        case 130: fprintf (DocErrorFile, "ERROR: If indices are used, exactly one index should be a '*'.\n");
                 ErrorFound=TRUE;
                 break;
        case 131: fprintf (DocErrorFile, "ERROR: This argument requires an array (expression not allowed).\n");
                 ErrorFound=TRUE;
                 break;
        case 132: fprintf (DocErrorFile, "ERROR: Cannot redefine this FOR variable.\n");
                 ErrorFound=TRUE;
                 break;
        default:
                 fprintf (DocErrorFile, "ERROR: Unrecognized syntax error, CODE=%d.\n",ErrNo);
                 ErrorFound = TRUE;
                 break;
        }
    }
    fclose (fp);
    fclose (ErrorFile);
}

/* yacc automatically calls this when a syntax error is detected.  It uses ErrNo, set previously inside the grammar, to determine
   what error message to place in the file.  The format of the error log file is:
        <Line Number> <Column Number> <Error Number>
   There is one error per line, file is terminated by standard end of file mark.
*/
int
yyerror (char *s)
{
    register int    tmp,
                    number,
                    yynewcolumn,
                    dummy;

/*
 * Variable 'dummy' is needed to correct the line number in which the error occurred, when the error was
 * detected after the end of the line was reached, and yycolumn has gone down to the start of the next line.
 */
    if (yycolumn == 0)
        dummy = -1;
    else
        dummy = 0;

number = yylineno + dummy;                  /* Actual line number is one less than yylineno now */
    yynewcolumn = yycolumn - yyleng;            /* Column where error occurred is set to the beginning of
```

```c
                                                        * token */ if (yycolumn < 1)
                yynewcolumn = -1;
                                        /* This means that when the errors are being printed,
                                         * position the error at the end of the line
                                         * (yynewcolumn=strlen(line)) */ if (BeganStatement == TRUE)
                fprintf (ErrorFile, "%d %d\n", number, yynewcolumn, ErrNo);  /* Write error to the error file */
        else
                fprintf (ErrorFile, "%d %d\n", number, 0, 0);   /* Unrecognized error */ while (Pop () != NULL);                 /* Make sure stack is empty before continuing */
        /*
         * If still parsing same line that error occured, call yylex until beginning of next line is reached (only
         * need one error reported per line in case the error propagates itself)
         */
        if (dummy == 0)
                while ((tmp = yylex ()) != '\n' && tmp != 0);
        CurList = 0;                    /* It stops parsing the line, so better reset this */
        ErrNo = 0;

BeganStatement = FALSE;
}

/* yywrap() is needed by yacc. */
int
yywrap ()
{
        ateof = 1;
        return 1;
}

/* Insert a FOR variable into the global ForList */
int InsertForList(char *Variable, AddForInfoPtr List)
{
        ForListPtr Temp;
        AddForInfoPtr Temp2;

if (ForList == NULL) {
                ForList = (ForListPtr) CheckAlloc(sizeof(ForListType));
                ForList->ForVariable = Variable;
                ForList->Info = List;
        }
        else {
                Temp = (ForListPtr) CheckAlloc(sizeof(ForListType));
                Temp->ForVariable = Variable;
                Temp->Info = List;
                Temp->Next = ForList;
                ForList = Temp;
        }
}
```

```
/* Search for FOR variable in ForList */
AddForInfoPtr SearchForList(char *Variable)
{
    ForListPtr Temp;

Temp = ForList;
    while (Temp != NULL) {
        if (strcmp(Temp->ForVariable,Variable) == 0)
            return Temp->Info;
        Temp=Temp->Next;
    }
}

/* Testing code - feel free to ignore */
ForListPtr PrintForList(char *Variable)
{
    ForListPtr Temp;

printf("PrintForList: [%s]\n",Variable);
    Temp = ForList;
    while (Temp != NULL) {
        printf("\t[%s]\n",Temp->ForVariable);
        Temp=Temp->Next;
    }
}
```

I claim:

1. A method for processing computer program statements that define parameters and define equations involving the parameters, said method comprising the steps of
    (a) determining for each parameter a dependency quantity identifying the number of dependencies associated with that parameter,
    (b) identifying each dependency associated with each parameter as defined by the program statements,
    (c) for each parameter having a zero-valued dependency quantity, decrementing the dependency quantity of each parameter associated with that parameter, and
    (d) evaluating each parameter that has a non-zero dependency quantity prior to said preceding decrementing step and for which the dependency quantity has been decremented to zero.

2. A method according to claim 1 comprising the further step of
    repeating said decrementing step and said evaluating step, until the dependency quantities associated with all parameters of interest are decremented to zero value and all parameters of interest are evaluated.

3. A method according to claim 1 including the step of establishing in computer memory a representation of a syntax tree of the program statements.

4. A method according to claim 1 further comprising the step of establishing a symbol table of the program statement parameters and further containing said dependency quantities and said identification of associated dependencies.

5. A method according to claim 4 further comprising the step of
    traversing said symbol table repetitively, including performing said decrementing step and said evaluating step for each parameter having a non-zero valued dependency quantity prior to the performing of the last decrementing step.

6. A method for the automated processing of computer program statements with digital computer equipment having at least a processor and a memory and wherein said program statements define parameters and define equations involving the parameters, said method comprising the steps of
    (a) determining for each parameter a first quantity identifying the number of dependencies associated with that parameter, as defined by said program statements,
    (b) identifying each dependency associated with each parameter, as defined by the program statements,
    (c) for each parameter having a first quantity identifying a zero quantity of dependencies, decrementing the first quantity of each other parameter associated with that parameter, and
    (d) evaluating each parameter that has a first quantity identifying a non-zero dependency quantity prior to said preceding decrementing step and for which the dependency quantity has been decremented to zero.

7. A method according to claim 6 including the step of establishing in the computer memory a representation of a symbol table of the program statement variables and said first quantities and said identification of associated dependencies.

8. A method according to claim 6 including the step of establishing in the computer memory a representation of a syntax tree of the program statements structured to represent the precedential sequence of the program statements.

* * * * *